(12) United States Patent
Maki et al.

(10) Patent No.: US 10,741,979 B2
(45) Date of Patent: *Aug. 11, 2020

(54) VEHICLE HARNESS STRUCTURE AND ADDITIONAL CONNECTION MEMBER

(71) Applicant: Yazaki Corporation, Tokyo (JP)

(72) Inventors: Yoichi Maki, Makinohara (JP); Mototatsu Matsunaga, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/180,326

(22) Filed: Nov. 5, 2018

(65) Prior Publication Data

US 2019/0074641 A1    Mar. 7, 2019

Related U.S. Application Data

(62) Division of application No. 14/725,762, filed on May 29, 2015, now Pat. No. 10,122,125.

(30) Foreign Application Priority Data

May 30, 2014 (JP) .................................. 2014-112856
May 30, 2014 (JP) .................................. 2014-112857

(Continued)

(51) Int. Cl.
*H01R 13/66* (2006.01)
*B60R 16/02* (2006.01)
(Continued)

(52) U.S. Cl.
CPC ....... *H01R 13/6691* (2013.01); *B60R 16/023* (2013.01); *B60R 16/0207* (2013.01); *B60R 16/0215* (2013.01); *B60R 16/03* (2013.01)

(58) Field of Classification Search
CPC ............ H01R 13/6691; B60R 16/0215; B60R 16/023; B60R 16/03; B60R 16/0207
See application file for complete search history.

(56) References Cited

U.S. PATENT DOCUMENTS 5,971,799 A    10/1999  Swade
6,291,770 B1    9/2001  Casperson
(Continued)

FOREIGN PATENT DOCUMENTS

CN    103732450 A    4/2014
JP    64-7712 U    1/1989
(Continued)

OTHER PUBLICATIONS

Communication dated Jul. 16, 2019, issued by the Japanese Patent Office in counterpart Japanese Application No. 2018-177752.
(Continued)

*Primary Examiner* — Jared Fureman
*Assistant Examiner* — Michael J Warmflash
(74) *Attorney, Agent, or Firm* — Sughrue Mion, PLLC

(57) ABSTRACT

A vehicle harness structure and an additional connection member are provided, according to which part numbers of wire harnesses are reduced and superfluous attachment in the wire harness is avoided. The vehicle harness structure includes a basic harness for interconnecting a plurality of main devices to be mounted in common on target vehicles, an additional connection member having one end connected in a branched manner to a communication line or a signal line of the basic harness and another end connected to at least one auxiliary device to be optionally post-mounted on the target vehicles, and a control function section provided in the additional connection member to control the operation of the auxiliary device.

10 Claims, 33 Drawing Sheets

(30) Foreign Application Priority Data

| | | | |
|---|---|---|---|
| Jul. 1, 2014 | (JP) | ................................ | 2014-136025 |
| Jul. 1, 2014 | (JP) | ................................ | 2014-136026 |
| Jul. 18, 2014 | (JP) | ................................ | 2014-148255 |

(51) Int. Cl.
    *B60R 16/023*     (2006.01)
    *B60R 16/03*     (2006.01)

(56) References Cited

U.S. PATENT DOCUMENTS

| | | | |
|---|---|---|---|
| 6,900,555 B2 | 5/2005 | Sakamoto et al. | |
| 7,356,714 B2 | 4/2008 | Nagasawa et al. | |
| 8,688,323 B2* | 4/2014 | Aoki | B60R 16/02 307/9.1 |
| 9,457,741 B2* | 10/2016 | Sasaki | B60R 16/0207 |
| 9,545,887 B2* | 1/2017 | Ito | B60R 16/0207 |
| 2004/0223275 A1 | 11/2004 | Yanagida et al. | |
| 2004/0230320 A1 | 11/2004 | Nagasawa et al. | |
| 2006/0089757 A1 | 4/2006 | Yoshimura et al. | |
| 2009/0118898 A1 | 5/2009 | Yoshimura et al. | |
| 2009/0304913 A1 | 12/2009 | Yanagawa et al. | |
| 2010/0010690 A1 | 1/2010 | Yoshimura et al. | |
| 2010/0088004 A1 | 4/2010 | Maki | |
| 2011/0301782 A1 | 12/2011 | Yamamoto et al. | |
| 2012/0221201 A1 | 8/2012 | Aoki | |
| 2012/0327978 A1 | 12/2012 | Nishimura | |
| 2013/0285549 A1 | 10/2013 | Aoki | |
| 2014/0103715 A1 | 4/2014 | Ito et al. | |
| 2015/0194742 A1* | 7/2015 | Shigezane | H01R 13/501 439/395 |
| 2015/0360627 A1* | 12/2015 | Sasaki | H01R 9/031 174/72 A |

FOREIGN PATENT DOCUMENTS

| | | | |
|---|---|---|---|
| JP | 4-286435 A | | 10/1992 |
| JP | 6-171438 A | | 6/1994 |
| JP | 8-2291 A | | 1/1996 |
| JP | 8-79841 A | | 3/1996 |
| JP | 9-66779 A | | 3/1997 |
| JP | 9-66780 A | | 3/1997 |
| JP | 9-66781 A | | 3/1997 |
| JP | 10-248133 A | | 9/1998 |
| JP | 10-336843 A | | 12/1998 |
| JP | 10336843 A | * | 12/1998 |
| JP | 11-266251 A | | 9/1999 |
| JP | 2002-260747 A | | 9/2002 |
| JP | 2003-220908 A | | 8/2003 |
| JP | 2004-268630 A | | 9/2004 |
| JP | 2005-286471 A | | 10/2005 |
| JP | 2005-310710 A | | 11/2005 |
| JP | 2006-123615 A | | 5/2006 |
| JP | 2006-248265 A | | 9/2006 |
| JP | 2008-110718 A | | 5/2008 |
| JP | 2009-286288 A | | 12/2009 |
| JP | 2011-93374 A | | 5/2011 |
| JP | 2012-56505 A | | 3/2012 |
| JP | 2014086168 A | * | 5/2014 |
| WO | 2011/105545 A1 | | 9/2011 |
| WO | 2014/046108 A1 | | 3/2014 |

OTHER PUBLICATIONS

Communication dated Apr. 27, 2017, issued by the State Intellectual Property Office of P.R. China in counterpart Chinese application No. 201510289600.9.
Communication dated Aug. 7, 2018, issued by the Japanese Patent Office in counterpart Japanese Application No. 2014-112857.
Communication dated Jul. 24, 2018, issued by the Japanese Patent office in counterpart Japanese Application No. 2014-136025.
Communication dated Mar. 20, 2018, issued by the Japanese Patent Office in counterpart Japanese application No. 2014-136026.
Communication dated Mar. 20, 2018, issued by the Japanese Patent Office in counterpart Japanese application No. 2014-148255.
Office Action dated Jan. 30, 2018, by the Japanese Patent Office in counterpart Japanese Application No. 2014-112856.
Office Action dated Jan. 30, 2018, by the Japanese Patent Office in counterpart Japanese Application No. 2014-112857.

* cited by examiner

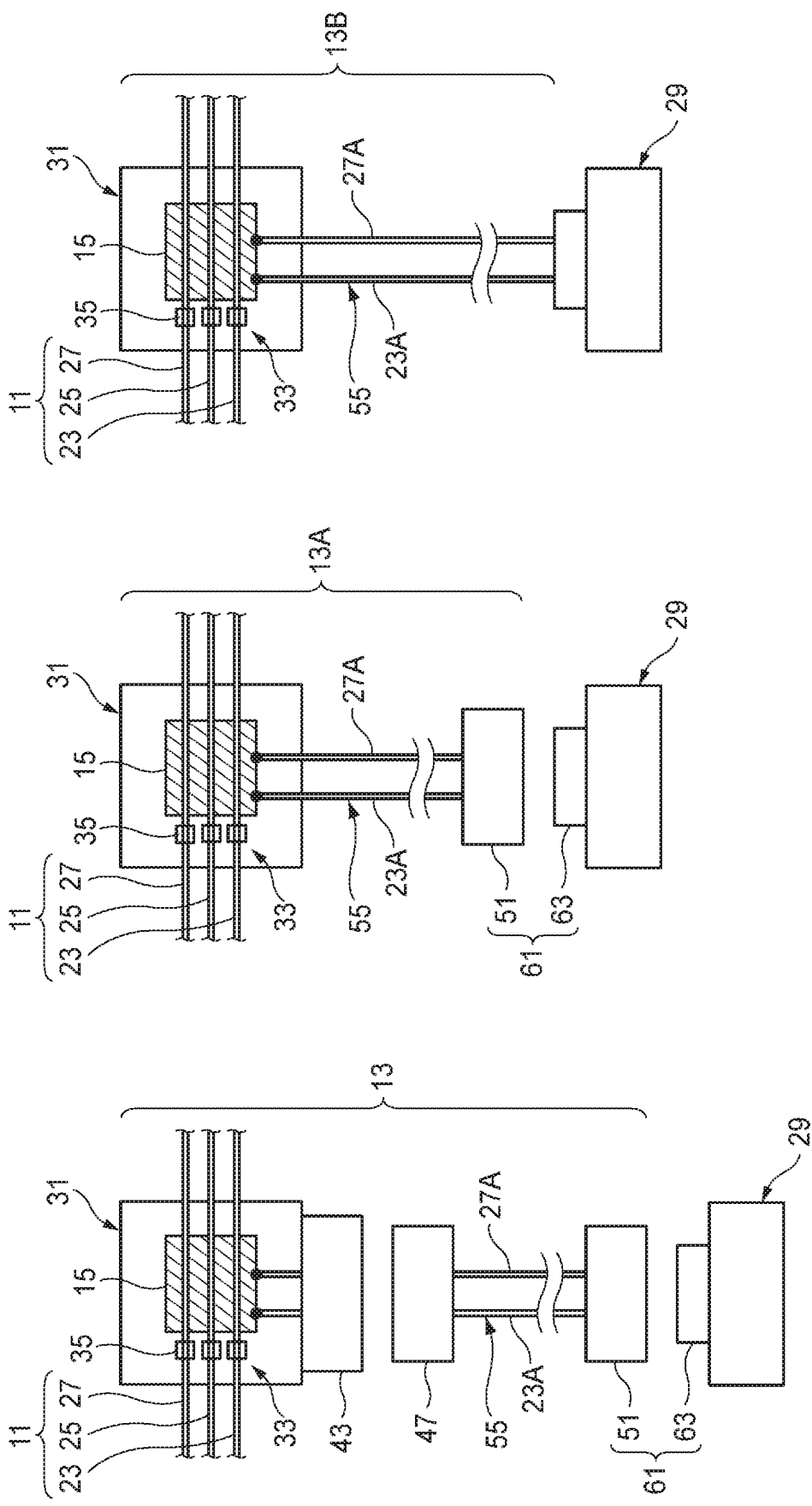

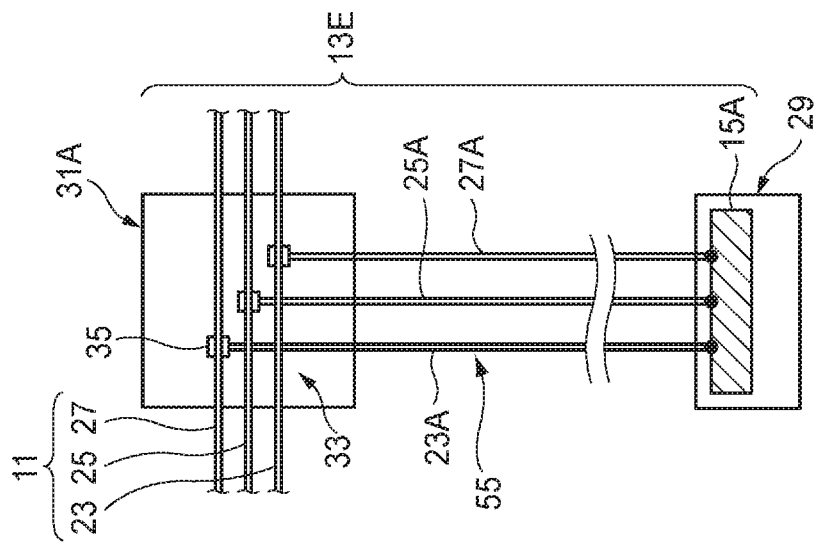
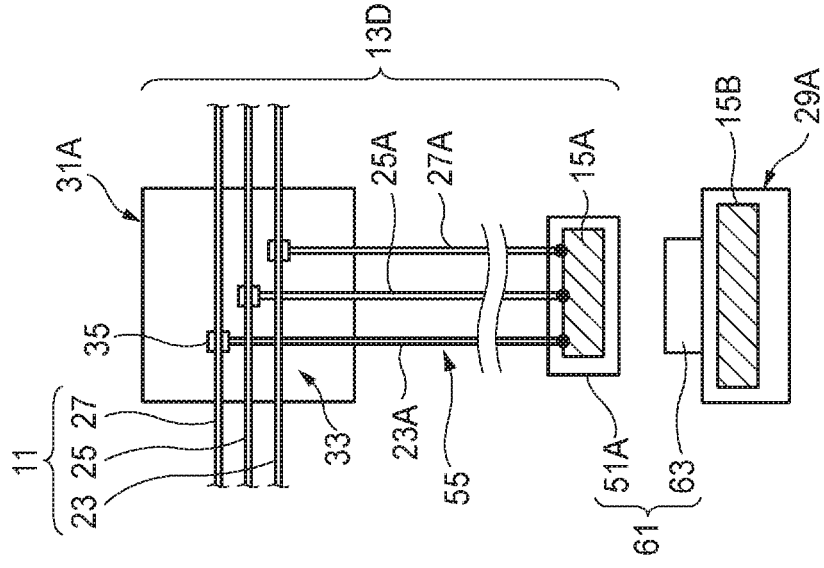
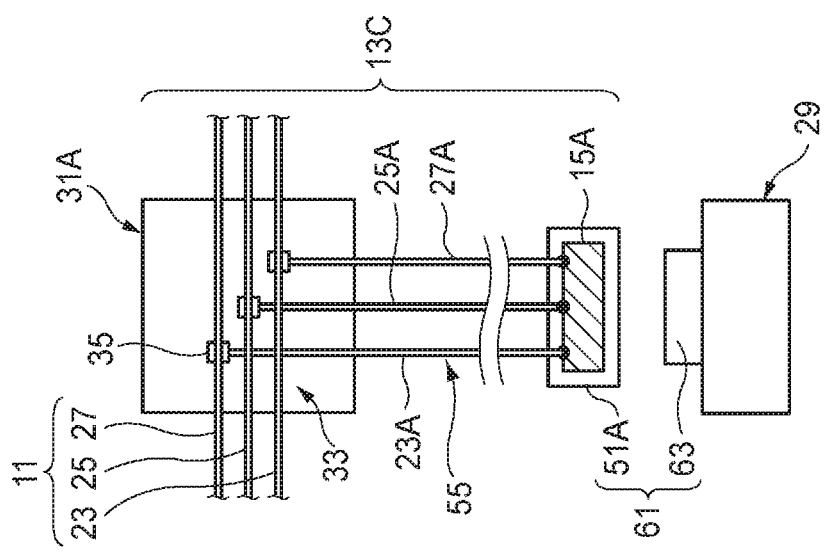

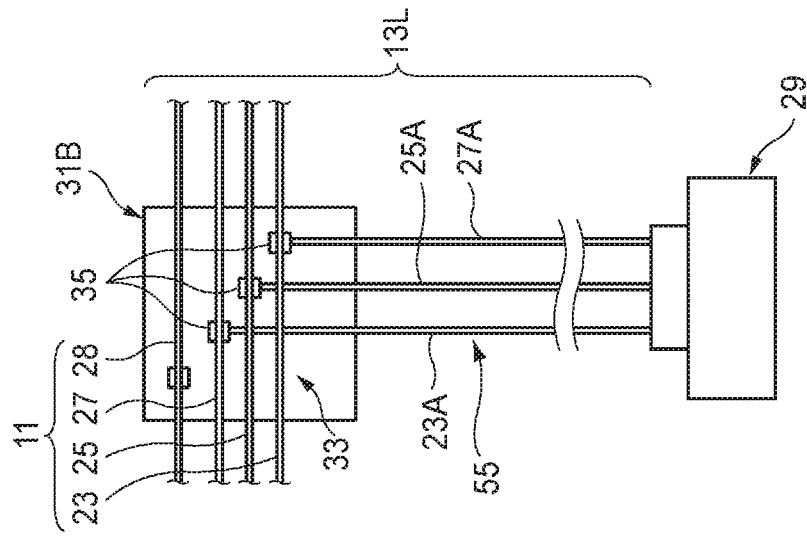
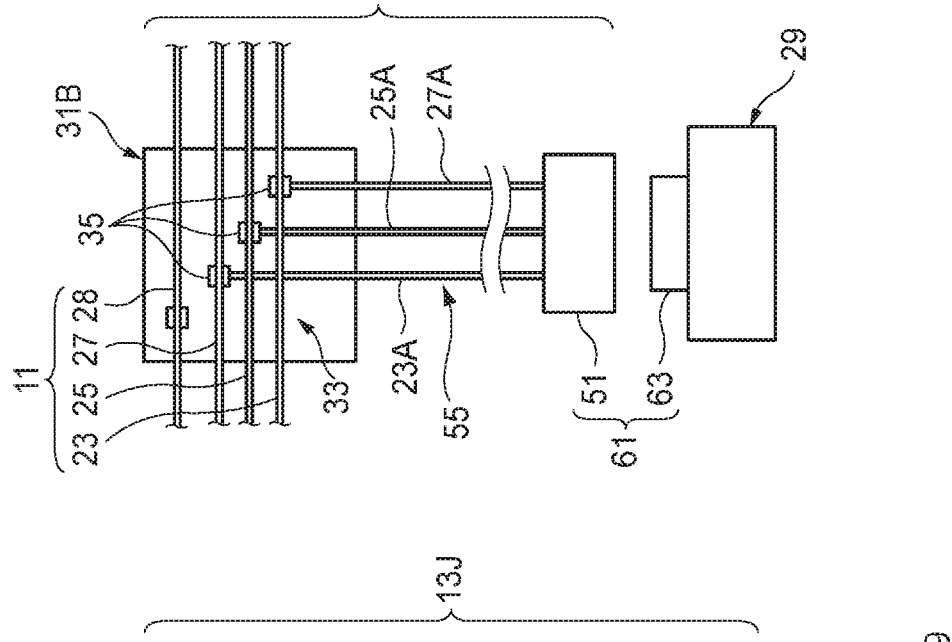
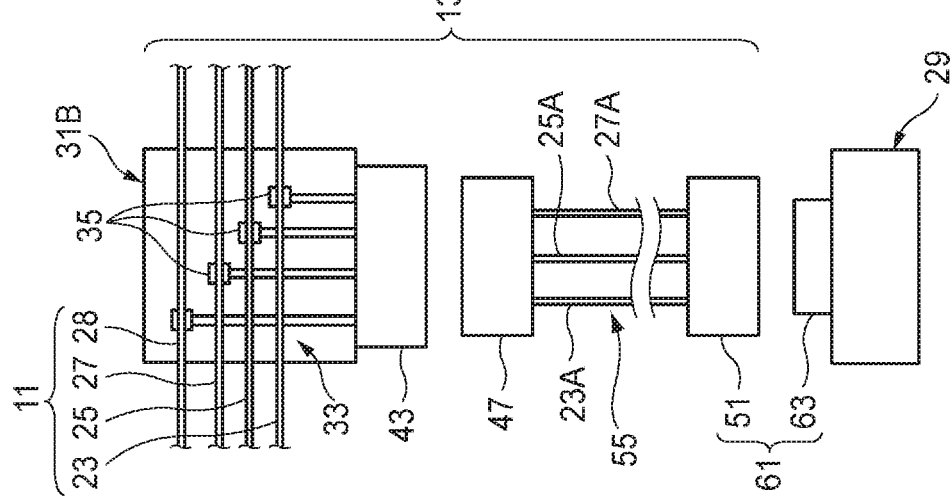

(CONT.)

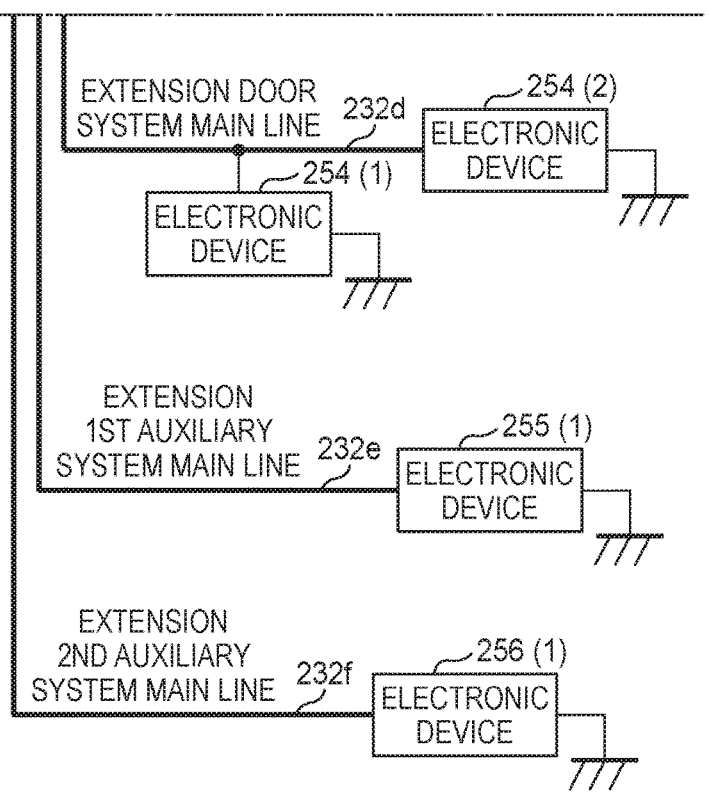

FIG. 22

OVER-CURRENT THRESHOLD TABLE TBL1

| OUTPUT SYSTEM CLASS | INDIVIDUAL CURRENT REFERENCE VALUE DEVICE NUMBER | | | ADDITION CURRENT REFERENCE VALUE | CURRENT CUTOFF THRESHOLD | ERROR INFORMATION |
|---|---|---|---|---|---|---|
| | 1 | 2 | 3 | | | |
| EXTENSION ENGINE SYSTEM MAIN LINE | CurA1 | CurA2 | | CurAref | CurA_TH | ErrA |
| EXTENSION INSTRUMENT PANEL SYSTEM MAIN LINE | CurB1 | CurB2 | CurB3 | CurBref | CurB_TH | ErrB |
| EXTENSION ROOF SYSTEM MAIN LINE | CurC1 | CurC2 | | CurCref | CurC_TH | ErrC |
| EXTENSION DOOR SYSTEM MAIN LINE | CurD1 | CurD2 | | CurDref | CurD_TH | ErrD |
| EXTENSION 1ST AUXILIARY SYSTEM MAIN LINE | CurE1 | | | CurEref | CurE_TH | ErrE |
| EXTENSION 2ND AUXILIARY SYSTEM MAIN LINE | CurF1 | | | CurFref | CurF_TH | ErrF |

ΣCurX: TOTAL OF INDIVIDUAL CURRENT REFERENCE VALUES IN OUTPUT SYSTEM X

CurXref: ADDITION CURRENT REFERENCE VALUE IN OUTPUT SYSTEM X

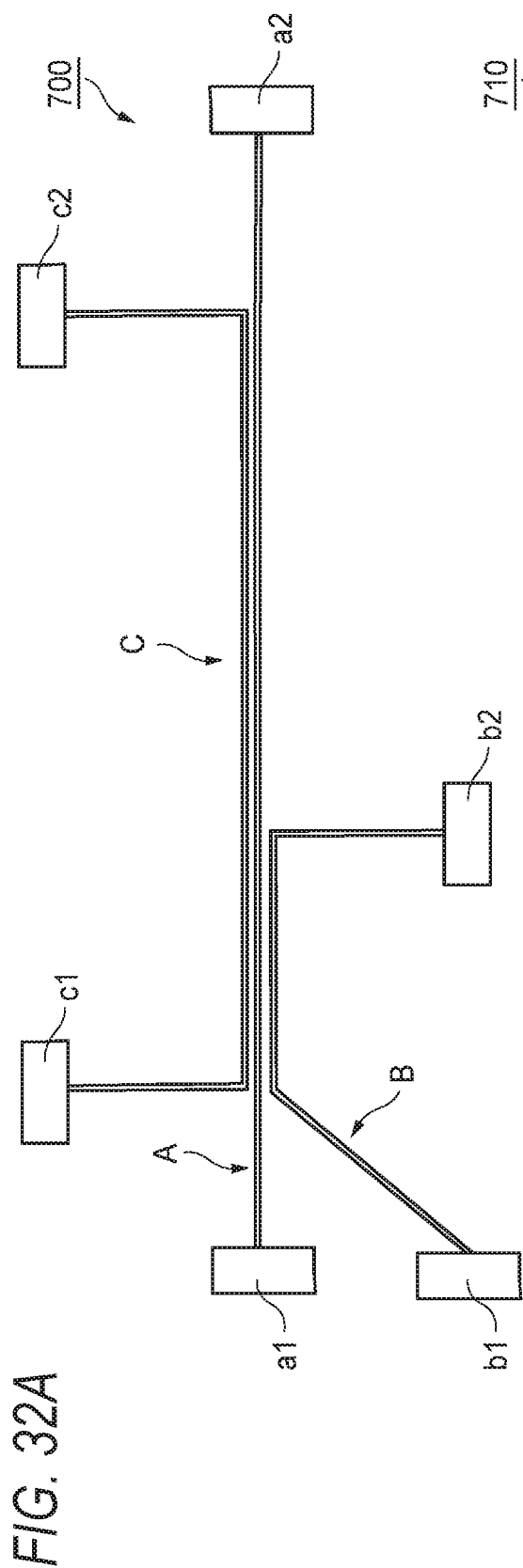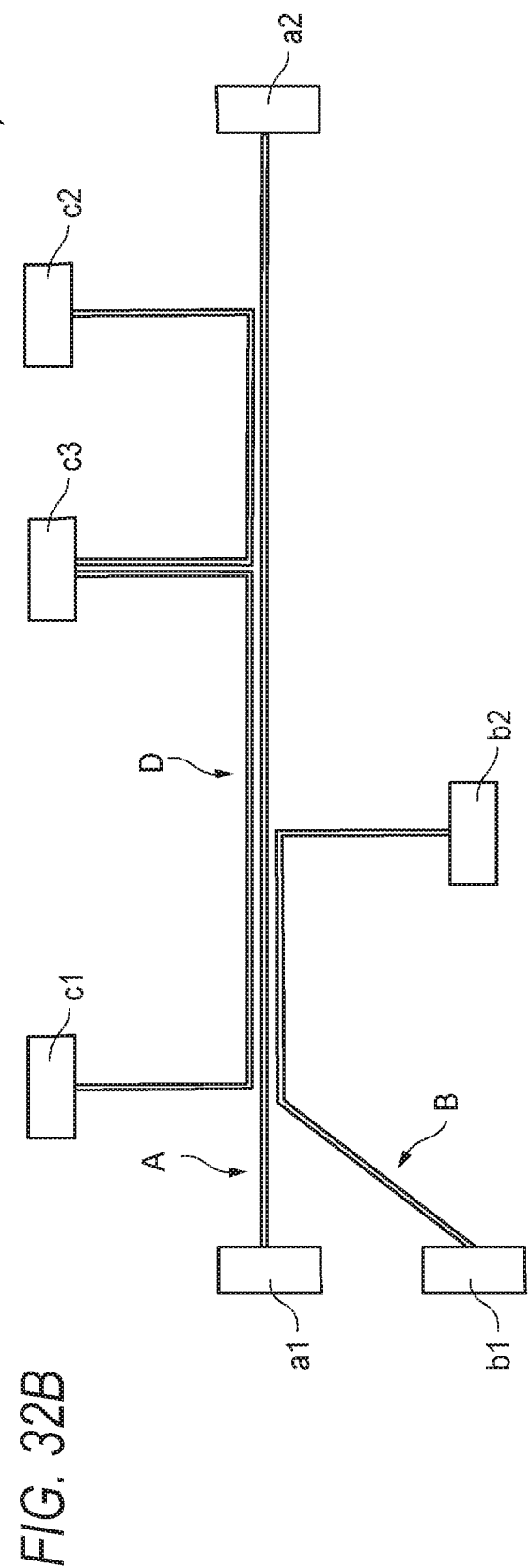
FIG. 32A
FIG. 32B

VEHICLE HARNESS STRUCTURE AND ADDITIONAL CONNECTION MEMBER

CROSS-REFERENCE TO RELATED APPLICATIONS

This application is a Divisional of U.S. patent application Ser. No. 14/725,762, filed on May 29, 2015, which claiming priority based on Japanese Patent Application Nos. 2014-112856 and 2014-112857 filed on May 30, 2014, Japanese Patent Application Nos. 2014-136025 and 2014-136026 filed on Jul. 1, 2014, and Japanese Patent Application No. 2014-148255 filed on Jul. 18, 2014, the contents of all of which are incorporated herein by reference in their entirety.

FIELD OF INVENTION

The present invention relates to a vehicle harness structure and an additional connection member.

RELATED ART

A large number of various kinds of electronic devices such as lamps and motors as well as switch devices and sensors used for operating these are mounted on a vehicle in a manner of being spread over various places. These various kinds of electronic devices are connected to a wire harness for supplying electric power supplied from a battery or the like and providing a control signal or the like used for controlling these electronic devices. The wire harness includes a plurality of electric wires and connectors. Each electric wire includes an electrically conductive core wire and an insulating cover part for covering the core wire. Each connector includes: a terminal metal fitting attached to a terminal end or the like of an electric wire so as to be connected to the core wire; and a connector housing fabricated from insulating resin for accommodating the terminal metal fitting.

In the wire harness wired in a vehicle, the presence or absence of a function caused by a specification difference in the vehicle need be handled. In a wire harness according to the conventional art, in such a case, the handling is achieved by post-attachment of a functional component. Such post-attachment of a functional component is performed by a method that a wire harness is added in correspondence to each function, a method that a wire harness of a function whose mounting probability is high, or the like.

In recent years, as a communication system for controlling a plurality of electronic devices mounted on a vehicle, a multiplex communication system or a vehicle network system is employed in which a plurality of electronic control units for controlling the respective electronic devices are individually connected to a common multiplex communication line and a multiplexed signal is exchanged through the multiplex communication line so that the operation of the individual electronic devices is controlled on the basis of this signal (see, e.g., JP2002-260747A and JP2004-268630A).

When the electronic devices 501, 505 serving as functional components are to be added and connected to a wire harness including the above-mentioned communication system, as shown in FIGS. 30A to 30C, in general, the electronic devices 501, 505 are connected through a harness assembly 503, 507, 509 of diverse kind to an electronic control unit (ECU) 511 for performing electronic control of the electronic devices 501, 505.

For example, as shown in FIG. 30A, the harness assembly 503 to be connected to one electronic device 501 includes an ECU side connector 515 and a device side connector 517 attached to both ends of electric wires 513. The electronic device 501 is connected to the ECU 511.

Further, as shown in FIG. 30B, the harness assembly 507 to be connected to two electronic devices 501, 505 includes a device side connector 517 and a device side connector 521 both wire-connected to an ECU side connector 519. The two electronic devices 501, 505 are connected to the ECU 511.

Further, as shown in FIG. 30C, regardless of the presence or absence of connection to the electronic device 505, the harness assembly 509 to be connected to the electronic device 501 whose mounting probability is high includes a device side connector 517 and a device side connector 521 both wire-connected to an ECU side connector 519. The electronic device 501 is connected to the ECU 511.

Further, when a wire harness including a communication system is to be connected to standard electronic devices 601 and extension electronic devices 605 serving as functional components, as shown in FIG. 31, in general, the standard electronic devices 601 and the extension electronic devices 605 are connected through a harness assembly 603, 607, 609 of diverse kind to a junction box 620 including an electronic control unit (ECU) 611 for performing electronic control of the standard electronic devices 601 and the extension electronic devices 605.

For example, as shown in FIG. 31A, the harness assembly 603 to be connected to two standard electronic devices 601 includes an ECU side connector 615 and standard auxiliary device side connectors 617 attached to both ends of electric wires 613. The two standard electronic devices 601 are connected to the ECU 611 of the junction box 620.

Further, as shown in FIG. 31B, the harness assembly 607 to be connected to two standard electronic devices 601 and two extension electronic devices 605 includes standard auxiliary device side connectors 617 and extension auxiliary device side connectors 621 both wire-connected to an ECU side connector 619. The two standard electronic devices 601 and the extension electronic devices 605 are individually connected to the ECU 611 of the junction box 620.

Further, as shown in FIG. 31C, regardless of the presence or absence of connection to the extension electronic devices 605, the harness assembly 609 to be connected to two standard electronic devices 601 whose mounting probability is high includes standard auxiliary device side connectors 617 and extension auxiliary device side connectors 621 both wire-connected to an ECU side connector 619. The two standard electronic devices 601 are connected to the ECU 611 of the junction box 620.

However, like in the harness assemblies 503, 507, 603, 607 shown in FIGS. 30A to 31B described above, in a case that a harness assembly is added for each device to be added and connected, the number of kinds of the wire harnesses increases. When the number of kinds of the wire harnesses to be assembled increases, assembling work in the assembly line for the wire harness becomes complicated so that the efficiency of the assembling work for the wire harness decreases. Thus, the mass productivity of the wire harness decreases and hence a problem of cost increase is caused in each member component or the wire harness itself.

On the other hand, in the cases of the harness assemblies 509, 609 shown in FIGS. 30C and 31C, a situation (so-called "superfluous attachment") occurs that the device side connectors 521, 621 and the electric wires 513, 613 are wired in the vehicle but not utilized. This causes an increase in uselessness in the wire harness, and hence similarly causes a cost increase in the wire harness.

Further, in general, in a wire harness wired in a vehicle, a plurality of circuit-by-circuit sub harnesses obtained by sub dividing, for example, for each system circuit are combined together so that the entire wire harness is constructed. For example, the system circuits include: standard circuits for electronic devices such as head lamps and wipers indispensable in an automobile; and optional circuits for electronic devices such as security devices and rear fog lamps selected in correspondence to the vehicle type, the grade, or the like. When such a wire harness for automobile is to be fabricated, the configuration of the entire wire harness is determined such as to become appropriate with taking into consideration the arrangement of the connectors, the types of the terminals and the electric wires, and the like.

As such, the wire harness wired in a vehicle is constructed by combining various sub harnesses together in accordance with various electronic devices mounted on the vehicle. Thus, the number of electric wires constituting the entire wire harness increases and the structure also becomes complicated.

Further, when the vehicle type, the grade, the destination, or the like of the vehicle is changed, this causes: the presence or absence of mounting of various optional electronic devices; a difference concerning the site of mounting, a difference in the type of the optional electronic device to be mount; and the like. Thus, in accordance with this, the configuration of the wire harness need be changed appropriately. That is, the presence or absence of each sub harness, the position of arrangement of each sub harness, the length of the electric wires constituting each sub harness, the diameter of the electric wires, the type of the connectors connected to the end parts of the electric wires, and the like need be changed in accordance with the optional electronic devices to be actually mounted.

Thus, various vehicles whose vehicle types, grades, destinations, or the like are different from each other are to be fabricated, in correspondence to the difference in the vehicle type, the grade, the destination, and the like, wire harnesses of various kinds (configurations) are fabricated in advance and appropriate part numbers are assigned to the individual types of the wire harnesses. At the time of mounting the wire harness on a vehicle, in accordance with the vehicle type, the grade, the destination, and the like, a wire harness of the corresponding part number is selected and attached to the vehicle body.

However, when optional electronic devices mounted on a vehicle varies in accordance with a difference in the type, the grade, the destination, or the like of the vehicle, the necessary configuration of the wire harness varies and hence the number of kinds (the number of pieces of part numbers) of the wire harnesses increases. When the number of kinds of the wire harnesses to be assembled increases, assembling work in the assembly line for the wire harness becomes complicated so that the efficiency of the assembling work for the wire harness decreases. Thus, the mass productivity of the wire harness decreases and hence a cost increase is caused in each member component or the wire harness itself.

For example, a wire harness 700 according to the conventional art shown in FIG. 32A is constructed from three sub harnesses A, B, C. In each sub harness A, B, C, the pedestal end (the left end in the figure) is provided with a connector a1, b1, or c1 on the side connected to a control unit (not shown) and the branch end (the right end in the figure) is provided with an auxiliary device side connector a2, b2, c2 to be connected to a connection destination connector provided in a to-be-controlled device (an electronic device) serving as a target controlled by the control unit.

When an optional to-be-controlled device is to be added to the wire harness 700, for example, as shown in FIG. 32B, a wire harness 710 is prepared that includes a sub harness D whose branch line is connected to an auxiliary device side connector c3 to be connected to a connection destination connector of the optional to-be-controlled device.

Nevertheless, like in the wire harnesses 700, 710 shown in FIGS. 32A and 32B described above, in a case that such a sub harness D having an auxiliary device side connector c3 is added for each optional to-be-controlled device to be added and connected, the number of kinds of the wire harnesses increases.

In contrast, in order that the number of kinds of the wire harnesses may be reduced, it is possible that sub harnesses corresponding to the optional electronic devices are incorporated in advance into all wire harnesses of standard configuration. Nevertheless, when the optional electronic devices are not actually mounted on the vehicle, the sub harnesses for the options added to the standard wire harness are not used, that is, in a state of "superfluous attachment". Thus, uselessness increases. This also causes a cost increase in the wire harness. For example, when the wire harness 710 shown in FIG. 32B is employed regardless of the presence or absence of the optional to-be-controlled device so that the number of kinds of the wire harnesses is reduced, "superfluous attachment" of the auxiliary device side connector c3 occurs.

Further, electric source power need be supplied from a battery or the like serving as the main power supply of the vehicle, to the individual electronic devices in the downstream. Thus, in many cases, a connection box or an electric power distribution box is arranged between the main power supply and the wire harness. In such a connection box or an electric power distribution box, the electric power to be supplied is distributed to a plurality of systems in accordance with the number of electronic devices connected in the downstream of the wire harness. Further, when the load current becomes excessive in each output system, a fuse is disconnected so as to cut off the supply of electric power so that each circuit is protected.

Thus, when optional electronic devices mounted on a vehicle varies in accordance with a difference in the type, the grade, the destination, or the like of the vehicle, the configuration of the inside of the electric power distribution box also need be changed in addition to the configuration of the wire harness. In part, in a case that a large number of optional electronic devices are allowed to be connected, the electric currents of a large number of the optional electronic devices need be allowed to be managed individually and hence a space sufficient for arrangement of a large number of fuses need be ensured in the inside of the electric power distribution box. Thus, when the optional electronic devices are not actually connected in the vehicle, uselessness occurs in the space ensured in the electric power distribution box. That is, the electric power distribution box occupies a space larger than the necessity.

SUMMARY

Illustrative aspects of the present invention provide a vehicle harness structure and an additional connection member that can reduce part numbers of wire harnesses and avoid superfluous attachment in a wire harness.

According to an illustrative aspect of the present invention, a vehicle harness structure includes a wire harness configured to interconnect a plurality of main devices to be mounted in common on target vehicles, at least one additional connection member having one end connected in a branched manner to at least one of a communication line and a signal line of the wire harness and another end connected to at least one auxiliary device to be optionally post-mounted on the target vehicles, and a control function section provided in the additional connection member to control the auxiliary device.

According to another illustrative aspect of the present invention, an additional connection member comprises one end having a harness branching connection mechanism configured to connect the one end in a branched manner to at least one of a communication line and a signal line of a wire harness interconnecting a plurality of main devices to be mounted in common on target vehicles, and another end having an auxiliary device connection mechanism configured to connect the other end to an auxiliary device to be optionally post-mounted on the target vehicle. A control function section configured to control the auxiliary device is provided in at least one of the harness branching connection mechanism and the auxiliary device connection mechanism.

Other aspects and advantages of the invention will be apparent from the following description, the drawings and the claims.

BRIEF DESCRIPTION OF THE DRAWINGS

FIGS. 3A to 3C are plan views each showing an additional connection member including a harness branching connection mechanism provided with a control function section; FIG. 3A shows an additional connection member in which a basic harness side end and an auxiliary device side end of an additional harness are connected respectively to a basic harness side connector and an auxiliary device side connector; FIG. 3B shows an additional connection member in which a basic harness side end of an additional harness is directly connected to a harness branching connection mechanism; and FIG. 3C shows an additional connection member in which a basic harness side end and an auxiliary device side end of an additional harness are directly connected to a harness branching connection mechanism and an auxiliary device.

FIGS. 4A to 4C are plan view each showing an additional connection member in which an auxiliary device side end is provided with a control function section; FIG. 4A shows an additional connection member in which a basic harness side end of an additional harness is directly connected to a harness branching connection mechanism; FIG. 4B shows an additional connection member connected to an auxiliary device provided with a control function section; and FIG. 4C shows an additional connection member in which an auxiliary device side end of an additional harness is directly connected to an auxiliary device.

FIGS. 12A to 12C are plan views each showing a branch line harness; FIG. 12A shows a branch line harness in which a main line harness side end and an electronic device side end of electric wires are connected respectively to a main line harness side connector and an auxiliary device side connector; FIG. 12B shows a branch line harness in which a main line harness side end of electric wires is directly connected to a harness branching connection mechanism; and FIG. 12C shows a branch line harness in which a main line harness side end and an electronic device side end of electric wires are directly connected to a harness branching connection mechanism and an electronic device.

FIG. 17A shows an additional connection member in which an extension harness side end and an extension electronic device side end of electric wires are connected respectively to an extension harness side connector and an auxiliary device side connector; FIG. 17B shows an additional connection member in which an extension harness side end of electric wires is directly connected to a harness branching connection mechanism; and FIG. 17C shows an additional connection member in which an extension harness side end and an extension electronic device side end of electric wires are directly connected to a harness branching connection mechanism and an extension electronic device.

FIG. 22 is a schematic diagram showing an example of an over-current threshold table.

FIG. 32A is a schematic diagram showing an example of a wire harness according to the conventional art and FIG. 32B is a schematic diagram showing another example of a wire harness according to the conventional art.

DETAILED DESCRIPTION

Figure 1:
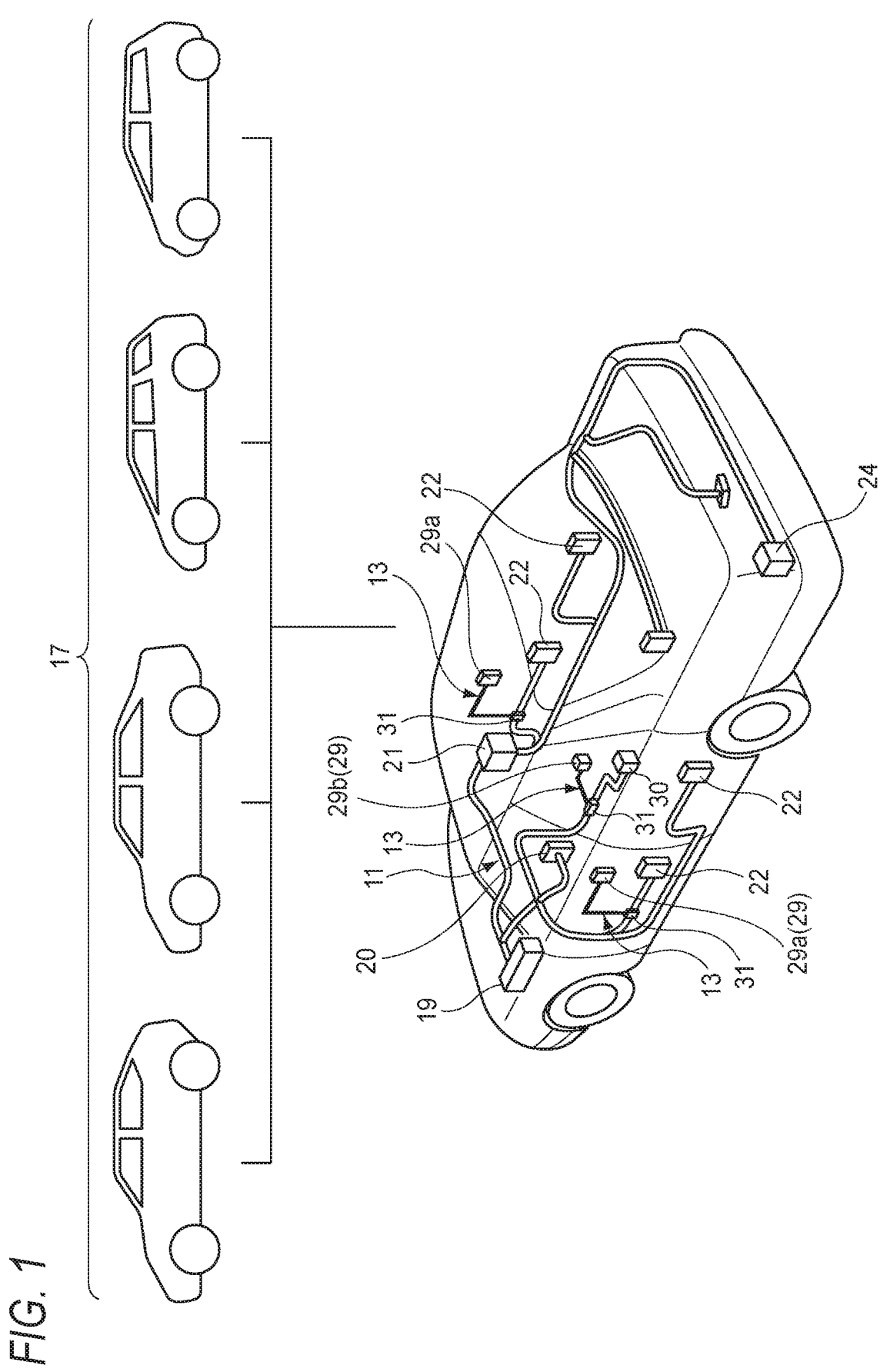
FIG. 1 is a conceptual diagram of a vehicle harness structure according to an embodiment of the present invention.
Figure 2D:
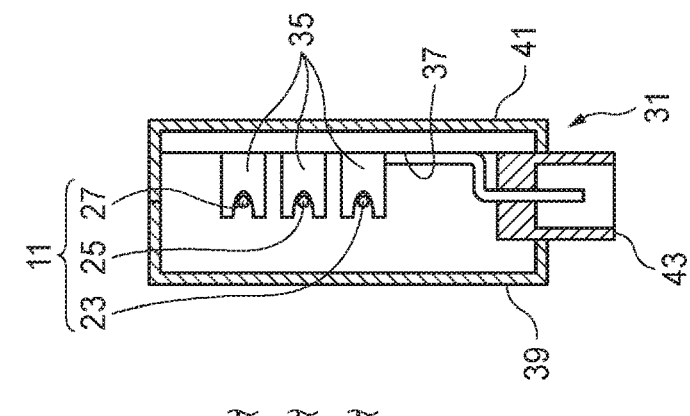
FIG. 2D is a sectional view of a harness branching connection mechanism shown in FIG. 2A, taken along line II-II.
Figure 2B:
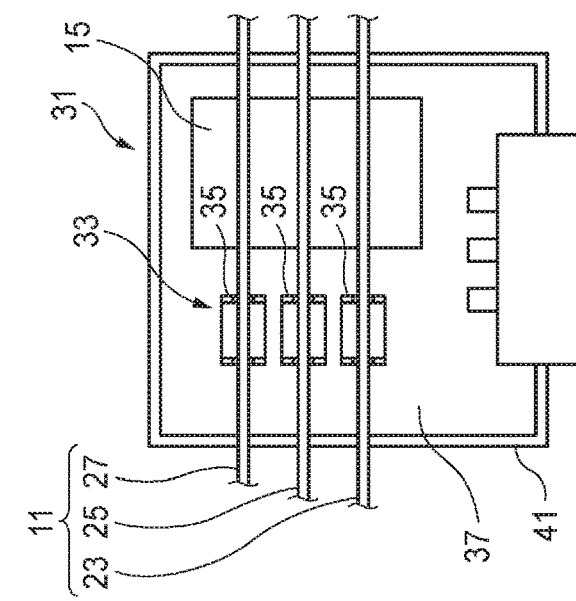
FIG. 2B is a plan view of a situation that an upper case of a harness branching connection mechanism shown in FIG. 2A is opened.
Figure 2C:
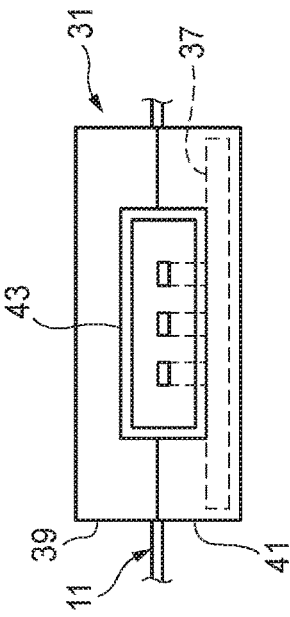
FIG. 2C is a front view of a harness branching connection mechanism shown in FIG. 2A.
Figure 2A:
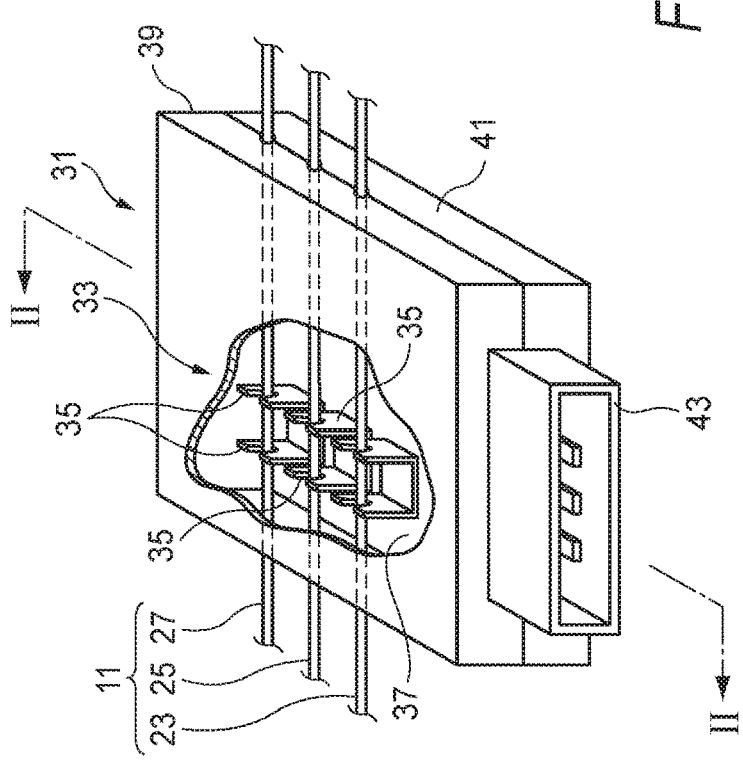
FIG. 2A a partly cutaway perspective view of a harness branching connection mechanism employed in a vehicle harness structure according to an embodiment of the present invention.

Embodiments of the present invention will described below with reference to the drawings.

According to an embodiment of the present invention, a vehicle harness structure includes: a basic harness for interconnecting a plurality of main devices to be mounted in common on target vehicles; an additional connection member provided with one end connected in a branched manner to at least one of a communication line and a signal line of the basic harness and with the other end connected to at least one auxiliary device to be optionally post-mounted on the target vehicles; and a control function section provided in the additional connection member to control the auxiliary device.

The scope of the "basic harness" in the present specification includes: one kind of the basic harness corresponding to one type of target vehicle; plural kinds of the basic harnesses corresponding to different grades or the like of one type of target vehicle; and one kind of the basic harness corresponding to plural types of target vehicles.

According to the vehicle harness structure, the basic harness mounted in common on target vehicles is unified and, at the same time, an auxiliary device selectively to be attached to the target vehicle is post-attached through the additional connection member whose one end is connected in a branched manner to at least one of the communication line and the signal line of the basic harness. Thus, superfluous attachment of a member component does not occur in the basic harness.

Further, in the additional connection member, an auxiliary device to be optionally post-mounted on the target vehicle can be added and connected to an optional position of the basic harness. The post-attachment of the auxiliary device by using the additional connection member can be applied to the vehicle harness at the time of manufacture as well as to the basic harness of the vehicle harness wired in a completed vehicle. That is, in accordance with addition of an auxiliary device (an optional device) desired by the user (the vehicle purchaser), a wire harness corresponding to a plurality of vehicle patterns can easily be constructed. Even in such cases, superfluous attachment of a member component (a circuit member or the like) does not occur.

Further, the additional connection members in a number corresponding to the number of auxiliary devices attached to the target vehicle are connected in a branched manner to the basic harness. Thus, superfluous attachment of a member component does not occur in the entirety of the vehicle harness structure.

Further, in the vehicle harness structure according to the conventional art, when the number of electronic devices (auxiliary devices) increases, the number of combinations of attachment of the electronic devices increases so that the overall number of kinds of the wire harnesses increases. In contrast, in the vehicle harness structure having the above-mentioned configuration, it is sufficient that the additional connection members in the number of kinds corresponding to the auxiliary devices are solely prepared. This simplifies management of the manufacturing parts and hence reduces the manufacturing cost of the wire harness.

Further, in a case that the additional connection member includes a control function section, the function of the auxiliary device can easily be improved even when the auxiliary device post-mounted on the basic harness does not include the control function section.

For example, in a case that a fuse function is incorporated as the above-mentioned control function section, direct connection to the basic harness or simultaneous mounting of a plurality of auxiliary devices is allowed. This permits post-attachment (so-called "instant attachment") of a function or reduction of the number of systems in the basic harness and in the communication line or the signal line.

Further, for example, when a microcomputer is incorporated as the above-mentioned control function section, control of switch input, sensor input, pulse width modulation (PWM) output, or the like of the auxiliary device can easily be handled. Such control of the auxiliary device is performed by the microcomputer. Thus, specification change or the like can easily be handled by software.

The control function section may include a signal generating section configured to receive a signal through the communication line and to generate a control signal for controlling the operation of the auxiliary device. According to this configuration, the operation of the auxiliary device post-attached through the additional connection member to the basic harness can be controlled.

The at least one additional connection member may include a first additional connection member configured to be connected to a first auxiliary device and a second additional connection member configured to be connected to a second auxiliary device, and a control function section provided in the second additional connection member including a signal conversion section configured to receive information (e.g., a sensor signal or switching operation) from the second auxiliary device to generate a control signal for controlling the operation of the first auxiliary device, and to convert the information into the control signal. According to this configuration, for example, when a sensor or a mechanical switch is employed as the second auxiliary device, a sensor mechanism or a switch mechanism for operating the first auxiliary device can be added and connected to an optional position of the basic harness.

The vehicle harness structure may further include a pressure contact part connected to the conductor of the additional connection member and connected in a pressed manner to the conductor of the basic harness. In this case, the pressure contact part and the control function section form a harness branching connection mechanism configured to connect the basic harness and the additional connection member to each other. According to this configuration, in the additional connection member for connecting the basic harness to the auxiliary device, a harness branching connection mechanism including a control function section is provided in a connection part leading to the basic harness. When attaching the harness branching connection mechanism to the basic harness, the pressure contact part cuts through the insulating cover that covers the conductor of at least one of the communication line and the signal line of the basic harness so that the pressure contact part is connected to the conductor. Thus, when attaching the harness branching connection mechanism to the basic harness, the connection between the basic harness and the auxiliary device is made in a simple manner.

The power line of the additional harness of the additional connection member may include one end connected in a branched manner to a power line of another harness other than the basic harness, and another end configured to be connected to the auxiliary device. According to this configuration, in a case that the basic harness wired in the immediate vicinity of the auxiliary device to be post-attached includes a communication line or a signal line alone or, alternatively, in a case that the electric power capacity of the power line in the basic harness is not sufficient, when the power line of the additional connection member is connected in a branched manner to the power line of the other harness wired in the vicinity of the auxiliary device, power supply for the auxiliary device can simply be obtained. That is, a new power line for the auxiliary device need not be wired from the basic harness. This permits reduction of the number of systems in the power line.

According to the embodiment of the present invention, the additional connection member has one end including a harness branching connection mechanism configured to connect the one end in a branched manner to at least one of a communication line and a signal line of a basic harness for interconnecting a plurality of main devices to be mounted in common on target vehicles, and the other end having an auxiliary device connection mechanism configured to connect the other end to an auxiliary device to be optionally post-mounted on the target vehicle. A control function section configured to control the auxiliary device is provided in at least one of the harness branching connection mechanism and the auxiliary device connection mechanism.

According to this configuration, an auxiliary device selectively attached to the target vehicle can be post-mounted on the basic harness. One end of the additional connection member is connected through the harness branching connection mechanism to the basic harness, and the other end of the additional connection member is connected through the auxiliary device connection mechanism to the auxiliary device. Further, the additional connection members in a number corresponding to the number of auxiliary devices attached to the target vehicle are connected in a branched manner to the basic harness. Thus, superfluous attachment of a member component does not occur in the entirety of the vehicle harness structure.

In the additional connection member, since at least one of the harness branching connection mechanism and the auxiliary device connection mechanism includes the control function section, the function of the auxiliary device can easily be improved even when the auxiliary device post-mounted on the basic harness does not include the control function section.

For example, in a case that a fuse function is incorporated as the control function section, direct connection to the basic harness or simultaneous mounting of a plurality of auxiliary devices is allowed. This permits post-attachment (so-called "instant attachment") of a function or reduction of the number of systems in the basic harness and in the communication line or the signal line.

Further, for example, when a microcomputer is incorporated as the control function section, control of switch input, sensor input, PWM output, or the like of the auxiliary device can easily be handled. Such control of the auxiliary device is performed by the microcomputer. Thus, specification change or the like can easily be handled by software.

The additional connection member may further include a pressure contact part connected to the conductor of the additional connection member and connected in a pressed manner to the conductor of the basic harness. In this case, the pressure contact part and the control function section form a harness branching connection mechanism. According to this configuration, when attaching the harness branching connection mechanism to the basic harness, the pressure contact part cuts through the insulating cover that covers the conductor of at least one of the communication line and the signal line of the basic harness so that the pressure contact part is connected to the conductor. Thus, when the harness branching connection mechanism is merely attached to the basic harness, connection of the additional connection member to the basic harness is simply completed. Further, in the additional connection member, the control function section is provided in the harness branching connection mechanism. Thus, when the additional connection member is merely attached to the basic harness, easy mounting of the auxiliary device can be achieved. This permits post-attachment (instant attachment) of the function of an auxiliary device or reduction of the number of systems in the basic harness and in the communication line or the signal line.

The additional connection member may include an additional harness, a basic harness side connector connected to the harness branching connection mechanism at an end of the additional harness on a side of the basic harness, and an auxiliary device side connector configured to be connected to the auxiliary device at another end of the additional harness on a side of the auxiliary device. According to this configuration, the basic harness side connector is linked and connected to the counterpart connector provided in the harness branching connection mechanism. That is, the additional connection member can connect the auxiliary device to the basic harness through the additional harness having a desired length. This permits mounting in accordance with the position of the auxiliary device. Thus, the additional connection member can easily handle a vehicle type difference, a destination difference, and a specification difference (and hence realizes free mounting).

FIG. 1 is a conceptual diagram of a vehicle harness structure according to an embodiment of the present invention. The vehicle harness structure of the present embodiment includes a basic harness 11, an additional connection member 13, and a control function section 15 (see FIGS. 3A to 3C).

As shown in FIG. 1, the basic harness 11 is a wire harness for interconnecting a plurality of main devices (e.g., a junction box 19, an air-conditioner unit 20, an engine control unit 21, a power window unit 22, a rear combination lamp unit 24, and a power seat unit 30) mounted in common on target vehicles 17. The basic harness 11 illustrated in FIGS. 2A to 2D is an electric wire bundle basically including three kinds of electric wires, namely, a power line 23, a communication line 25, and a ground line 27. The basic harness may also include another electric wire such as a signal line 28 in addition to the three kinds, i.e., the power line 23, the communication line 25, and the ground line 27.

Further, the basic harness is not limited to one kind of the basic harness 11 corresponding to plural types of the target vehicles 17 shown in FIG. 1 and may be one kind of the basic harness corresponding to one type of the target vehicle or, alternatively, plural kinds of the basic harnesses corresponding to different grades or the like (e.g., a destination difference and a specification difference) of one type of the target vehicle.

An auxiliary device 29 (e.g., a centralized door lock unit 29a or a seat heater unit 29b) optionally post-mounted on the target vehicle 17 is post-attached through the additional connection member 13 to the basic harness 11. As shown in FIG. 3A, the additional connection member 13 includes: one end connected in a branched manner through the harness branching connection mechanism 31 to the basic harness 11; and the other end connected through the auxiliary device connection mechanism 61 to the auxiliary device 29. The method of post-attachment used for post-attaching the auxiliary device 29 through the additional connection member 13 to the basic harness 11 may be optional one such as "pressure contact", "bonding" or "welding" as long as the method permits branching connection to at least one of the communication line 25 and the signal line 28 of the basic harness 11. The present embodiment is described below for an example that the additional connection member 13 is connected in a branched manner through a harness branching connection mechanism 31 described later to the power line 23, the communication line 25, and the ground line 27 of the basic harness 11.

The additional connection member 13 is provided with the control function section 15 described above. In the present embodiment, the control function section 15 including a signal generating section configured to a signal through the communication line 25 and to generate a control signal for controlling the operation of the auxiliary device 29 is an electronic control unit (ECU) configured to electronically control the auxiliary device 29. The control function section 15 is provided in the additional connection member 13 to control the operation of the auxiliary device 29. More specifically, the control function section 15 is configured such that a "microcomputer", a "semiconductor fuse", and a "communication transceiver" are mounted on a circuit board, a circuit member constructed from a bus bar, or the like.

As shown in FIGS. 2A to 2D, one end of the additional connection member 13 is connected in a branched manner through the harness branching connection mechanism 31 to an optional position of the basic harness 11. The harness branching connection mechanism 31 includes a pressure contact part 33 connected to the conductor of the additional connection member 13 and connected in a pressed manner to the conductor of the basic harness 11. For example, the pressure contact part 33 is configured such that a plurality of pairs of pressure contact blades 35 extend upward, and connected to a circuit on the circuit board 37. The circuit board 37 is accommodated in a case constructed from an upper case 39 and a lower case 41 fabricated from insulating resin. For example, the upper case 39 and the lower case 41 are joined to each other by a thin hinge (not shown) in a manner of permitting free opening and closing.

In the harness branching connection mechanism 31, the upper case 39 and the lower case 41 pinch the power line 23, the communication line 25, and the ground line 27 of the basic harness 11 so that the pressure contact blades 35 cut through the insulating cover of each line so that the pressure contact part 33 is connected in a pressed manner to the conductor of each line. The harness branching connection mechanism 31 pinching the power line 23, the communication line 25, and the ground line 27 of the basic harness 11 is fixed at an optional position of the basic harness 11 when the upper case 39 and the lower case 41 are locked together. That is, according to the vehicle harness structure of the present embodiment, when the harness branching connection mechanism 31 is merely attached to an optional position of the basic harness 11, connection between the basic harness 11 and the auxiliary device 29 is simply completed. Here, when the ground line of the auxiliary device 29 is body-grounded, the ground line 27 of the basic harness 11 need not be connected in a branched manner by the additional connection member 13.

The circuit board 37 of the harness branching connection mechanism 31 is provided with the above-mentioned control function section 15. The circuit of the harness branching connection mechanism 31 connected to the basic harness 11 or the control function section 15 is connected to the outside through a board mounted connector 43 provided in the circuit board 37.

Further, the additional connection member 13 includes one end having the harness branching connection mechanism 31 configured to connect the one end in a branched manner to the power line 23, the communication line 25, and the ground line 27 of the basic harness 11, and the other end having an auxiliary device connection mechanism 61 configured to connect the other end to an auxiliary device 29 optionally post-mounted on the target vehicle 17. More specifically, as shown in FIG. 3A, the additional connection member 13 includes an additional harness 55, a basic harness side connector 47 (a wire harness side connector) connected to the harness branching connection mechanism 31 at the end of the additional harness 55 on the basic harness side, and an auxiliary device side connector 51 configured to be connected to the auxiliary device 29 at the other end of the additional harness 55 on the auxiliary device side. The additional connection member 13 is connected to the auxiliary device connection mechanism 61 including an auxiliary device side connector 51 and a connector 63 of the auxiliary device 29. The basic harness side connector 47 is connected to a board mounted connector 43 of the harness branching connection mechanism 31. That is, the additional connection member 13 of the present embodiment can connect the auxiliary device 29 to the basic harness 11 through the additional harness 55 having a simple structure and a desired length. This permits mounting in accordance with the position of the auxiliary device 29 and hence compatibility is improved.

The additional connection member according to the present invention is not limited to the additional connection member 13 of the embodiment given above and may be in various modes.

For example, in an additional connection member 13A shown in FIG. 3B, the end of the additional harness 55 on the basic harness side is directly connected to the control function section 15 of the harness branching connection mechanism 31, and the auxiliary device side connector 51 is connector-linked to the connector 63 of the auxiliary device 29.

Further, in an additional connection member 13B shown in FIG. 3C, the end of the additional harness 55 on the basic harness side is directly connected to the control function section 15 of the harness branching connection mechanism 31, and the other end of the additional harness 55 on the auxiliary device side is directly connected to the circuit of the auxiliary device 29 so that integration with the auxiliary device 29 is achieved. The basic harness side connector 47 provided at the end of the additional harness 55 on the basic harness side may be configured to be connected to a board mounted connector 43 of the harness branching connection mechanism 31 (see FIG. 3A).

Further, like in additional connection members 13C, 13D, and 13E shown in FIGS. 4A to 4C, a control function section 15A configured to control the operation of the auxiliary device 29 may be provide at the end of the additional harness 55 on the auxiliary device side. In the additional connection member 13C shown in FIG. 4A, the end of the additional harness 55 on the basic harness side is connected in a pressed manner to the pressure contact blades 35 of the pressure contact part 33 of the harness branching connection mechanism 31A, and the auxiliary device side connector 51A is wire-connected to the connector 63 of the auxiliary device 29. The auxiliary device side connector 51A is provided with the control function section 15A.

As described above, the additional connection member 13, 13A, 13B, 13C includes the control function section 15, 15A. Thus, the function of the control function section 15, 15A can easily be added to the auxiliary device 29 not including the control function section. For example, even in a case that the auxiliary device 29 is the simple seat heater unit 29*b*, when the control function section 15, 15A is added, fine temperature control of the seat heater can be performed.

In the additional connection member 13D shown in FIG. 4B, the end of the additional harness 55 on the basic harness side is connected in a pressed manner to the pressure contact blades 35 of the pressure contact part 33 of the harness branching connection mechanism 31A, and the auxiliary device side connector 51A is connector-linked to the connector 63 of the auxiliary device 29A including a control function section 15B. The auxiliary device side connector 51A is provided with the control function section 15A. In the additional connection member 13D, when the auxiliary device side connector 51A including the control function section 15A is connected to the auxiliary device 29A including the control function section 15B, the function of the control function section 15A can be added further in addition to the function of the control function section 15B. This remarkably enhances the function of the auxiliary device 29A.

In the additional connection member 13E shown in FIG. 4C, the end of the additional harness 55 on the basic harness side is connected in a pressed manner to the pressure contact blades 35 of the pressure contact part 33 of the harness branching connection mechanism 31A, and the control function section 15A provided at the end of the additional harness 55 on the auxiliary device side is directly connected to the auxiliary device 29 so that integration with the auxiliary device 29 is achieved. The basic harness side connector 47 provided at the basic harness side end of the additional harness 55 of the additional connection member 13C to 13E described above may be configured to be connected to a board mounted connector 43 of the harness branching connection mechanism 31 (see FIG. 3A).

Figure 5:
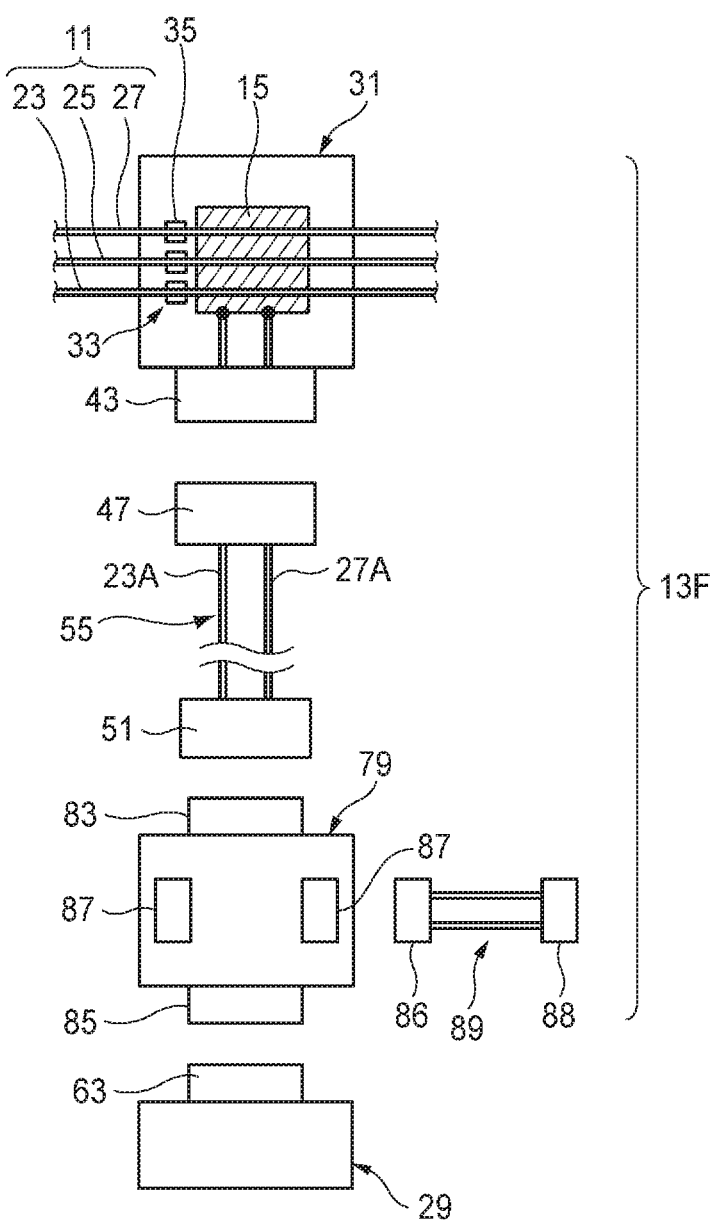
FIG. 5 is a plan view of an additional connection member in which a branch connector is connected to a location leading to an auxiliary device.

In the additional connection member 13F shown in FIG. 5, a branch connector 79 is connected to a location leading to the auxiliary device 29. In the additional connection member 13F, the branch connector 79 is connected to the auxiliary device side connector 51. The branch connector 79 is provided with a plurality (four, in the example shown in the figure) of connection parts. The first connection part 83 of the branch connector 79 is connected to the auxiliary device side connector 51 of the additional harness 55. The second connection part 85 of the branch connector 79 is connected to the connector 63 of the auxiliary device 29. One of the third connection parts 87 of the branch connector 79 is connected to the connector 86 of another additional harness 89. Thus, in the branch connector 79, in addition to the auxiliary device 29, another auxiliary device 29 can further be connected in a branched manner through the connector 88 of the another additional harness 89. The additional harness 55 in the additional connection member 13F described above may be configured such that the basic harness side end is directly connected to the control function section 15 of the harness branching connection mechanism 31, and the auxiliary device side end is directly connected to the circuit of the branch connector 79. Further, the control function section 15 may be provided in the auxiliary device side connector 51 or the branch connector 79 located at the end of the additional harness 55 on the auxiliary device side.

In the additional harness 55 of each additional connection member 13, 13A to 13F described above, the functions of the electric wires vary depending on the type (whether the control function section is provided or the like) of the auxiliary device 29. For example, as shown in FIGS. 3A to 3C, when the control function section 15 is provided at the end of the additional harness 55 on the basic harness side, the additional harness 55 includes the power line 23A and the ground line 27A. As shown in FIGS. 4A to 4C, when the control function section 15A is provided at the end of the additional harness 55 on the auxiliary device side, the additional harness 55 includes the power line 23A, the communication line 25A, and the ground line 27A.

Figure 6:
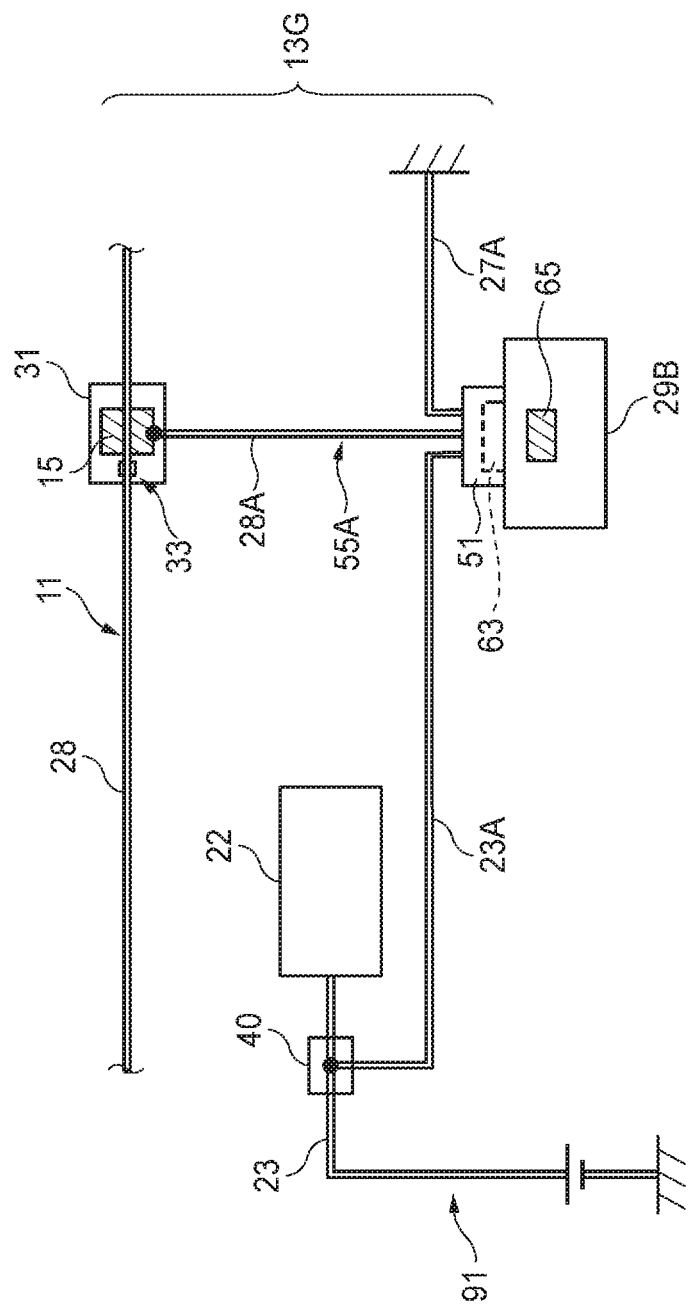
FIG. 6 is a plan view of a vehicle harness structure according to another embodiment of the present invention.

As shown in FIG. 6, an additional connection member 13G of the vehicle harness structure according to another embodiment of the present invention includes an additional harness 55A having a power line 23A, a ground line 27A and a signal line 28A, an auxiliary device side connector 51 connected to the end of the additional harness 55A on the auxiliary device side, and a harness branching connection mechanism 31 connected to the end of the signal line 28A on the basic harness side. The auxiliary device side connector 51 of the additional harness 55A is connector-linked to a connector 63 of an auxiliary device 29B including a switch function section 65 configured to receive an ON/OFF signal to perform switching. One end of the signal line 28A of the additional harness 55A is connected in a branched manner through the harness branching connection mechanism 31 to the signal line 28 of the basic harness 11. One end of the power line 23A is connected in a branched manner through a pressure contact joint 40 to the power line 23 of another harness 91 other than the basic harness 11. Further, one end of the ground line 27A of the additional harness 55A is body-grounded.

Figure 7:
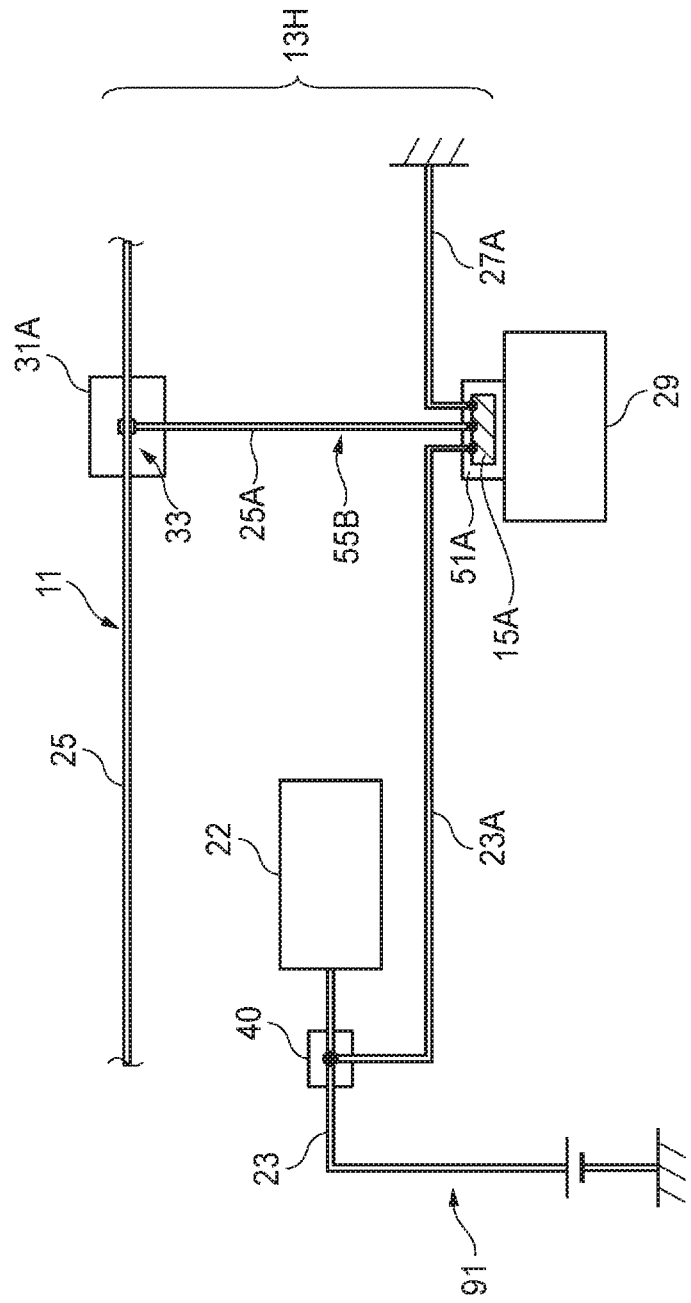
FIG. 7 is a plan view of a vehicle harness structure according to another embodiment of the present invention.

Further, the additional connection member 13H shown in FIG. 7 includes an additional harness 55B having a power line 23A, a communication line 25A, and a ground line 27A, an auxiliary device side connector 51A connected to the end of the additional harness 55B on the auxiliary device side, and a harness branching connection mechanism 31A connected to the end of the communication line 25A on the basic harness side. The auxiliary device side connector 51A connector-linked to the auxiliary device 29 includes the control function section 15A. One end of the communication line 25A of the additional harness 55B is connected in a branched manner through the harness branching connection mechanism 31A to the communication line 25 of the basic harness 11. One end of the power line 23A is connected in a branched manner through a pressure contact joint 40 to the power line 23 of the harness 91 other than the basic harness 11. Further, one end of the ground line 27A of the additional harness 55B is body-grounded.

That is, as shown in FIGS. 6 and 7, in a case that the basic harness 11 wired in the immediate vicinity of the auxiliary device 29B or the auxiliary device 29 to be post-attached includes the signal line 28 or the communication line 25 alone or, alternatively, in a case that the electric power capacity of the power line 23 in the basic harness 11 is not sufficient, in some cases, electric power cannot be supplied from the basic harness 11 to the auxiliary device 29B or the auxiliary device 29. In such cases, when the power line 23A is connected in a branched manner through the additional connection member 13G or the additional connection member 13H to the power line 23 of the other harness 91 wired in the vicinity of the auxiliary device 29B or the auxiliary device 29, power supply for the auxiliary device 29B or the auxiliary device 29 can simply be obtained. Here, for example, when the auxiliary device 29B or the auxiliary device 29 is a centralized door lock unit 29a, the harness 91 may be a harness connected to the power window unit 22.

Figure 8:
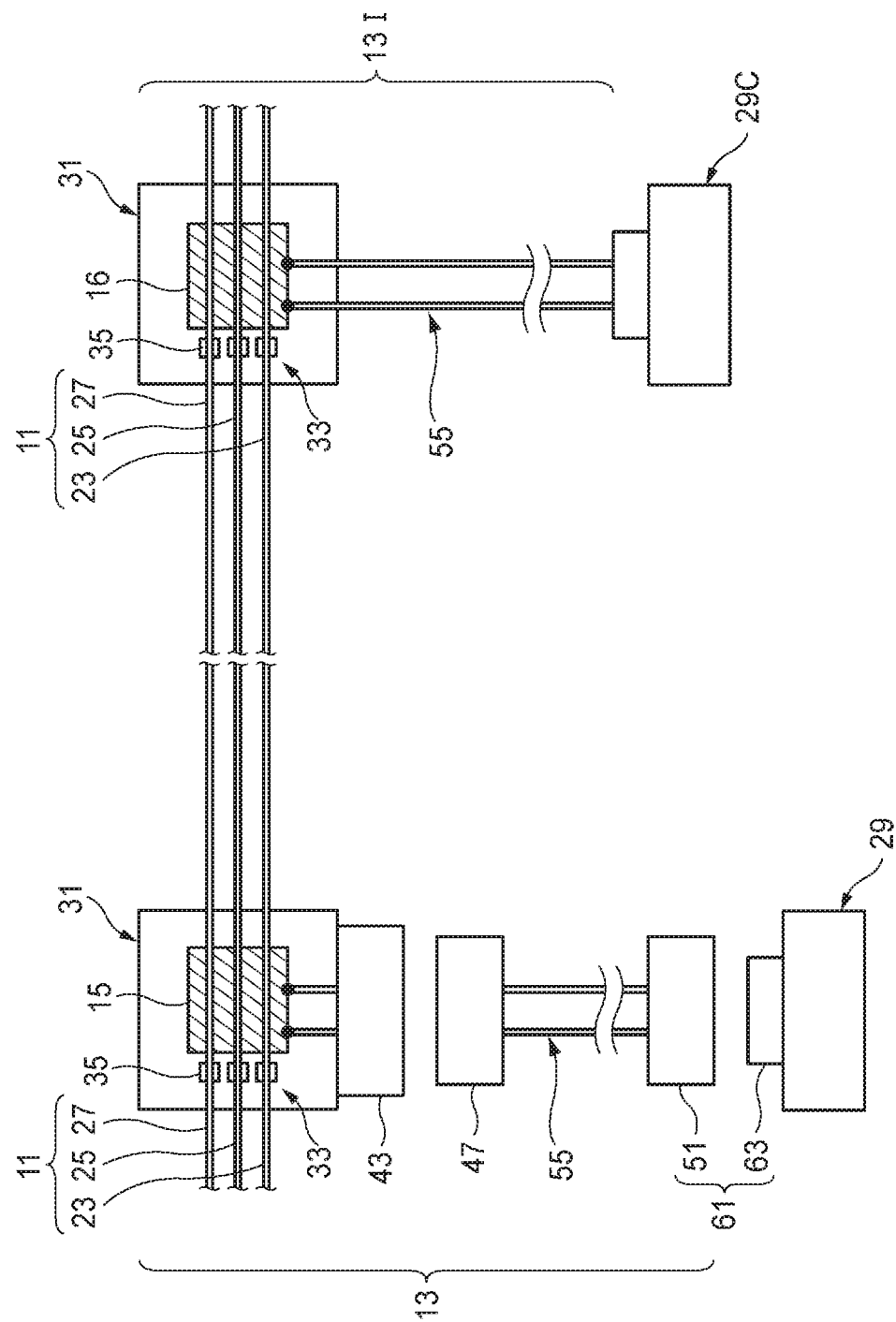
FIG. 8 is a plan view of a vehicle harness structure according to another embodiment of the present invention.

As shown in FIG. 8, in a vehicle harness structure according to another embodiment of the present invention, the auxiliary device 29 (the first auxiliary device) and the auxiliary device 29C (the second auxiliary device) are respectively post-attached through the additional connection member 13 (the first additional connection member) and the additional connection member 13I (the second additional connection member) to the basic harness 11. To generate a control signal for controlling the operation of the auxiliary device 29 connected to the additional connection member 13, the control function section 16 of the additional connection member 13I includes a signal conversion section configured to receive information (an ON/OFF signal generated by switching operation) from the auxiliary device 29C (e.g., a mechanical switch) connected to the additional connection member 13I and to convert the information into the control signal. Thus, when a mechanical switch is employed as the auxiliary device 29C, a switch mechanism for operating the auxiliary device 29 post-mounted on the basic harness 11 can be added and connected to an optional position of the basic harness 11 (e.g., in the vicinity of an instrument panel).

Next, operational effects of the vehicle harness structure having the above-mentioned configuration are described below.

In the vehicle harness structure of the present embodiment given above, the basic harness 11 mounted in common on target vehicles 17 is unified and, at the same time, the auxiliary device 29 (29A, 29B, 29C) selectively attached to the target vehicle 17 is post-attached through the additional connection member 13 (13A to 13I) whose one end is connected in a branched manner to at least one of the communication line 25 and the signal line 28 of the basic harness 11. Thus, superfluous attachment of a member component does not occur in the basic harness 11.

Further, in the additional connection member 13 (13A to 13I), an auxiliary device 29 (29A to 29C) optionally post-mounted on the target vehicle 17 can be added and connected to an optional position of the basic harness 11. The post-attachment of the auxiliary device 29 (29A to 29C) by using the additional connection member 13 (13A to 13I) can be applied to the vehicle harness at the time of manufacture as well as to the basic harness 11 of the vehicle harness wired in a completed vehicle. That is, in accordance with addition of an auxiliary device 29 (29A to 29C) desired by the user (the vehicle purchaser), a wire harness corresponding to a plurality of vehicle patterns can easily be constructed. Even in such cases, superfluous attachment of a member component does not occur.

Further, the additional connection members 13 (13A to 13I) in a number corresponding to the number of auxiliary device 29 (29A to 29C) attached to the target vehicle 17 are connected in a branched manner to the basic harness 11. Thus, superfluous attachment of a member component does not occur in the entirety of the vehicle harness structure.

Further, in the vehicle harness structure according to the conventional art, when the number of electronic devices (auxiliary devices) increases, the number of combinations of attachment of the electronic devices increases so that the overall number of kinds of the wire harnesses increases. In contrast, in the vehicle harness structure having the configuration of the present embodiment, it is sufficient that the additional connection members 13 (13A to 13I) in the number of kinds corresponding to the auxiliary device 29 (29A to 29C) are solely prepared. This simplifies management of the manufacturing parts and hence reduces the manufacturing cost of the wire harness.

Further, in a case that the additional connection member 13 (13A to 13H) includes the control function section 15 (15A), the function of the auxiliary device 29 can easily be improved even when the auxiliary device 29 post-mounted on the basic harness 11 does not include the control function section 15B.

Further, since the control function section 15 (15A) includes the signal generating section configured to receive a signal through the communication line 25 and to control the operation of the auxiliary device 29 (29A), the operation of the auxiliary device 29 (29A) post-attached through the additional connection member 13 (13A to 13H) to the basic harness 11 can be controlled.

In the vehicle harness structure of the present embodiment shown in FIGS. 3A to 3C, the basic harness 11 and the auxiliary device 29 is connected to each other through the additional connection member 13 (13A, 13B). In the additional connection member 13 (13A, 13B), the harness branching connection mechanism 31 including the control function section 15 is provided in a connection part leading to the basic harness 11. When attaching the harness branching connection mechanism 31 to the basic harness 11, the pressure contact part 33 cuts through the insulating cover that covers the conductor of each of the power line 23, the communication line 25, and the ground line 27 of the basic harness 11, and the pressure contact part 33 is connected to each conductor. Thus, when attaching the harness branching connection mechanism 31 to the basic harness 11, the connection between the basic harness 11 and the auxiliary device 29 is made in a simple manner.

In the vehicle harness structure of the present embodiment shown in FIG. 3A, the additional connection member 13 includes the additional harness 55 whose one end is provided with the basic harness side connector 47 and the other end is provided with the auxiliary device side connector 51. The basic harness side connector 47 is linked and connected to the board mounted connector 43 serving as a counterpart connector provided in the harness branching connection mechanism 31. That is, the additional connection member 13 can connect the auxiliary device 29 to the basic harness 11 through the additional harness 55 having a desired length. This permits mounting in accordance with the position of the auxiliary device 29. Thus, the additional connection member 13 for connecting the basic harness 11 to the auxiliary device 29 can easily handle a vehicle type difference, a destination difference, and a specification difference (and hence realizes free mounting).

When a fuse function is incorporated as the control function section 15, direct connection to the basic harness 11 or simultaneous mounting of a plurality of auxiliary devices 29 is allowed. This permits post-attachment (instant attachment) of a function or reduction of the number of systems in the basic harness 11 and the communication line 25.

Further, when a microcomputer is incorporated as the above-mentioned control function section 15, control of switch input, sensor input, PWM output, or the like of the auxiliary device 29 can easily be handled. Such control of the auxiliary device 29 is performed by the microcomputer. Thus, specification change or the like can easily be handled by software.

In the vehicle harness structure of the present embodiment shown in FIGS. 6 and 7, in a case that the basic harness 11 wired in the immediate vicinity of the auxiliary device 29B or the auxiliary device 29 to be post-attached includes the signal line 28 or the communication line 25 alone or, alternatively, in a case that the electric power capacity of the power line 23 in the basic harness 11 is not sufficient, when the power line 23A of the additional connection member 13G or the additional connection member 13H is connected in a branched manner to the power line 23 of the other harness 91 wired in the vicinity of the auxiliary device 29B or the auxiliary device 29, power supply for the auxiliary device 29B or the auxiliary device 29 can simply be obtained. This avoids the necessity of wiring a new power line for the auxiliary device 29B or the auxiliary device 29. Thus, reduction of the number of systems in the power line is achieved.

In the vehicle harness structure of the present embodiment shown in FIG. 8, the control function section 16 of the one additional connection member 13I among the additional connection members 13 and 13I includes the signal conversion section configured to receive information (e.g., a sensor signal or switching operation) from the auxiliary device 29C connected to the additional connection member 13I, and to convert the information into the control signal. Thus, when sensor or a mechanical switch is employed as the auxiliary device 29C, a sensor mechanism or a switch mechanism for operating the auxiliary device 29 connected to the other additional connection member 13 can be added and connected to an optional position of the basic harness 11.

Further, according to the additional connection member 13 (13A, 13C, 13D) of the present embodiment, the auxiliary device 29 (29A) to be attached to the target vehicle 17 can be post-mounted on the basic harness 11. The additional connection member 13 (13A, 13C, 13D) has one end connected to the basic harness 11 through the harness branching connection mechanism 31 (31A) and the other end connected to the auxiliary device 29 (29A) through the auxiliary device connection mechanism 61. Further, the additional connection members 13 (13A, 13C, 13D) in a number corresponding to the number of auxiliary devices 29 (29A) attached to the target vehicle 17 are connected in a branched manner to the basic harness 11. Thus, superfluous attachment of a member component does not occur in the entirety of the vehicle harness structure.

Further, in the additional connection members 13 (13A to 13C), since at least one of the harness branching connection mechanism 31 and the auxiliary device connection mechanism 61 includes the control function section 15, the function of the auxiliary device 29 can easily be improved even when the auxiliary device 29 post-mounted on the basic harness 11 does not include the control function.

Further, in the additional connection member 13 (13A, 13B) of the present embodiment, when attaching the harness branching connection mechanism 31 to the basic harness 11, the pressure contact part 33 cuts through the insulating cover that covers the conductor of each of the power line 23, the communication line 25, and the ground line 27 of the basic harness 11 so that the pressure contact part 33 is connected to each conductor. Thus, when attaching the harness branching connection mechanism 31 to the basic harness 11, the connection of the additional connection member 13 (13A, 13B) to the basic harness 11 is made in a simple manner. Further, in the additional connection member 13 (13A, 13B) of the present embodiment, since the harness branching connection mechanism 31 is provided with the control function section 15, mounting of the auxiliary device 29 can easily be achieved by merely attaching to the basic harness 11. This permits post-attachment (instant attachment) of the function of the auxiliary device 29 or reduction of the number of systems in the basic harness 11 and in the communication line 25.

Further, in the additional connection member 13, one end of the additional harness 55 includes the basic harness side connector 47 and the other end includes the auxiliary device side connector 51. The basic harness side connector 47 is linked and connected to the board mounted connector 43 serving as a counterpart connector provided in the harness branching connection mechanism 31. That is, the additional connection member 13 can connect the auxiliary device 29 to the basic harness 11 through the additional harness 55 having a desired length. This permits mounting in accordance with the position of the auxiliary device 29. Thus, the additional connection member 13 can easily handle a vehicle type difference, a destination difference, and a specification difference (and hence realizes free mounting).

Thus, according to the vehicle harness structure and the additional connection member 13 (13A to 13I) of the present embodiment given above, part numbers of wire harnesses are reduced and superfluous attachment in the wire harness is avoided.

Here, the features of the embodiments shown in FIGS. 1 to 8 are briefly summarized below.

The vehicle harness structure includes a basic harness (11) configured to interconnect a plurality of main devices (e.g., the junction box 19, the air-conditioner unit 20, the engine control unit 21, the power window unit 22, the rear combination lamp unit 24, and the power seat unit 30) mounted in common on target vehicles (17); an additional connection member (13, 13A to 13G) having one end connected in a branched manner to at least one of a communication line (25) and a signal line (28) of the basic harness (11) and the other end connected to at least one auxiliary device (29) optionally post-mounted on an target vehicle (17); and a control function section (15, 15A, 16) provided in the additional connection member (13, 13A to 13I) to control the auxiliary device (29).

The control function section (15, 15A) may include a signal generating section configured to receive a signal through the communication line (25) and to generate a control signal for controlling the operation of the auxiliary device (29).

The at least one additional connection member (13, 13I) may include a first additional connection member (13) configured to be connected to a first auxiliary device (29) and a second additional connection member (13I) configured to be connected to a second auxiliary device (29C), and the control function section (16) provided in the second additional connection member (13I) may include a signal conversion section configured to receive information from the second auxiliary device (29C) to generate a signal for operating the first auxiliary device (29) and to convert the information into the signal.

The vehicle harness structure may further include a pressure contact part (33) connected to the conductor of the additional connection member (13, 13A, 13B) and connected in a pressed manner to the conductor of the basic harness (11). The pressure contact part (33) and the control function section (15) form the harness branching connection mechanism (31) configured to connect the basic harness (11) and the additional connection member (13, 13A, 13B) to each other.

The power line (23A) of the additional harness (55A) of the additional connection member (13G) may include one end connected in a branched manner to a power line (23) of another harness (91) other than the basic harness (11) and another end connected to the auxiliary device (29).

The additional connection member (13, 13A, 13C, 13D) includes one end having the harness branching connection mechanism (31) configured to connect the one end in a branched manner to at least one of a communication line (25) and a signal line (28) of a basic harness (11) interconnecting a plurality of main devices (e.g., the junction box 19, the air-conditioner unit 20, the engine control unit 21, the power window unit 22, the rear combination lamp unit 24, and the power seat unit 30) mounted in common on target vehicles 17, and the other end having an auxiliary device connection mechanism (61) configured to connect the other end to an auxiliary device (29) optionally post-mounted on an target vehicle (17), wherein a control function section (15) configured to control the auxiliary device (29) is provided in at least one of the harness branching connection mechanism (31) and the auxiliary device connection mechanism (61).

The additional connection member (13) may further include a pressure contact part (33) connected to the conductor of the additional connection member (13) and connected in a pressed manner to the conductor of the basic harness (11), the pressure contact part (33) and the control function section (15) forming the harness branching connection mechanism (31).

The additional connection member (13) may include an additional harness (55), a basic harness side connector (47) connected to the harness branching connection mechanism (31) at an end of the additional harness (55) on a side of the basic harness, and an auxiliary device side connector (51) configured to be connected to the auxiliary device (29) at another end of the additional harness (55) on a side of the auxiliary device.

Another embodiment of the present invention will be described below with reference to FIGS. 9 to 13.

According to this embodiment, a vehicle harness structure includes a main line harness to be mounted in common on target vehicles; and a branch line harness having one end post-connected in a branched manner to at least one of the communication line, the power line, the signal line, and the ground line of the main line harness and another end connected to at least one electronic device mounted on the target vehicle.

The scope of the "main line harness" in the present specification includes: one kind of the main line harness corresponding to one type of target vehicle; plural kinds of the main line harnesses corresponding to different grades or the like of one type of target vehicle; and one kind of the main line harness corresponding to plural types of target vehicles.

According to this configuration, same main line harnesses are mounted in common on target vehicles, and an electronic device to be attached to the target vehicle is post-attached through the branch line harness whose one end is connected in a branched manner to at least one of the communication line, the power line, the signal line, and the ground line of the main line harness. Thus, superfluous attachment of a member component does not occur in the main line harness.

Further, the branch line harnesses in a number corresponding to the number of electronic devices attached to the target vehicle are connected in a branched manner to the main line harness. Thus, superfluous attachment of a member component does not occur in the entirety of the vehicle harness structure.

Further, in the vehicle harness structure according to the conventional art, when the number of optional electronic devices increases, the number of combinations of attachment of the optional electronic devices increases so that the overall number of kinds of the wire harnesses increases. In contrast, in the vehicle harness structure having the above-mentioned configuration, it is sufficient to merely prepare branch line harnesses of the kinds corresponding to the optional electronic devices. This simplifies management of the manufacturing parts and hence reduces the manufacturing cost of the wire harness.

At one end of the branch line harness, a harness branching connection mechanism may be provided for connection by pressure contact to the conductor of at least one of the communication line, the power line, the signal line, and the ground line. According to this configuration, in the branch line harness for connecting the main line harness to an electronic device, the harness branching connection mechanism is provided in the connection part leading to the main line harness. When attaching the harness branching connection mechanism to the main line harness, the pressure contact part cuts through the insulating cover that covers the conductor of at least one of the communication line, the power line, the signal line, and the ground line of the main line harness so that the pressure contact part is connected to the conductor. Thus, when attaching the harness branching connection mechanism to the main line harness, the connection between the main line harness and the electronic device is made in a simple manner.

The branch line harness may include a main line harness side connector connected to a harness branching connection mechanism at an end of the branch line harness on a side of the main line harness, and an auxiliary device side connector configured to be connected to an electronic device at another end of the branch line harness on a side of the electronic device. According to this configuration, the main line harness side connector of the branch line harness is linked and connected to a counterpart connector provided in the harness branching connection mechanism. That is, the branch line harness has a desired length and can connect the main line harness to the electronic device. This permits mounting in accordance with the position of the electronic device. Thus, the branch line harness for connecting the main line harness to the electronic device can easily handle a vehicle type difference, a destination difference, and a specification difference (and hence realizes free mounting).

The auxiliary device side connector of the branch line harness may be connected to a branch connector to which the connector of an electronic device is connected. According to this configuration, the branch connector is connected in place of the electronic device originally to be connected to the auxiliary device side connector of the branch line harness connected to the main line harness. The branch connector is provided with a plurality of connection parts each capable of connection to the auxiliary device side connector of a branch line harness or the connector of an electronic device. Each connection part can be connected further to the main line harness side connector of an additional wire harness, an auxiliary electronic device, or a branch connector. Thus, the branch line harness can be connected to a plurality of electronic devices.

Figure 9:
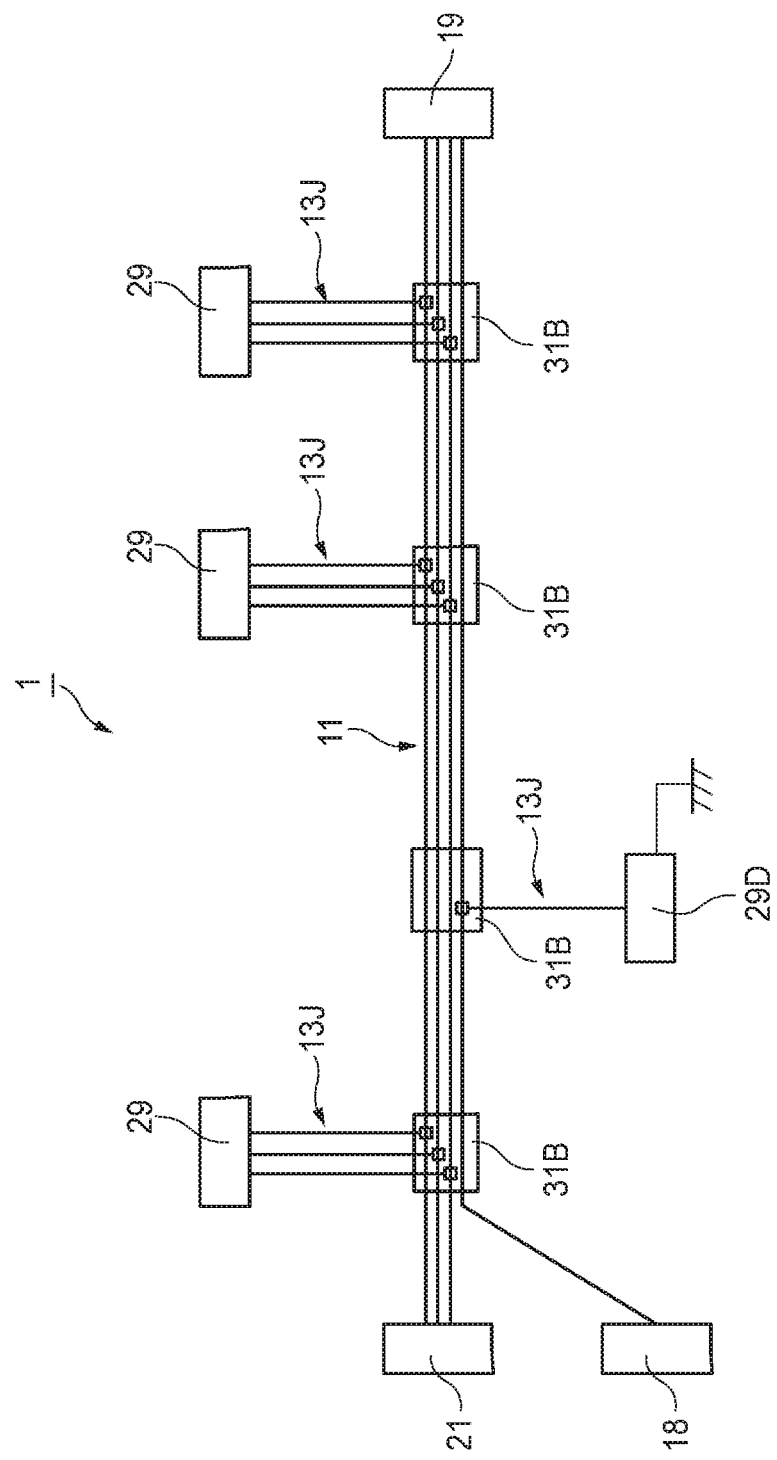
FIG. 9 is a schematic diagram of a wire harness employing a vehicle harness structure according to another embodiment of the present invention.
Figure 10:
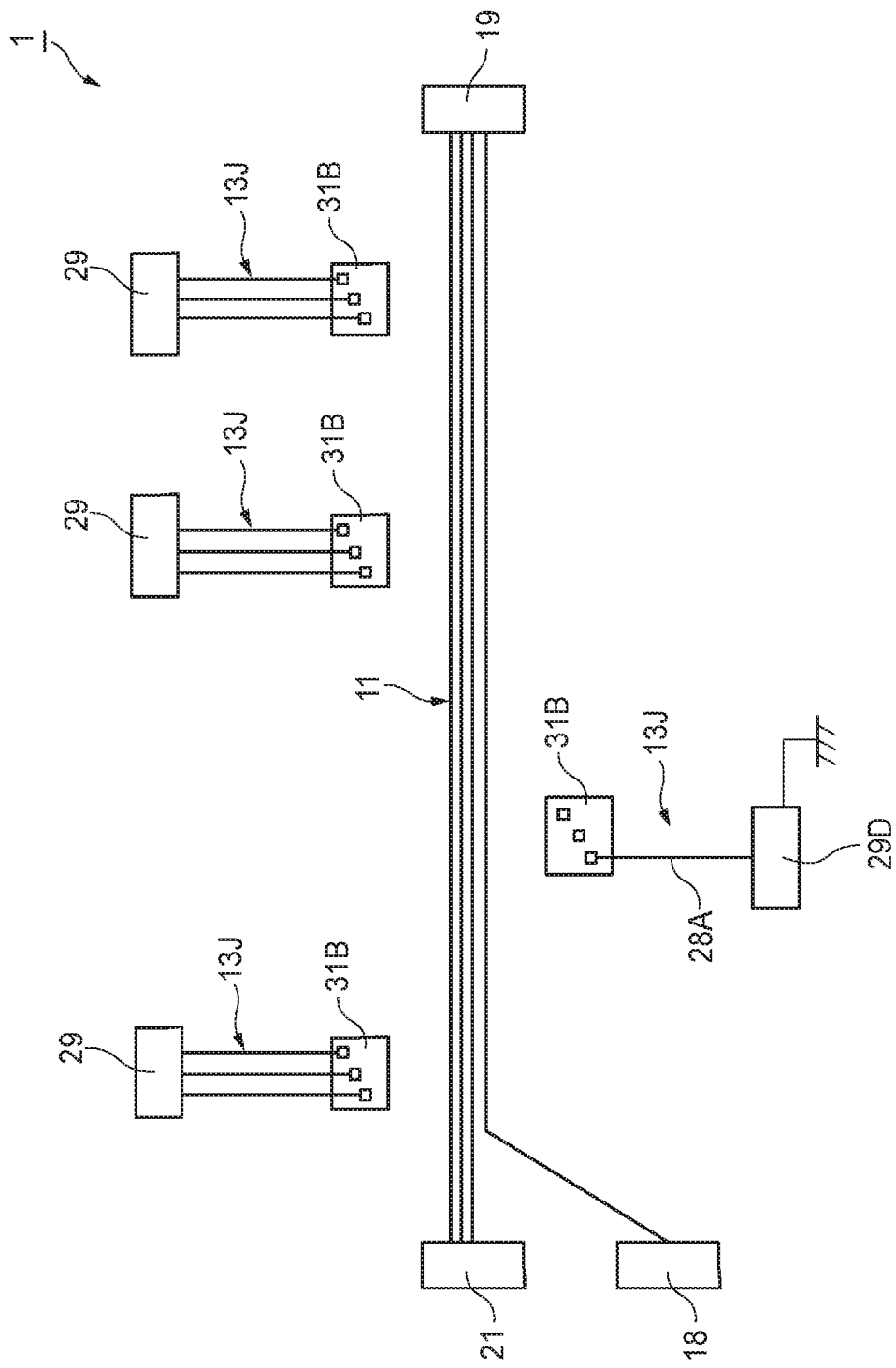
FIG. 10 is a schematic diagram showing a main line harness and branch line harnesses in a wire harness shown in FIG. 9, in a disassembled state.
Figure 11D:
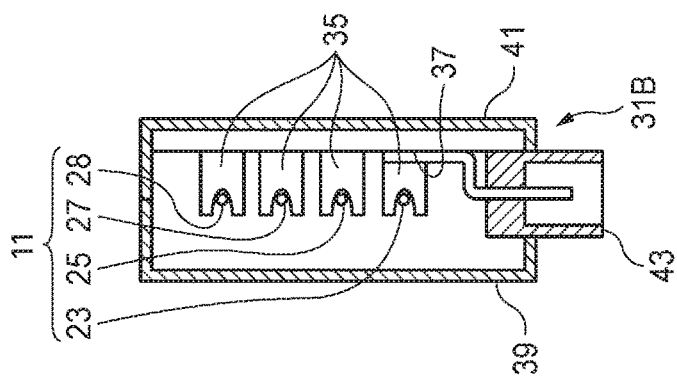
FIG. 11D is a sectional view of a harness branching connection mechanism shown in FIG. 11A, taken along line XI-XI.
Figure 11B:
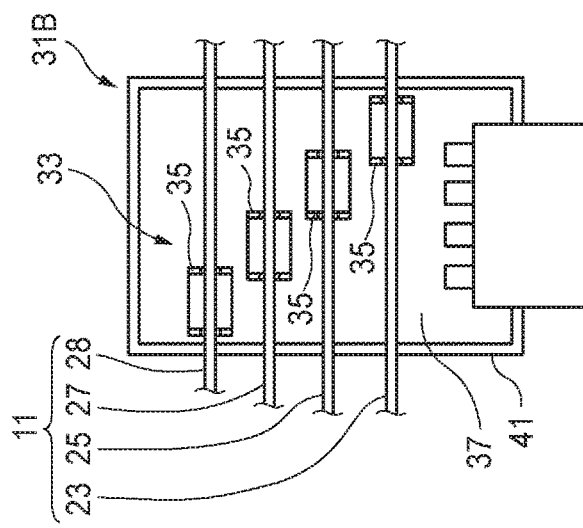
FIG. 11B is a plan view of a harness branching connection mechanism shown in FIG. 11A.
Figure 11C:
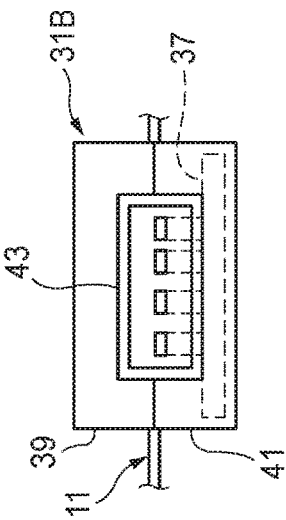
FIG. 11C is a front view of a harness branching connection mechanism shown in FIG. 11A.
Figure 11A:
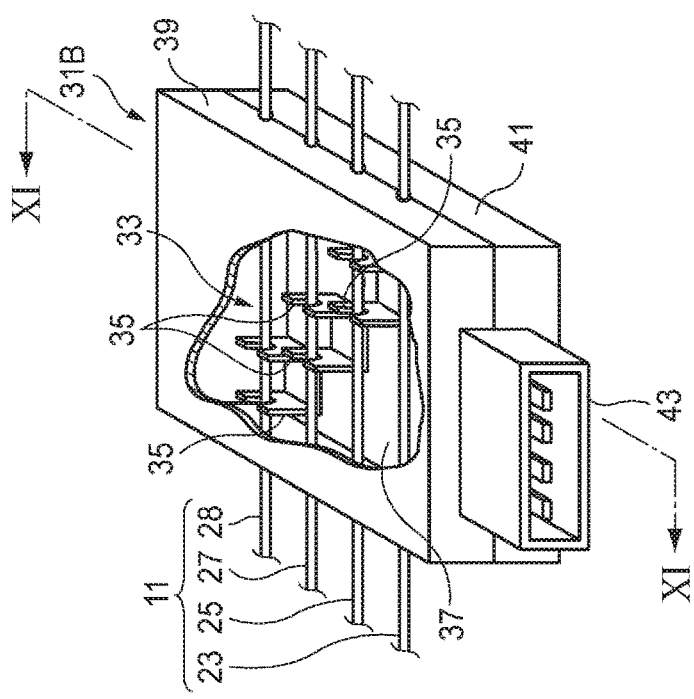
FIG. 11A is a partly cutaway perspective view of a harness branching connection mechanism used in a vehicle harness structure shown in FIG. 9.

FIGS. 9 and 10 are schematic diagrams of a wire harness 1 employing a vehicle harness structure of the present embodiment. The wire harness 1 includes a main line harness 11 and a plurality of branch line harnesses 13J (additional connection members).

The main line harness 11 illustrated in each of FIGS. 11A to 11D is an electric wire bundle to be mounted in common on target vehicles and basically includes four kinds of electric wires, namely, a power line 23, a communication line 25, a ground line 27, and a signal line 28. The main line harness 11 is connected to a plurality of electronic devices (e.g., main devices such as an engine control unit 17 and a junction box 19) or a connector 18. In the main line harness 11, in addition to these, other electric wires may further be are added. A multiplexed signal is transmitted through the communication line 25 in the main line harness 11. Further, an isolated signal is transmitted through the signal line 28 in the main line harness 11. The configuration of the main line harness is not limited to the shape of a single electric wire bundle like that of the main line harness 11 shown in FIGS. 11A to 11D, and may have the shape of an electric wire bundle in which a plurality of branch lines are provided in the main line. Further, the main line harness is not limited to one kind of the main line harness corresponding to plural types of the target vehicles shown in FIGS. 9 and 10 and may be one kind of the main line harness corresponding to one type of the target vehicle or, alternatively, plural kinds of the main line harnesses corresponding to different grades or the like (e.g., a destination difference and a specification difference) of one type of the target vehicle.

As shown in FIG. 10, one end of each of the plurality of branch line harnesses 13J is connected in a branched manner by post-attachment to at least one of the power line 23, the communication line 25, the ground line 27, and the signal line 28 of the main line harness 11. In the example shown in the figure, four branch line harnesses 13J are connected in a branched manner to the main line harness 11. As such, in the vehicle harness structure of the present embodiment, the wire harness 1 is configured such that the plurality of branch line harnesses 13J are connected in a branched manner to optional positions of the main line harness 11. Each of the branch line harnesses 13J connects the main line harness 11 to an electronic device 29, 29A (an auxiliary device).

The other end of each of the branch line harnesses 13J is connected to at least one electronic device 29, 29A to be post-mounted on the target vehicle. The method of post-attaching the electronic device 29, 29A through the branch line harness 13J to the main line harness 11 and may be optional one such as "pressure contact", "bonding" or "welding" as long as connection to the main line harness 11 can be achieved. The present embodiment is described below for an example that the branch line harness 13J is connected in a branched manner through a harness branching connection mechanism 31B described later to the power line 23, the communication line 25, the ground line 27, and the signal line 28 of the main line harness 11.

As shown in FIGS. 11A to 11D, in the vehicle harness structure of the present embodiment, one end of the branch line harness 13J is connected in a branched manner through the harness branching connection mechanism 31B to an optional position of the main line harness 11. The harness branching connection mechanism 31B includes a pressure contact part 33 connected to the conductor of the branch line harness 13J so as to be connected in a pressed manner to the conductor of the main line harness 11. For example, the pressure contact part 33 is configured such that a plurality of pairs of pressure contact blades 35 are provided to extend upward, and connected to a circuit on the circuit board 37. The circuit board 37 is accommodated in a case constructed from an upper case 39 and a lower case 41 fabricated from insulating resin. For example, the upper case 39 and the lower case 41 are joined to each other by a thin hinge (not shown) in a manner of permitting free opening and closing.

In the harness branching connection mechanism 31B, the upper case 39 and the lower case 41 pinch the power line 23, the communication line 25, the ground line 27, and the signal line 28 of the main line harness 11 so that the pressure contact blades 35 cut through the insulating cover of each line, whereby the pressure contact part 33 is connected in a pressed manner to the conductor of each line. The harness branching connection mechanism 31B pinching the power line 23, the communication line 25, the ground line 27, and the signal line 28 of the main line harness 11 is fixed at an optional position of the main line harness 11 when the upper case 39 and the lower case 41 are locked together. That is, according to the vehicle harness structure of the present embodiment, when the harness branching connection mechanism 31B is merely attached to an optional position of the main line harness 11, connection between the main line harness 11 and the electronic device 29 is simply completed. Here, when the ground line of the electronic device 29 is body-grounded, the ground line 27 of the main line harness 11 need not be connected in a branched manner by the branch line harness 13J.

Further, the branch line harness 13J of the present embodiment includes one end having a harness branching connection mechanism 31B configured to connect the one end in a branched manner to the power line 23, the communication line 25, the ground line 27, and the signal line 28 of the main line harness 11, and the other end having an auxiliary device connection mechanism 61 configured to connect the other end to an electronic device 29 post-mounted on the target vehicle. More specifically, as shown in FIG. 12A, the branch line harness 13J includes electric wires 55 (an additional harness), a main line harness side connector 47 (a wire harness side connector) connected to the harness branching connection mechanism 31B at the end of the wires 55 on the main line harness side; and an auxiliary device side connector 51 connected to the electronic device 29 at the end of the additional harness 55 on the electronic device side. The branch line harness 13J is connected to the auxiliary device connection mechanism 61 including an auxiliary device side connector 51 and a connector 63 of the electronic device 29. The main line harness side connector 47 is connected to a board mounted connector 43 of the harness branching connection mechanism 31B. That is, the branch line harness 13J of the present embodiment can connect the electronic device 29 to the main line harness 11 through the electric wires 55 having a desired length. Thus, mounting in accordance with the position of the electronic device 29 is achieved and hence compatibility is improved.

The branch line harness according to the present invention is not limited to the branch line harness 13J of the embodiment given above and may be in various modes.

For example, in the branch line harness 13K shown in FIG. 12B, the ends of the electric wires 55 on a side of the main line harness are directly connected to the pressure contact part 33 of the harness branching connection mechanism 31B, and the auxiliary device side connector 51 is connector-linked to the connector 63 of the electronic device 29.

In the branch line harness 13L shown in FIG. 12C, the ends of the electric wires 55 on the side of the main line harness are directly connected to the pressure contact part 33 of the harness branching connection mechanism 31B. The ends of the electric wires 55 on the side of the electronic device are directly connected to the circuit of the electronic device 29 so that integration with the electronic device 29 is achieved. The main line harness side connector 47 provided at the end of the electric wires 55 on the side of the main line harness may be connected to the board mounted connector 43 of the harness branching connection mechanism 31B (see FIG. 12A).

Figure 13:
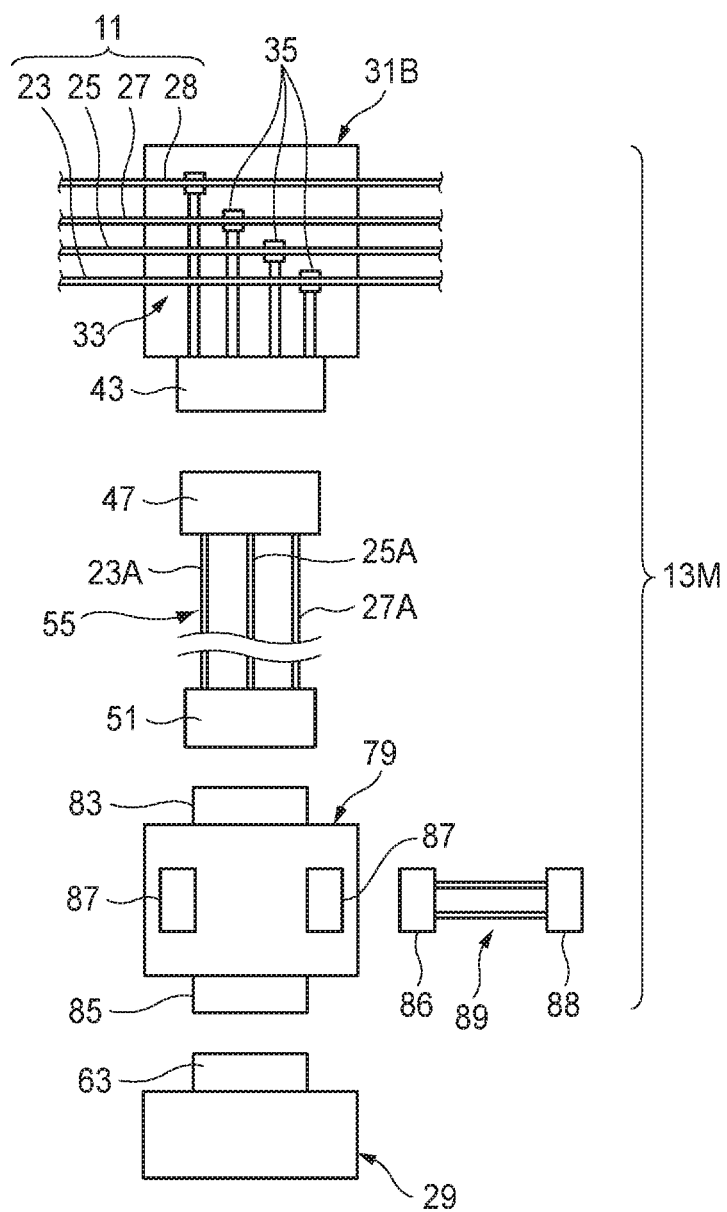
FIG. 13 is a plan view of a branch line harness in which a branch connector is connected to a location leading to an electronic device.

In the branch line harness 13M shown in FIG. 13, a branch connector 79 is connected to a location leading to an electronic device 29. In the branch line harness 13M, the branch connector 79 is connected to the auxiliary device side connector 51. The branch connector 79 is provided with a plurality (four, in the example shown in the figure) of connection parts. The first connection part 83 of the branch connector 79 is connected to the auxiliary device connector 51 of the wires 55. The second connection part 85 of the branch connector 79 is connected to the connector 63 of the electronic device 29. The third connection part 87 of the branch connector 79 is connected to the connector 86 of the additional harness 89. Thus, in the branch connector 79, in addition to the electronic device 29, another electronic device 29 can further be connected in a branched manner through the connector 88 of the additional harness 89. The electric wires 55 in the branch line harness 13M described above may be configured such that the end of the side of the main line harness is directly connected to the pressure contact part 33 of the harness branching connection mechanism 31B, and such that the end on the side of the electronic device is directly connected to the circuit of the branch connector 79.

In the electric wires 55 in each of the branch line harnesses 13J to 13M described above, the functions of the electric wires vary depending on the type (whether an electronic control unit is provided or the like) of the electronic device 29. For example, as shown in FIGS. 12 and 13, in a case that the electronic device 29 including an electronic control unit (not shown) is provided at the end of the electric wires 55 on a side of the electronic device, the electric wires 55 include a power line 23A, a communication line 25A, and a ground line 27A. Further, in a case that the electronic device 29 including an electronic control unit and a switch unit is provided at the end of the electric wires 55 on a side of the electronic device, the electric wires 55 include a power line 23A and a ground line 27A. Further, as shown in FIG. 10, an electronic device 29A that operates in response to an ON/OFF signal is provided at the end of the electric wires 55 on the side of the electronic device and is body-grounded, the electric wires 55 include a signal line 28A.

Next, operational effects of the wire harness 1 employing the vehicle harness structure having the above-mentioned configuration will be described.

According to the wire harness 1 of the present embodiment, the main line harness 11 can be mounted on any of the target vehicles, and an electronic device 29 or 29A to be attached to the target vehicle is post-attached through the branch line harness 13J to 13M whose one end is connected in a branched manner to at least one of the power line 23, the communication line 25, the signal line 28, and the ground line 27 of the main line harness 11. Thus, superfluous attachment of a member component does not occur in the main line harness 11.

Further, the branch line harnesses 13J in a number corresponding to the number of electronic devices 29, 29A attached to the target vehicle are connected in a branched manner to the main line harness 11. Thus, superfluous attachment of a member component does not occur in the entirety of the vehicle harness structure.

Further, in the vehicle harness structure according to the conventional art, when the number of optional electronic devices increases, the number of combinations of attachment of the optional electronic devices increases so that the overall number of kinds of the wire harnesses increases. In contrast, in the vehicle harness structure of the present embodiment, it is sufficient to merely prepare branch line harnesses 13J to 13M of the kinds corresponding to the optional electronic devices 29, 29A. This simplifies management of the manufacturing parts and hence reduces the manufacturing cost of the wire harness.

Further, in the vehicle harness structure of the present embodiment shown in FIG. 12, in the branch line harness 13J for connecting the main line harness 11 to the electronic device 29, the harness branching connection mechanism 31B is provided in the connection part leading to the main line harness 11. When attaching the harness branching connection mechanism 31B to the main line harness 11, the pressure contact part 33 cuts through the insulating cover that covers the conductor of at least one of the power line 23, the communication line 25, the signal line 28, and the ground line 27 of the main line harness 11 so that the pressure contact part 33 is connected to the conductor. Thus, when attaching the harness branching connection mechanism 31B to the main line harness 11, the connection between the main line harness 11 and the electronic device 29 is made in a simple manner.

Further, in the vehicle harness structure of the present embodiment shown in FIG. 12A, the branch line harness 13J includes the electric wires 55 having one end provided with the main line harness side connector 47 and the other end provided with the auxiliary device side connector 51. The main line harness side connector 47 is linked and connected to the board mounted connector 43 serving as a counterpart connector provided in the harness branching connection mechanism 31B.

That is, the branch line harness 13J can connect the electronic device 29 to the main line harness 11 through the electric wires 55 having a desired length. Thus, mounting can be performed in accordance with the position of the electronic device 29. By virtue of this, the branch line harness 13J for connecting the main line harness 11 to the electronic device 29 can easily handle a vehicle type difference, a destination difference, and a specification difference (and hence realizes free mounting).

Further, in the vehicle harness structure of the present embodiment shown in FIG. 13, in place of the electronic device 29 originally to be connected to the auxiliary device side connector 51 of the branch line harness 13J connected to the main line harness 11, the branch connector 79 is connected. The branch connector 79 is provided with a plurality of first to third connection parts 83, 85, 87 each capable of connection to the auxiliary device side connector 51 of a branch line harness 13J or the connector 63 of an electronic device 29. Each third connection part 87 can further be connected to the connector 86 of an additional harness 89, an electronic device 29, or a branch connector 79. Thus, the branch line harness 13J can be connected to a plurality of the electronic devices 29 with flexibility (in many variations).

Thus, according to the vehicle harness structure of the present embodiment, part numbers of wire harnesses are reduced and superfluous attachment in the wire harness 1 can be avoided.

Here, the features of the embodiments shown in FIGS. 9 to 13 are briefly summarized below.

The vehicle harness structure includes a main line harness (11) configured to be mounted in common on target vehicles, and a branch line harness (13J to 13M) having one end post-connected in a branched manner to at least one of the communication line (25), the power line (23), the signal line (28), and the ground line (27) of the main line harness (11) and another end connected to at least one electronic device (29, 29D) mounted on the target vehicle.

At one end of the branch line harness (13J to 13M), a harness branching connection mechanism (31B) may be provided for connection by pressure contact to the conductor of at least one of the communication line (25), the power line (23), the signal line (28), and the ground line (27).

The branch line harness (13J) may include: a main line harness side connector (47) connected to the harness branching connection mechanism (31B) at the main line harness side end of the branch line harness (13J); and an auxiliary device side connector (51) connected to the electronic device (29) at the electronic device side end of the branch line harness (13J).

The auxiliary device side connector (51) of the branch line harness (13M) may be connected to a branch connector (79) to which the connector (63) of an electronic device (29) is connected.

Another embodiment of the present invention is described below with reference to FIGS. 14 to 19.

According to the present embodiment, a vehicle harness structure includes a standard control section configured to control a standard electronic device to be mounted in common on target vehicles, a junction box having an extension control section configured to control an extension electronic device to be optionally post-mounted on the target vehicles, a standard connector part provided on the junction box to connect the junction box to one end of the standard harness connected to the standard electronic device, and an extension connector part provided on the junction box to connect the junction box to an extension harness including at least one of the communication line and the power line to which one end of an additional connection member is connected in a branched manner by post-attachment, the additional connection member having another end configured to be connected to an extension electronic device.

According to the vehicle harness structure having this configuration, the standard harness used for connection between the standard electronic device mounted in common on target vehicles and the junction box is unified. When selectively attaching an extension electronic device to a target vehicle, this connection is performed by post-attachment through an additional connection member whose one end is connected in a branched manner to at least one of the communication line and the power line of an extension harness connected to the extension connector part of the junction box. Further, when an extension electronic device is not to be attached to the target vehicle, the extension harness may be not connected to the extension connector part of the junction box and hence may be omitted. Thus, superfluous attachment of a member component does not occur in the standard harness and the extension harness.

Further, the extension electronic device to be optionally post-mounted on the target vehicle can be added and connected through the additional connection member to an optional position of the extension harness. This post-attachment of the extension electronic device to the extension harness can be applied to the vehicle harness at the time of manufacture as well as to the extension harness for the vehicle harness wired in a completed vehicle.

Further, when the extension harness is employed, an extension electronic device can easily be post-attached without the necessity of adding a change to the standard harness. That is, in the extension harness, the specification of the communication line or the power line can easily be changed in accordance with the number of extension electronic devices or the type of the extension electronic device.

Further, in the vehicle harness structure according to the conventional art, when the number of extension electronic devices increases, part numbers for the entire wire harnesses increases in accordance with an increase of the number of combinations of attachment of the extension electronic devices. In contrast, in the vehicle harness structure having the above-mentioned configuration, each extension harness is attached to the standard harness so that part numbers for additional connection members to be connected in a branched manner by post-attachment to the extension harness is provided in correspondence to the extension electronic devices. This simplifies management of the manufacturing parts and hence reduces the manufacturing cost of the wire harness.

The junction box may include a standard box part having the standard control section, and an extension box part having the extension control section, the extension box part being attachable and detachable with respect to the standard box part. According to this configuration, a common extension box part connected to the extension harness can be connected to a standard box part of plural kinds. Alternatively, an extension box part of plural kinds can selectively be connected to a common standard box part. Thus, compatibility is improved.

A harness branching connection mechanism provided at one end of the additional connection member may be connected in a pressed manner to the conductor of at least one of the communication line and the power line of the extension harness. According to this configuration, in the additional connection member for connecting the extension harness to the extension electronic device, the harness branching connection mechanism is provided in the connection part leading to the extension harness. When attaching the harness branching connection mechanism to the extension harness, the pressure contact part cuts through the insulating cover that covers the conductor of at least any one of the communication line and the power line of the extension harness so that the pressure contact part is connected to the conductor. Thus, when attaching the harness branching connection mechanism to the extension harness, the connection between the extension harness and the extension electronic device is made in a simple manner.

The vehicle harness structure includes a gateway device connected to a junction box having a standard control section configured to control a standard electronic device to be mounted in common on target vehicles, the gateway device being configured to relay data transmission and reception between in-vehicle networks, and an extension communication harness including a communication line connected to the gateway device, one end of an additional connection member including a control function section configured to control the extension electronic device being connected in a branched manner by post-attachment to the communication line, and the other end of the additional connection member being connected to at least one extension electronic device to be optionally post-mounted on the target vehicles.

According to this configuration, when an extension electronic device is to be selectively attached to the target vehicle, the extension electronic device is post-attached through an additional connection member whose one end is connected in a branched manner to the communication line of an extension communication harness connected to the gateway device. Further, when an extension electronic device is not to be attached to the target vehicle, the extension communication harness may be omitted and not connected to the gateway device. Thus, superfluous attachment of a member component does not occur in the gateway device and the extension communication harness.

Further, the extension electronic device to be optionally post-mounted on the target vehicle can be added and connected through the additional connection member including a control function section to an optional position of the extension communication harness. This post-attachment of the extension electronic device to the extension communication harness can be applied to the vehicle harness at the time of manufacture as well as to the extension communication harness for the vehicle harness wired in a completed vehicle.

Further, when the extension communication harness is employed, an extension electronic device can easily be post-attached without the necessity of adding a change to the harness for connecting the gateway device to the junction box. That is, in the extension communication harness, the specification of the communication line can easily be changed in accordance with the number of extension electronic devices or the type of the extension electronic device.

Thus, when attaching an extension electronic device which need be connected only to the communication line is to be selectively attached to the target vehicle, the extension electronic device is post-attached, via the additional connection member including a control function section, to the extension communication harness connected to the gateway device. That is, the extension electronic device need not be connected through a junction box.

The harness branching connection mechanism provided at one end of the additional connection member may be connected in a pressed manner to the conductor of the communication line of the extension communication harness. According to this configuration, in the additional connection member for connecting the extension communication harness to the extension electronic device, the harness branching connection mechanism is provided in the connection part leading to the extension communication harness. When attaching the harness branching connection mechanism to the extension communication harness, the pressure contact part cuts through the insulating cover that covers the conductor of the communication line in the extension communication harness so that the pressure contact part is connected to the conductor. Thus, when attaching the harness branching connection mechanism to the extension communication harness, the connection between the extension communication harness and the extension electronic device is made in a simple manner.

Figure 14:
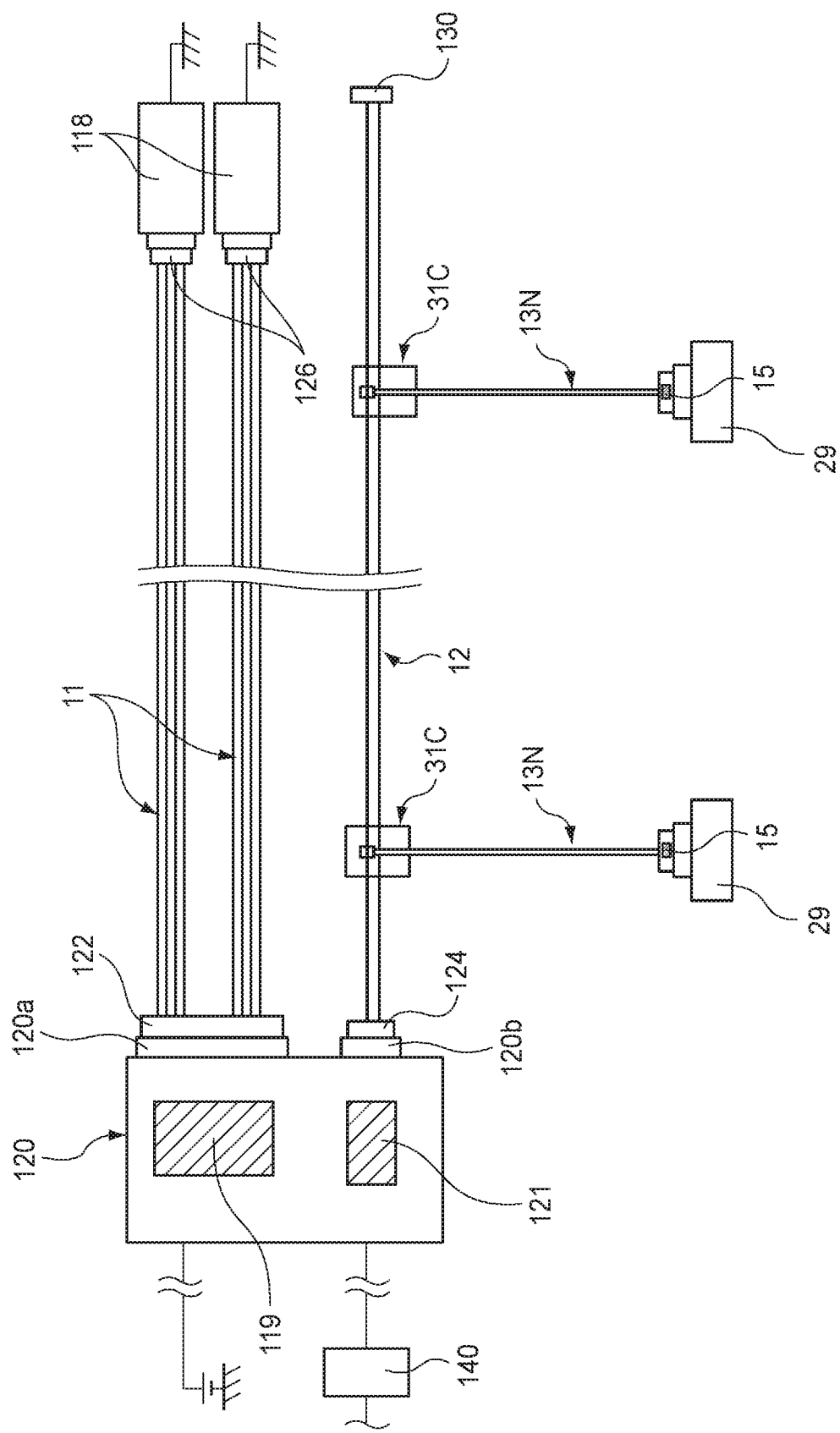
FIG. 14 is a schematic diagram of a vehicle harness structure according to another embodiment of the present invention.
Figure 15:
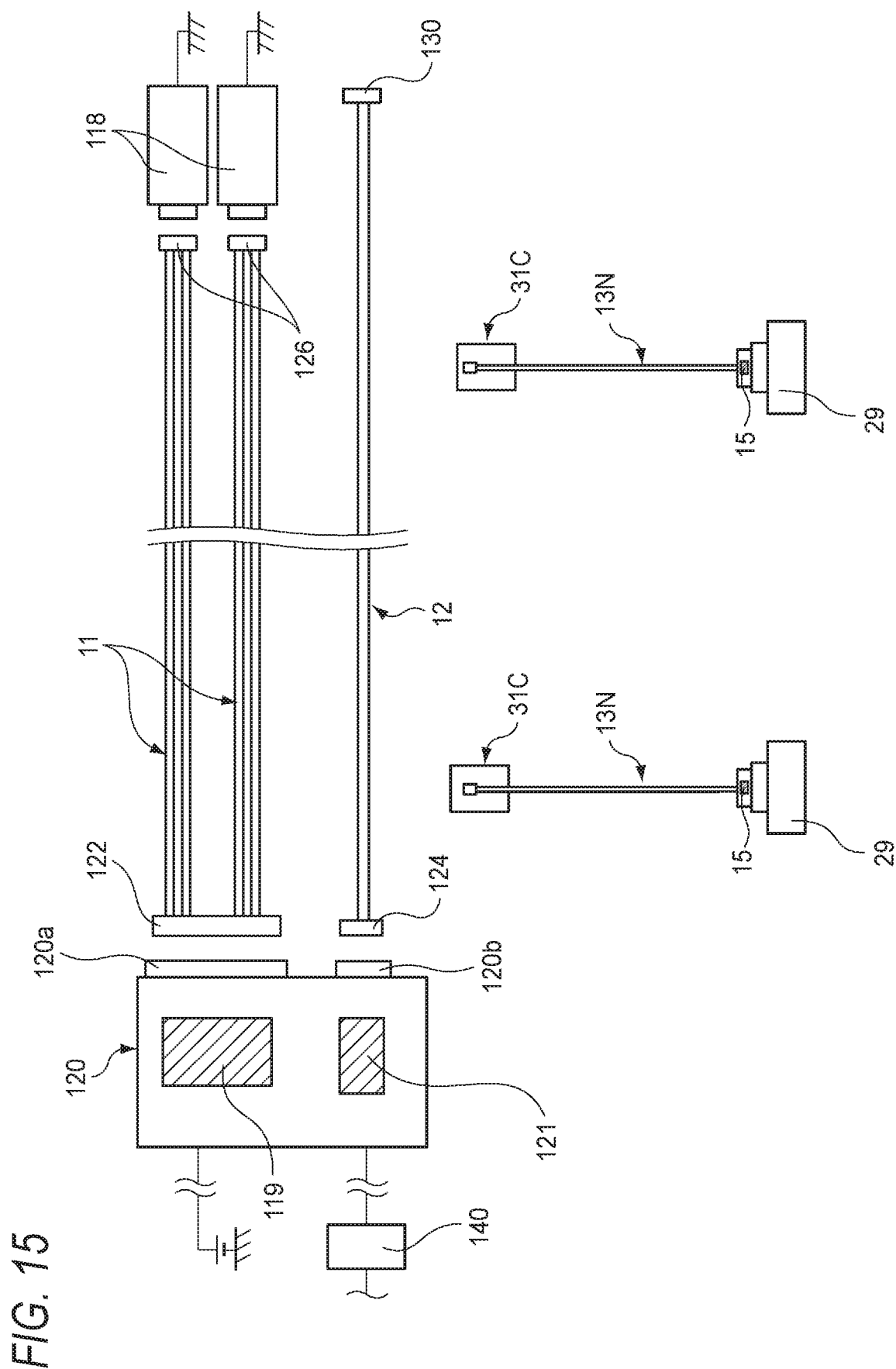
FIG. 15 is a schematic diagram showing an extension harness and an additional connection member in a vehicle harness structure shown in FIG. 14, in a disassembled state.
Figure 16A:
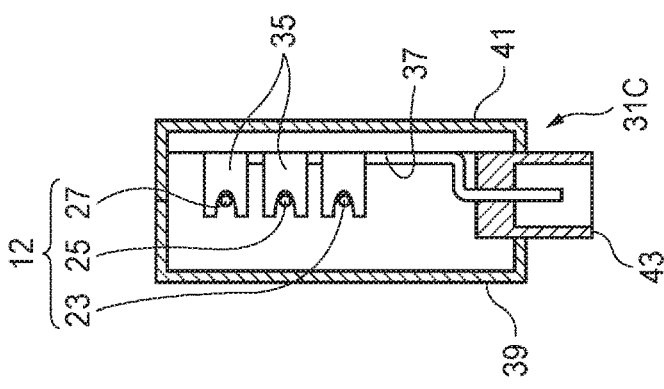
FIG. 16A is a partly cutaway perspective view of a harness branching connection mechanism used in a vehicle harness structure shown in FIG. 14.
Figure 16B:
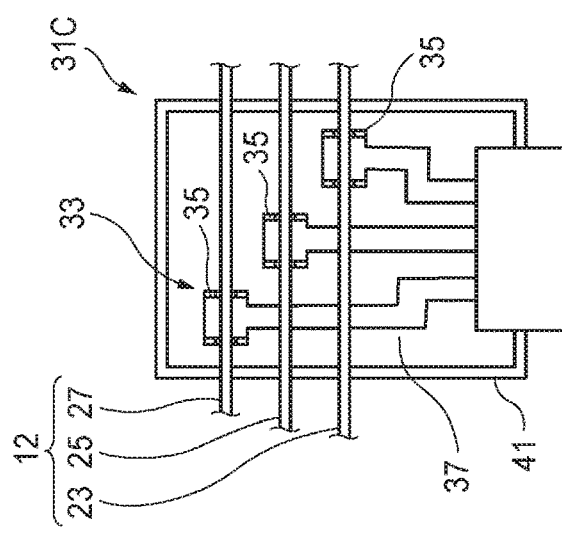
FIG. 16B is a plan view of a harness branching connection mechanism shown in FIG. 16A.
Figure 16C:
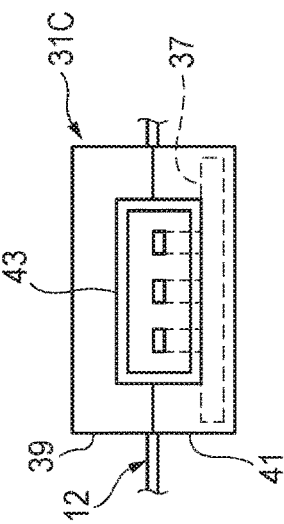
FIG. 16C is a front view of a harness branching connection mechanism shown in FIG. 16A.
Figure 16D:
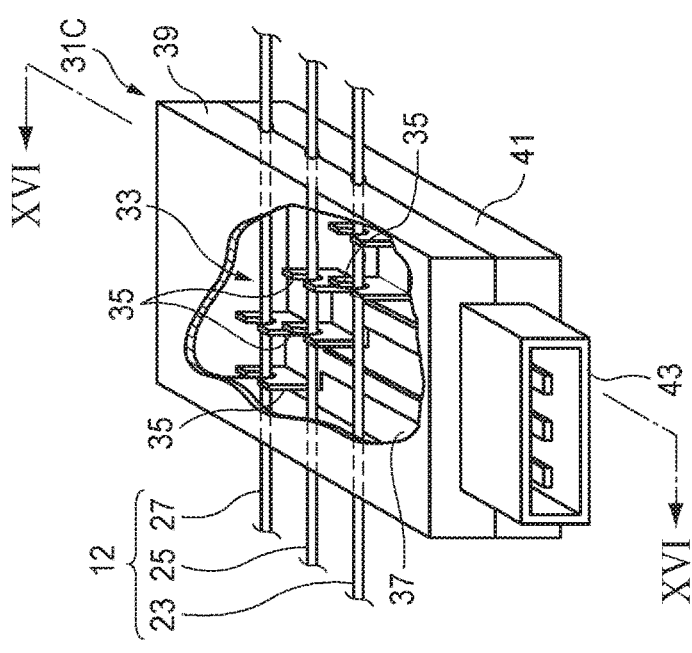
FIG. 16D is a sectional view of a harness branching connection mechanism shown in FIG. 16A, taken along line XVI-XVI.

FIG. 14 is a schematic diagram of a vehicle harness structure of the present embodiment. The vehicle harness structure includes a junction box 120, a standard connector part 120a (a first connector part) provided on the junction box 120 to connect one end of a standard harness 11 (a first harness) to the junction box 120, an extension connector part 120b (a second connector part) provided on the junction box 120 to connect an extension harness 12 (a second harness) to the junction box 120.

The junction box 120 includes a standard control section 119 (a first control section) configured to control a standard electronic device 118 (a main device such as an air-conditioner unit and a power window unit) to be mounted in common on target vehicles, and an extension control section 121 (a second control section) configured to control an extension electronic device 29 (an auxiliary device) to be optionally post-mounted on the target vehicles. A gateway device 140 configured to relay data transmission and reception between the in-vehicle networks and a battery power supply are connected to an upstream of the junction box 120.

The standard connector part 120a is provided on the junction box 120 for the connection of one end of the standard harness 11 connected to the standard electronic device 118. The extension connector part 120b is provided on the junction box 120 for the connection of the extension harness 12 to which one end of the additional connection member 13N is connected in a branched manner by post-attachment, the other end of the additional connection member 13N being connected to the extension electronic device 29.

The standard harness 11 connects each standard electronic device 118 mounted in common on target vehicles, to the junction box 120 including the standard control section 119 for controlling the standard electronic device 118. The standard harness 11 is an electric wire bundle basically composed of a plurality of electric wires such as a communication line, a power line, a ground line, and a signal line connected to the standard control section 119. The standard harness 11 includes a junction box side connector 122 connected to the standard connector part 120a of the junction box 120, and a standard auxiliary device side connector 126 connected to the standard electronic device 118.

In the present specification, the "standard harness" for connection of the standard electronic device mounted in common on target vehicles does not indicate a wire harness common to all vehicle types and indicates a wire harness indispensably necessary in each vehicle type, each destination, and each grade (each specification).

The extension harness 12 is a wire harness basically composed of three kinds of electric wires such as a communication line 25, a power line 23, and a ground line 27 connected to the extension control section 121 of the junction box 120. The extension harness 12 is arranged in parallel to the standard harness 11 or, alternatively, wired independently from the standard harness 11 so as to extend to the vicinity of the extension electronic device 29 in the target vehicle. In addition to this, the extension harness 12 may further include other electric wires such as a signal line (not shown). Alternatively, the ground line 27 may be omitted. A multiplexed signal is transmitted through the communication line 25 in the extension harness 12. Further, an isolated signal is transmitted through the signal line in the extension harness 12.

Further, the extension harness 12 has one end provided with a junction box side connector 124 connected to the extension connector part 120b of the junction box 120 and the other end provided with a termination device 130.

An extension electronic device 29 (e.g., a centralized door lock unit or a seat heater unit) optionally post-mounted on the target vehicle is post-attached through the additional connection member 13N to the extension harness 12.

Figure 17A:
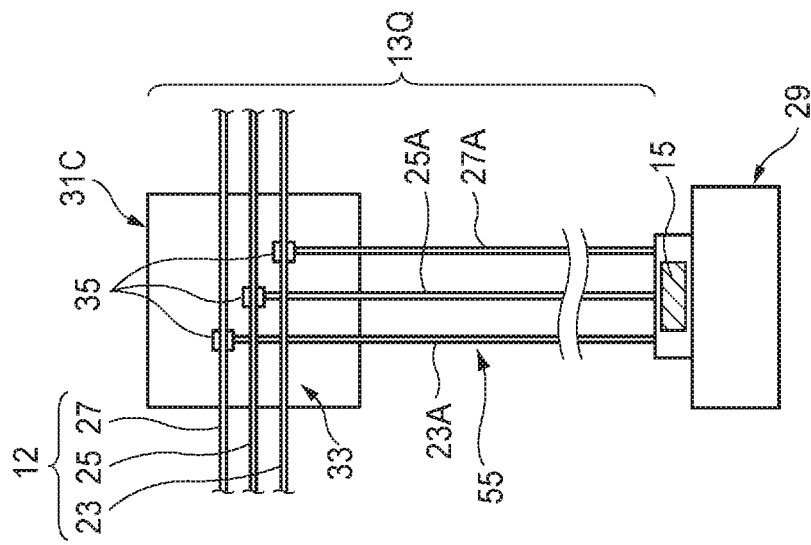
FIGS. 17A to 17C are plan views each showing an additional connection member connected to an extension harness.

In the additional connection member 13N, as shown in FIG. 17A, one end is connected in a branched manner through the harness branching connection mechanism 31C to the extension harness 12 at an optional position, and the other end is connected to the extension electronic device 29 through the auxiliary device connection mechanism 61. The method of post-attachment used for post-attaching the extension electronic device 29 through the additional connection member 13N to the extension harness 12 may be optional one such as "pressure contact", "bonding" or "welding" as long as the method permits branching connection to at least one of the communication line 25 and the power line 23 of the extension harness 12. In the present embodiment, the additional connection member 13N is connected in a branched manner through the harness branching connection mechanism 31C described later to the power line 23, the communication line 25, and the ground line 27 of the extension harness 12.

Each of the standard control section 119 and the extension control section 121 of the junction box 120 is a master ECU for performing electronic control of the standard electronic device 118 or the extension electronic device 29. More specifically, each of the standard control sections 119 and the extension control section 121 is configured such that a "microcomputer", a "semiconductor fuse", and a "communication transceiver" are mounted on a circuit board or an electronic component. Here, the configuration of the standard control section 119 and the extension control section 121 of the junction box 120 is not limited to that they are incorporated separately as described above and may be that the extension control section is integrated in advance into the standard control section.

The additional connection member 13N is provided with the control function section 15. The control function section 15 including a signal generating section configured to receive a signal through the communication line 25 and to generate a control signal for controlling the operation of the extension electronic device 29 is a slave ECU configured to control the operation of the extension electronic device 29. The control function section 15 is provided in the additional connection member 13N to control the operation of the extension electronic device 29. More specifically, the control function section 15 is configured such that a "microcomputer", a "semiconductor fuse", and a "communication transceiver" are mounted on a circuit board, a circuit member constructed from a bus bar, or the like. Here, the extension electronic device 29 itself may include in advance the control function section.

As shown in FIGS. 16A to 16D, in the vehicle harness structure of the present embodiment, one end of the additional connection member 13N is connected in a branched manner through the harness branching connection mechanism 31C to the extension harness 12 at an optional position.

The harness branching connection mechanism 31C includes a pressure contact part 33 connected to the conductor of the additional connection member 13N and connected in a pressed manner to the conductor of the extension harness 12. For example, the pressure contact part 33 is configured such that a plurality of pairs of pressure contact blades 35 are provided to extend upwards, and connected to a circuit on the circuit board 37. The circuit board 37 is accommodated in a case constructed from an upper case 39 and a lower case 41 fabricated from insulating resin. For example, the upper case 39 and the lower case 41 are joined to each other by a thin hinge (not shown) in a manner of permitting free opening and closing.

In the harness branching connection mechanism 31C, the upper case 39 and the lower case 41 pinch the power line 23, the communication line 25, and the ground line 27 of the extension harness 12 so that the pressure contact blades 35 cut through the insulating cover of each line, and the pressure contact part 33 is connected in a pressed manner to the conductor of each line. The harness branching connection mechanism 31C pinching the power line 23, the communication line 25, and the ground line 27 of the extension harness 12 is fixed at an optional position of the extension harness 12 when the upper case 39 and the lower case 41 are locked together. That is, according to the vehicle harness structure of the present embodiment, when the harness branching connection mechanism 31C is merely attached to the extension harness 12 at an optional position, connection between the extension harness 12 and the extension electronic device 29 is simply completed. Here, when the ground line of the extension electronic device 29 is body-grounded, the ground line 27 of the extension harness 12 need not be connected in a branched manner by the additional connection member 13N.

Further, the additional connection member 13N includes one end having the harness branching connection mechanism 31C configured to connect the one end in a branched manner to the power line 23, the communication line 25, and the ground line 27 of the extension harness 12, and the other end having an auxiliary device connection mechanism 61 configured to connect the other end to an optional extension electronic device 29 optionally post-mounted on the target vehicle. More specifically, as shown in FIG. 17A, the additional connection member 13N includes: electric wires 55 (an additional harness); an extension harness side connector 47 (a wire harness side connector) connected to the harness branching connection mechanism 31C at the extension harness side end of the electric wires 55; and an auxiliary device side connector 51 connected to the extension electronic device 29 at the extension electronic device side end of the electric wires 55. The additional connection member 13N is connected to the auxiliary device connection mechanism 61 including an auxiliary device side connector 51 and a connector 63 of the extension electronic device 29. The extension harness side connector 47 is connected to a board mounted connector 43 of the harness branching connection mechanism 31C. That is, the additional connection member 13N of the present embodiment can connect the extension electronic device 29 to the extension harness 12 through the electric wires 55 having a desired length. This permits mounting in accordance with the position of the extension electronic device 29 and hence compatibility is improved.

The additional connection member according to the present invention is not limited to the additional connection member 13N of the embodiment given above and may be in various modes.

Figure 17B:
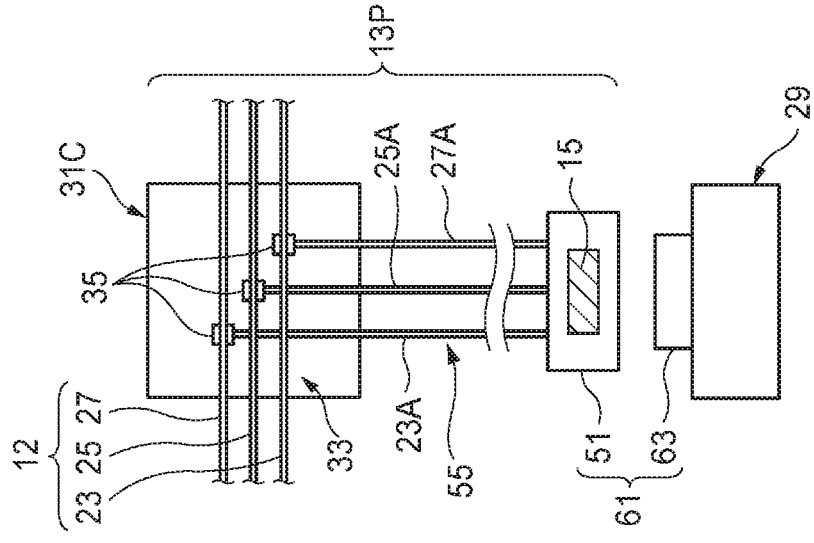

For example, in the additional connection member 13P shown in FIG. 17B, the extension harness side ends of the electric wires 55 are directly connected to the pressure contact part 33 of the harness branching connection mechanism 31C, and the auxiliary device side connector 51 is connector-linked to the connector 63 of the extension electronic device 29.

Figure 17C:
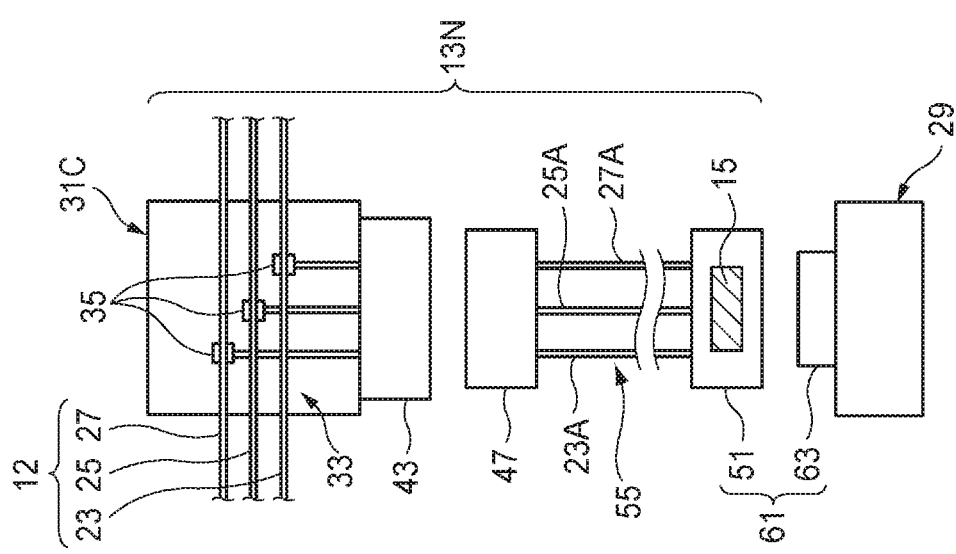

In the additional connection member 13Q shown in FIG. 17C, the extension harness side ends of the electric wires 55 are directly connected to the pressure contact part 33 of the harness branching connection mechanism 31C. The ends of the electric wires 55 on a side of the electronic device are directly connected to the circuit of the extension electronic device 29 so that integration with the extension electronic device 29 is achieved. The extension harness side connector 47 provided at the end of the electric wires 55 on the side of the extension harness may be connected to the board mounted connector 43 of the harness branching connection mechanism 31C (see FIG. 17A).

Further, in a case that a branch connector (not shown) is connected to the auxiliary device side connector 51 of the additional connection member 13N, branching connection to a plurality of extension electronic devices 29 can be performed.

Here, in the electric wires 55 in the additional connection member 13N, 13A, or 13B described above, the functions of the electric wires vary depending on the type (whether an electronic control unit is provided or the like) of the extension electronic device 29. For example, as shown in FIGS. 17A to 17C, in a case that the control function section 15 for controlling the operation of the extension electronic device 29 is provided at the end of the electric wires 55 on the side of the electronic device, the electric wires 55 include a power line 23A, a communication line 25A, and a ground line 27A. In a case that the control function section 15 is provided in the harness branching connection mechanism 31C or at the end of the electric wires 55 on the side of the extension harness, the electric wires 55 include of those selected from a power line 23A, a ground line 27A, a communication line 25A, a signal line, and the like in accordance with the control contents of the control function section 15. Further, in a case that the extension electronic device 29 requires power supply alone from the extension harness 12, the electric wire 55 includes a power line 23A.

Figure 18:
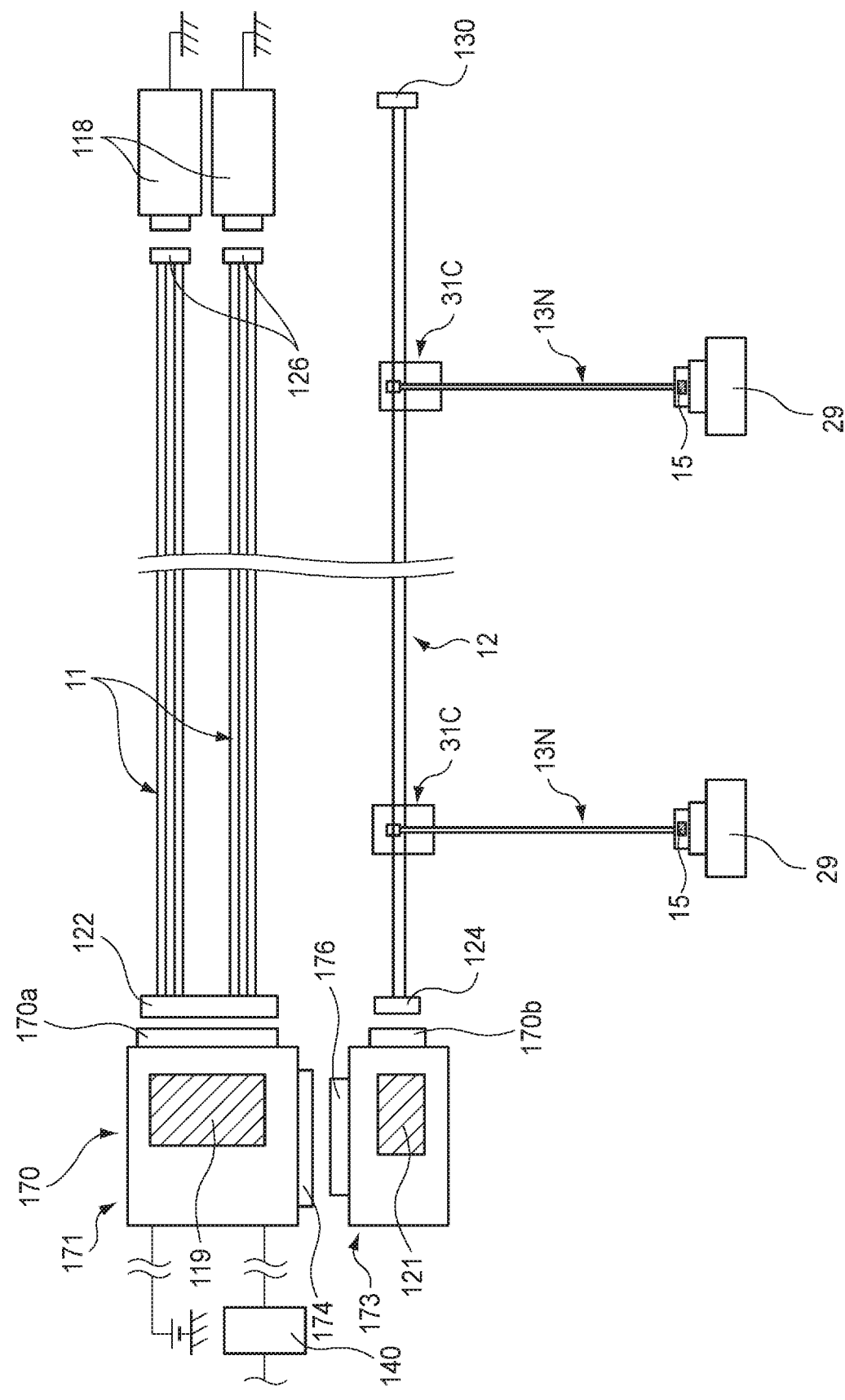
FIG. 18 is a schematic diagram of a vehicle harness structure according to another embodiment of the present invention.

FIG. 18 is a schematic diagram of a vehicle harness structure according to another embodiment of the present invention. Like component members to those of the vehicle harness structure according to the embodiments given above are denoted by like reference numerals and their detailed description is omitted.

As shown in FIG. 18, the junction box 170 in the vehicle harness structure of the present embodiment includes: a standard box part 171 (a first box part) including a standard control section 119; and an extension box part 173 (a second box part) including an extension control section 121 and attachable and detachable with respect to the standard box part 171.

In the standard box part 171 and the extension box part 173, when a connector 174 and a connector 176 are fit together, the standard control section 119 and the extension control section 121 are connected and integrated into the junction box 170.

The standard box part 171 is provided with a standard connector part 170a for connection to the junction box side connector 122 of the standard harness 11 connected to the standard electronic device 118, and the extension box part 173 is provided with an extension connector part 170b for connection to the junction box side connector 124 of the extension harness 12.

Thus, for example, the common extension box part 173 connected to the extension harness 12 can be connected to the standard box part 171 of plural kinds to which the standard electronic device 118 having a different specification is connected or on which the standard control section 119 having a different specification is mounted. Further, the extension box part 173 of plural kinds to which an extension harness 12 having a different wire specification is connected or on which an extension control section 121 having a different specification is mounted can selectively be connected to the common extension box part 171.

Thus, when the junction box 170 is constructed from the standard box part 171 and the extension box part 173 which are attachable and detachable relative to each other, a vehicle harness structure having improved compatibility can be provided.

Figure 19:
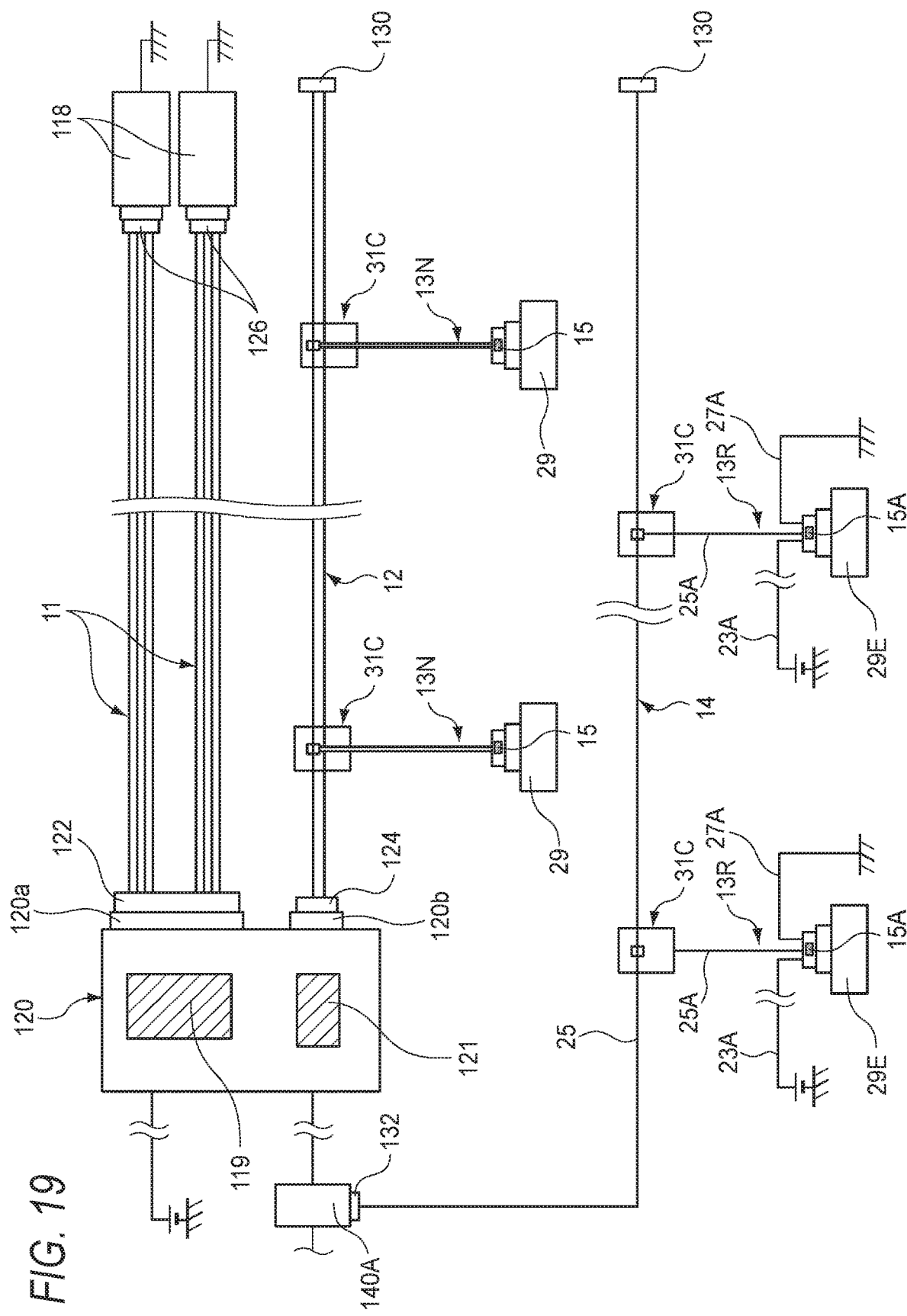
FIG. 19 is a schematic diagram of a vehicle harness structure according to another embodiment of the present invention.

FIG. 19 is a schematic diagram of a vehicle harness structure according to another embodiment of the present invention. Like component members to those of the vehicle harness structure according to the embodiments given above are denoted by like reference numerals and their detailed description is omitted.

As shown in FIG. 19, the vehicle harness structure of the present embodiment further includes a gateway device 140A connected to a junction box 120 including a standard control section 119 configured to control the standard electronic device 118, the gateway device 140A being configured to relay data transmission and reception between in-vehicle networks, and an extension communication harness 14 connected to the gateway device 140A. Here, in the gateway device 140A of the present invention, the junction box to be connected is not limited to the junction box 120 shown in FIG. 19 and may be a junction box of publicly known diverse kind. The extension communication harness 14 is a wire harness constructed from the communication line 25 connected to the gateway device 140A. The extension communication harness 14 is arranged in parallel to the standard harness 11 or the extension harness 12 or alternatively wired separately from these, so as to extend to the vicinity of the extension electronic device 29E in the target vehicle. Further, the extension communication harness 14 has one end provided with a connector 132 connector-linked to the gateway device 140A and the other end provided with a termination device 130.

Then, the extension electronic device 29E optionally post-mounted on the target vehicle is post-attached through the additional connection member 13R to the extension communication harness 14. In the additional connection member 13R, one end of the communication line 25A is connected in a branched manner through the harness branching connection mechanism 31C to the communication line 25 of the extension communication harness 14. Further, one end of the power line 23A is connected through another harness to the power supply, and one end of the ground line 27A is body-grounded.

The additional connection member 13R is provided with the control function section 15A. The control function section 15A including a signal generating section configured to receive a signal from the gateway device 140A and to generate a control signal for controlling the operation of the extension electronic device 29E is an ECU configured to control the operation of the extension electronic device 29E. The control function section 15A is provided in the additional connection member 13R to control the operation of the extension electronic device 29E.

Similarly to the additional connection member 13N of an embodiment given above, in the additional connection member 13R of the present embodiment, one end of the communication line 25A is connected in a branched manner to the extension communication harness 14 at an optional position through the harness branching connection mechanism 31C, and the other end is connected to the extension electronic device 29E. The method of post-attachment used for post-attaching the extension electronic device 29E through the additional connection member 13R to the extension communication harness 14 may be optional one such as "pressure contact", "bonding" or "welding" as long as the method permits branching connection to the communication line 25 in the extension communication harness 14.

In a case that the extension electronic device 29E is directly connected through another harness to the power supply and, at the same time, is directly body-grounded, the additional connection member connected in a branched manner to the extension communication harness 14 includes only the communication line 25A.

Next, operational effects of the vehicle harness structure having the above-mentioned configuration will be described.

In the vehicle harness structure of the embodiment of the present invention given above, the standard harness 11 used for connection between the standard electronic device 118 mounted in common on target vehicles and the junction box 120 is unified. When an extension electronic device 29 is to be selectively attached to the target vehicle, this connection is performed by post-attachment through an additional connection member 13N (13A, 13B) whose one end is connected in a branched manner to the communication line 25, the power line 23, and the ground line 27 of the extension harness 12 connected to the extension connector part 120b of the junction box 120. Further, when an extension electronic device 29 is not to be attached to the target vehicle, the extension harness 12 may be not connected to the extension connector part 120b of the junction box 120 and hence may be omitted. Thus, superfluous attachment of a member component does not occur in the standard harness 11 and the extension harness 12.

Further, the extension electronic device 29 optionally post-mounted on the target vehicle can be added and connected through the additional connection member 13N to the extension harness 12 at an optional position. This post-attachment of the extension electronic device 29 to the extension harness 12 can be applied to the vehicle harness at the time of manufacture as well as to the extension harness 12 for the vehicle harness wired in a completed vehicle.

Further, when the extension harness 12 is employed, an extension electronic device 29 can easily be post-attached without the necessity of adding a change to the standard harness 11. That is, in the extension harness 12, the specification of the communication line 25 or the power line 23 can easily be changed in accordance with the number of extension electronic devices 29 or the type of the extension electronic device 29.

Further, in the vehicle harness structure according to the conventional art, when the number of extension electronic devices 29 increases, part numbers for the entire wire harnesses increases in accordance with an increase in the number of combinations of attachment of the extension electronic devices. In contrast, in the vehicle harness structure of the present embodiment, the extension harness 12 is attached to the standard harness 11, part numbers for the additional connection members 13N (13A, 13B) connected in a branched manner by post-attachment to the extension harness 12 in correspondence to the extension electronic devices 29 are provided. This simplifies management of the manufacturing parts and hence reduces the manufacturing cost of the wire harness.

Further, in the vehicle harness structure shown in FIGS. 16A to 16D, the additional connection member 13N (13A, 13B) for connecting the extension harness 12 to the extension electronic device 29 is connected in a branched manner through the harness branching connection mechanism 31C to a connection part leading to the extension harness 12. When attaching the harness branching connection mechanism 31C to the extension harness 12, the pressure contact part 33 cuts through the insulating cover that covers the conductor of each of the power line 23, the communication line 25, and the ground line 27 of the extension harness 12 so that the pressure contact part 33 is connected to each conductor. Thus, when attaching the harness branching connection mechanism 31C to the extension harness 12, the connection between the extension harness 12 and the extension electronic device 29 is made in a simple manner.

Here, when a fuse function is incorporated as the extension control section 121, in the extension electronic device 29, direct connection to the extension harness 12 can be performed or, alternatively, simultaneous mounting of a plurality can be performed. This permits post-attachment (instant attachment) of a function or reduction of the number of systems in the extension harness 12 and the communication line 25.

Further, when a microcomputer is incorporated as the extension control section 121, control of switch input, sensor input, PWM output, or the like of the extension electronic device 29 can easily be handled. Such control of the extension electronic device 29 is performed by the microcomputer. Thus, specification change or the like can easily be handled by software.

Further, in the vehicle harness structure shown in FIG. 18, the common extension box part 173 connected to the extension harness 12 can be connected to the standard box part 171 of plural kinds or, alternatively, the common standard box part 173 of plural kinds can selectively be connected to the common standard box part 171. Thus, compatibility is improved.

Further, in the vehicle harness structure shown in FIG. 19, when the extension electronic device 29E is to be selectively attached to the target vehicle, the extension electronic device 29E is post-attached through the additional connection member 13R in which one end alone of the communication line 25A is connected in a branched manner to the communication line 25 of the extension communication harness 14 connected to the gateway device 140A. Further, when an extension electronic device 29E is not to be attached to the target vehicle, the extension communication harness 14 may be omitted and not connected to the gateway device 140A. Thus, superfluous attachment of a member component does not occur in the gateway device 140A and the extension communication harness 14.

Further, the extension electronic device 29E optionally post-mounted on the target vehicle can be added and connected through the additional connection member 13R including the control function section 15A to an optional position of the extension communication harness 14. This post-attachment of the extension electronic device 29E to the extension communication harness 14 can be applied to the vehicle harness at the time of manufacture as well as to the extension communication harness 14 for the vehicle harness wired in a completed vehicle.

Further, when the extension communication harness 14 is employed, an extension electronic device 29E can easily be post-attached without the necessity of adding a change to the harness for connecting the gateway device 140A to the junction box 120. That is, in the extension communication harness 14, the specification of the communication line 25 can easily be changed in accordance with the number of extension electronic devices 29E or the type of the extension electronic device 29E. Thus, when an extension electronic device 29E which need be connected to the communication line 25 alone is to be selectively attached to the target vehicle, it is sufficient that the extension electronic device 29E is post-mounted on the extension communication harness 14 connected to the gateway device 140A through the additional connection member 13R including a control function section 15A. That is, the extension electronic device 29E need not be connected through a junction box 120.

Thus, according to the vehicle harness structure of each embodiment given above, part numbers of the wire harness 1 can be reduced and superfluous attachment in the wire harness 1 can be avoided.

Here, the features of the embodiments shown in FIGS. 14 to 19 are briefly summarized below.

The vehicle harness structure includes a standard control section (119) configured to control the standard electronic device (118) to be mounted in common on target vehicles, a junction box (120) having an extension control section (121) configured to control an extension electronic device (29) to be optionally post-mounted on the target vehicles, a standard connector part (120a) provided on the junction box (120) to connect the junction box to one end of the standard harness (11) connected to the standard electronic device (118), and an extension connector part (120b) provided on the junction box (120) to connect the junction box to an extension harness (12) including at least one of the communication line (25) and the power line (23) to which one end of an additional connection member (13N, 13P, 13Q) is connected in a branched manner by post-attachment, the additional connection member (13N, 13P, 13Q) having another end connected to an extension electronic device (29).

The junction box (170) may include a standard box part (171) having a standard control section (119), and an extension box part (173) having an extension control section (121), the extension box part (173) being attachable and detachable with respect to the standard box part (171).

A harness branching connection mechanism (31C) provided at one end of the additional connection member (13N, 13P, 13Q) may be connected in a pressed manner to the conductor of at least one of the communication line (25) and the power line (23) of the extension harness (12).

The vehicle harness structure includes a gateway device (140A) connected to a junction box (120) having a standard control section (119) configured to control a standard electronic device (118) to be mounted in common on target vehicles, the gateway device (140A) being configured to relays data transmission and reception between the in-vehicle networks, and an extension communication harness (14) including a communication line (25) connected to the gateway device (140A), one end of an additional connection member (13R) including a control function section (15A) configured to control the extension electronic device (29E) being connected in a branched manner by post-attachment to the communication line (25), and the other end of the additional connection member (13R) being connected to at least one extension electronic device (29E) to be optionally post-mounted on the target vehicle.

The harness branching connection mechanism (31C) provided at one end of the additional connection member (13R) may be connected in a pressed manner to the conductor of the communication line (25) of the extension communication harness (14).

Another embodiment of the present invention is described below with reference to FIGS. 20 to 23.

The present embodiment relates to an in-vehicle electronic device connection system in which a plurality of electronic devices each including at least one of a load, a switch, and a sensor are connected through a predetermined wire harness to an electric system of a vehicle so that electric source power is supplied at least from the vehicle side to each electronic device.

The present embodiment provides an in-vehicle electronic device connection system in which even when an optional electronic device is connected, the configuration of the wire harness is simplified so that the number of kinds of the wire harnesses can be reduced and, at the same time, appropriate protection can be performed against an excessive load current in each system by a protective device arranged in a relatively small space.

The in-vehicle electronic device connection system is configured such that a plurality of electronic devices are connected through the wire harness to the electric system of the vehicle, and such that electric source power is supplied at least from the vehicle side to the individual electronic devices. The in-vehicle electronic device connection system includes a standard system electric power distribution section configured to distribute electric source power from the power supply in the vehicle so as to supply electric power to a plurality of main lines of the standard system of the wire harness, and an extension system electric power distribution section configured to distribute electric source power from the power supply so as to supply electric power to each of a plurality of main lines of the extension system of the wire harness. According to this configuration, even when a large number of optional electronic devices are connected, the number of electric wires constituting the wire harness can be reduced.

The extension system electric power distribution section may include a switching section provided for each of the plurality of main lines of the extension system of the wire harness, and a plurality of the extension system electronic devices may be connected through the main line of the extension system to the switching section. According to this configuration, a plurality of the extension system electronic devices are allowed to be connected to a single main line. Thus, in a case that a large number of the extension system electronic devices are to be connected, the number of power lines constituting the main line can be reduced. By virtue of this, in a case that various kinds of wire harnesses corresponding to various vehicle types, various grades, various destinations, or the like are to be prepared in advance, the number of kinds (identified by part numbers) of the wire harnesses to be prepared can be reduced and hence the manufacturing process is simplified and cost reduction is achieved.

Power lines of the extension system electronic devices may be post-connected to a main line of the extension system such that the extension system electronic device is wire-connected to the main line of the extension system. A first extension system electronic device may be directly connected to a main line of the extension system, and a second extension system electronic device may be wire-connected to the main line of the extension system by a post-connection of the power line of the second extension system electronic device to the main line of the extension system. According to this configuration, post-attachment of various functions is easily achieved and hence the added value of the vehicle is improved.

The in-vehicle electronic device connection system may include an electronic fuse arranged in the extension system electric power distribution section and configured to cut off electric current flowing through each of the plurality of main lines of the extension system of the wire harness when the electric current exceeds a cutoff threshold, and a storage section holding the data of the cutoff threshold used by the electronic fuse. According to this configuration, the cutoff threshold of the electronic fuse is variable. Thus, even in a case that the number of electronic devices or the specification of the electronic device connected in the downstream of the extension system electric power distribution section is to be changed, the cutoff threshold can appropriately be changed without the necessity of exchanging a component or the like.

According to the in-vehicle electronic device connection system of the present embodiment, a plurality of electronic devices can be all connected to a common power line. Thus, even when a large number of optional electronic devices are connected, the configuration of the wire harness is simplified so that the number of kinds of the wire harnesses can be reduced. Further, by virtue of the adoption of the common power line and the electronic fuse, appropriate protection can be performed against the over-current and, at the same time, the physical space to be ensured for the extension system electric power distribution section can remarkably be reduced.

Figure 20:
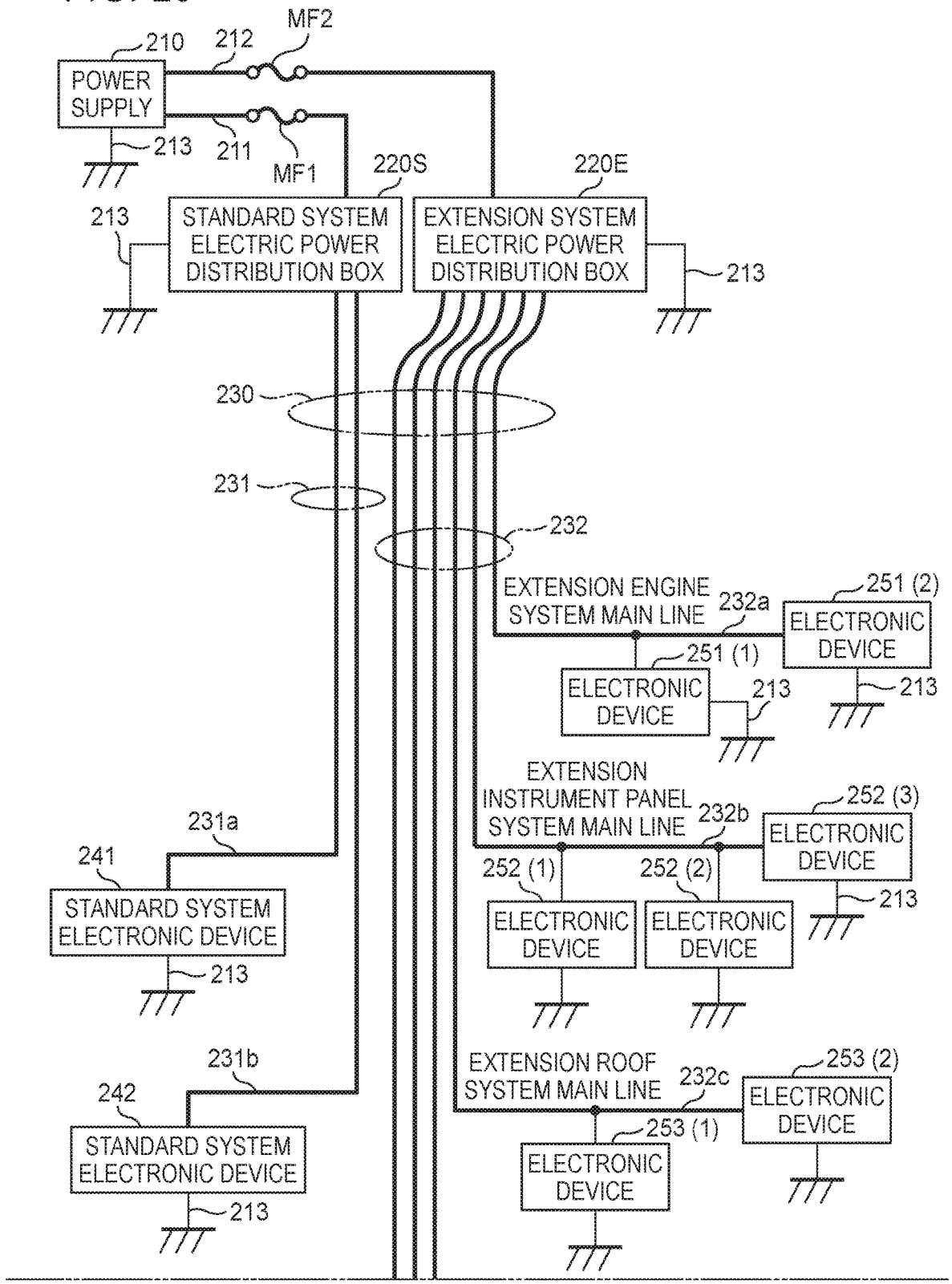
FIG. 20 is a block diagram of an in-vehicle electronic device connection system according to another embodiment of the present invention.

FIG. 20 shows an in-vehicle electronic device connection system of the present embodiment. Actually, a remarkably large number of electronic devices are mounted on one vehicle. However, for simplicity of understanding, FIG. 20 shows the configuration of a main part alone. Further, in FIG. 20, control systems and communication lines for controlling the individual electronic devices are not shown and are omitted.

In the configuration shown in FIG. 20, the standard system electronic devices 241 and 242 (main devices) serving as electronic devices provided as standard are mounted on the vehicle. Further, various extension system electronic devices 251 to 256 (auxiliary devices) can be mounted as options onto the vehicle.

Specific examples for the standard system electronic devices 241, 242 include electronic devices such as head lamps, wipers, tail lamps, and winker lamps mounted as standard onto all vehicles. The extension system electronic devices 251 to 256 are electronic devices mounted selectively depending on a difference in the vehicle type, the grade, the destination (domestic, overseas, or the like), or the like. Typical examples include fog lamps, power windows, electric-powered seats, and a security device.

Such various extension system electronic devices 251 to 256 are divided into groups in advance depending on a difference in the location of mounting or the class in the system. In the example shown in FIG. 20, premised are: an extension system electronic device 251 belonging to the engine system; an extension system electronic device 252 arranged in the vicinity of the instrument panel; an extension system electronic device 253 arranged in the vicinity of the roof of the vehicle body; an extension system electronic device 254 arranged in the vicinity of a door of the vehicle; and other extension system electronic device 255 and 256.

Although not shown in the figure, each of the standard system electronic devices 241 and 242 and the extension system electronic devices 251 to 256 incorporates at least one of a load, a switch, a sensor, and the like. Further, each of these devices includes: a driver for controlling the energization of the load; and a signal processing circuit for processing a signal output from the switch or the sensor.

As a specific example of the load, a lamp, an electric motor, a relay, or the like may be employed. When energized, the load is driven. The driver for controlling the load incorporates a switching element such as a transistor and hence can perform energization ON/OFF of the load or duty control of the energization in response to a control signal.

The standard system electronic devices 241, 242 are connected respectively to the ends of power lines 231a, 231b of a standard system sub harness 231 (a first harness) of a wire harness 230. The standard system sub harness 231 is connected to the downstream of a standard system electric power distribution box 220S (a first electric power distribution section).

The input side of the standard system electric power distribution box 220S is connected through a main fuse MF1 and a power line 211 to an in-vehicle main power supply 210. The in-vehicle main power supply 210 is constructed from a battery, an electric generator (an alternator), or the like mounted on the vehicle.

The standard system electric power distribution box 220S distributes, to each output system, electric power (e.g., of voltage +12 V) supplied from the in-vehicle main power supply 210 through the power line 211 so as to supply electric power to the power lines 231a, 231b. Although not shown in the figure, a plurality of fuses are arranged in the inside of the standard system electric power distribution box 220S. When an excessive electric current flows through the power line 231a, 231b owing to a short circuit in the circuit or the like, the electric current can be cut off in the upstream.

In the example shown in FIG. 20, the ground line 213 of each electric circuit is not included in the wire harness 230. Thus, each circuit is connected through the vehicle body fabricated from metal. The ground line 213 may be included as a part of the wire harness 230.

In the configuration shown in FIG. 20, an extension system electric power distribution box 220E (a second electric power distribution section) is included for permitting connection between the in-vehicle system and the extension system electronic devices 251 to 256. An extension system sub harness 232 (a second harness) of the wire harness 230 is connected in the downstream of the extension system electric power distribution box 220E.

The configuration of the extension system sub harness 232 may be changed in accordance with the necessity. In the example shown in FIG. 20, the extension system sub harness 232 includes six lines, namely, an extension engine system main line 232a, an extension instrument panel system main line 232b, an extension roof system main line 232c, an extension door system main line 232d, an extension first auxiliary system main line 232e, and an extension second auxiliary system main line 232f.

Each of the main lines 232a to 232f is constructed from one power line for supplying electric source power (e.g., of voltage +12 V) and satisfies a specification that a plurality of electronic devices can be connected to a single power line. In the configuration shown in FIG. 20, two extension system electronic devices 251(1), 251(2) are both connected to the power line of the extension engine system main line 232a. Further, three extension system electronic devices 252(1), 252(2), 252(3) are all connected to the power line of the extension instrument panel system main line 232b. Similarly, two extension system electronic devices 253(1), 253(2) are connected to the power line of the extension roof system main line 232c, two extension system electronic devices 254(1), 254(2) are connected to the power line of the extension door system main line 232d, one extension system electronic device 255(1) is connected to the power line of the extension first auxiliary system main line 232e, and one extension system electronic device 256(1) is connected to the power line of the extension second auxiliary system main line 232f.

Employable modes of connection between each of the main lines 232a to 232f and each of the extension system electronic devices 251(1) to 256(1) include: a mode of connecting the electric wires to each other (W to W); a mode of connection through short electric wires (a pigtail W/H); a mode of directly attaching the electronic devices to the main line wire harness 70; and a mode of connection through the additional connection members 13 to 13N according to the embodiments given above. By virtue of such a connection method, the optional extension system electronic devices 251(1) to 256(1) can be post-mounted on the main lines 232a to 232f. Further, the mode of connection to the main line 232a to 232f may be different in each extension system electronic device. For example, as shown in FIG. 20, the extension system electronic device 251(2) (a first extension system electronic device) may be directly connected to the extension engine system main line 232a, and the extension system electronic device 251(1) may be wire-connected such that the power line of the extension system electronic device 251(1) (a second extension system electronic device) is post-mounted on the extension engine system main line 232a.

The input side of an extension system electric power distribution box 220E is connected through a main fuse MF2 and a power line 212 to the in-vehicle main power supply 210. The extension system electric power distribution box 220E distributes to the plurality of systems the electric power supplied from the in-vehicle main power supply 210 through power line 212 so as to supply electric power to each of the main lines 232a to 232f of the extension system sub harness 232 connected in the downstream. As described later, the extension system electric power distribution box 220E incorporates the function of an electronic fuse. Thus, when an abnormally large electric current flows through each of the main lines 232a to 232f, this situation can be detected so that the electric current can be cut off immediately.

The outer side of each of the power lines of the main lines 232a to 232f is covered by an electrically insulating cover so that a situation is avoided that the power lines go into electrical contact with each other or with the surroundings. Further, in the electrical connection between each main line 232a to 232f and each extension system electronic device 251 to 256, any connection method such as "pressure contact", "bonding" or "welding" may be employed.

As shown in FIG. 20, one or more of the extension system electronic devices 251 to 256 can be connected to the respective main lines 232a to 232f. Thus, the number of electric wires constituting the extension system sub harness 232 can remarkably be reduced in comparison with the total number of extension system electronic devices 251 to 256 connected in the downstream of the extension system sub harness 232. That is, regardless of the number of extension system electronic devices 251 connected to the extension engine system main line 232a, the extension engine system main line 232a includes one power line alone and the extension system sub harness 232 constructed from the main lines 232a to 232f includes six electric wires. By virtue of this, the number of kinds (identified by part numbers) of the wire harnesses 230 to be prepared in advance in correspondence to a difference in the vehicle type, the grade, and the destination, or the like may remarkably be reduced so that cost reduction is achieved.

Figure 21:
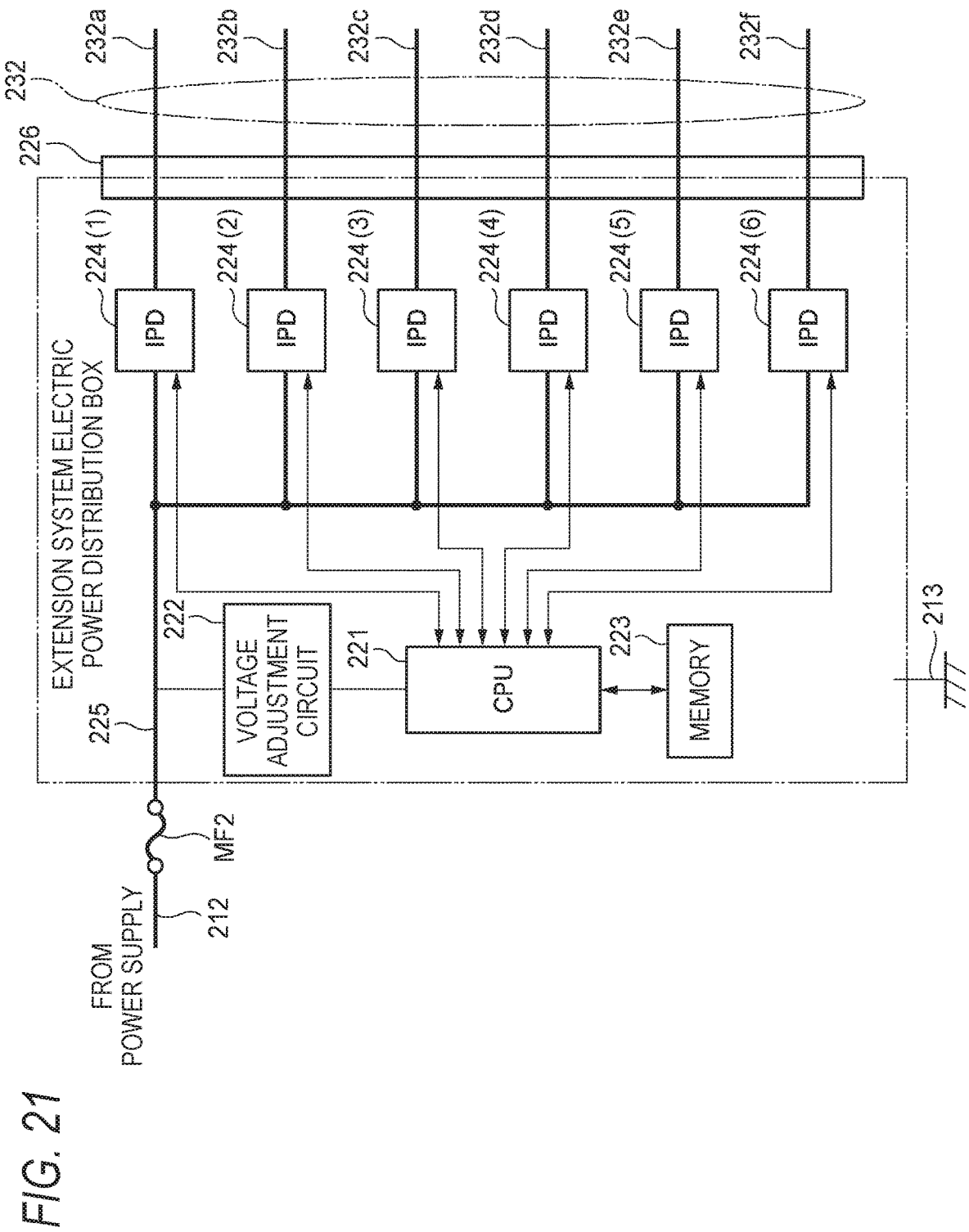
FIG. 21 is a block diagram showing an internal configuration of an extension system electric power distribution box.

FIG. 21 shows the internal configuration of the extension system electric power distribution box 220E. The extension system electric power distribution box 220E shown in FIG. 21 incorporates a microcomputer (CPU) 221, a voltage adjustment circuit 222, a non-volatile memory 223, intelligent power devices (IPDs) 224(1) to 224(6), an input side power line 225, and a connector 226.

The electric power (e.g., of +12 V) supplied from the in-vehicle main power supply 210 is supplied through a main fuse MF2 to the input side power line 225 in the extension system electric power distribution box 220E. The output of the input side power line 225 is branched into a plurality of systems. One system is connected through the IPD 224(1) to the power line of the extension engine system main line 232a. Another system is connected through the IPD 224(2) to the power line of the extension instrument panel system main line 232b. Similarly, the outputs of the IPDs 224(3), 224(4), 224(5), and 224(6) are connected respectively to the power lines of the main lines 232c to 232f.

Thus, the electric source power supplied to the input side power line 225 is distributed to the plurality of output systems and is then output respectively through the IPDs 224(1) to 224(6) to the main lines 232a to 232f Further, a part of the electric power of the input side power line 225 is supplied also to the input of the voltage adjustment circuit 222.

Each of the six IPDs 224(1) to 224(6) serves as a switching section for switching the energization of the load. Each of the six IPDs 224(1) to 224(6) incorporates peripheral circuits such as an output current detection function, a gate driver, and a protection circuit of diverse kind, in addition to the switching element (a power MOSFET).

The microcomputer 221 operates on the basis of the electric source power supplied from the voltage adjustment circuit 222 and thereby executes a program built in in advance so as to realize a control function necessary in the extension system electric power distribution box 220E. This control function includes also the function of an electronic fuse.

As shown in FIG. 21, the microcomputer 221 is connected to the IPDs 224(1) to 224(6) and the non-volatile memory 223. The microcomputer 221 performs ON/OFF of the control signal or duty control for the pulse output to each of the IPDs 224(1) to 224(6) so as to control the switching element of each IPD 224(1) to 224(6) and thereby can control the electric current flowing through the extension system sub harness 232 to the electronic device side.

Further, the microcomputer 221 continuously monitors the magnitude of the electric current flowing to the load side in each output system. When an over-current is detected, the microcomputer 221 turns off the corresponding switching element so as to cut off the electric current. That is, the microcomputer 221 serves as an electronic fuse. The threshold used for identifying whether the monitored electric current is an over-current is written as rewritable data in the non-volatile memory 223. The microcomputer 221 compares the electric current value detected by each of the IPDs 224(1) to 224(6) with the threshold held in the non-volatile memory 223 and thereby identifies whether the detected electric current is an over-current.

For example, the non-volatile memory 223 is constructed from an electrically erasable programmable read-only memory (an EEPROM) and can self-hold the written data even without supply of electric source power. Further, the non-volatile memory 223 can also electrically delete the written data and rewrite it into new data. As described later, the non-volatile memory 223 of the present embodiment holds data including the threshold for the electronic fuse function.

That is, the non-volatile memory 223 stores: the threshold used for identifying whether the magnitude of the load current flowing from the IPD 224(1) to the power line of the extension engine system main line 232a is of an over-current; and the threshold used for identifying whether the magnitude of the load current flowing from the IPD 224(2) to the power line of the extension instrument panel system main line 232b is of an over-current.

The data of the thresholds held in the non-volatile memory 223 is updated manually or automatically in accordance with the magnitude of the consumed electric current in the actual configuration. For example, the over-current threshold serving as the condition for cutting off the IPD 224(1) is adjusted in accordance with the magnitude of and the electric current consumed by the extension system electronic devices 251(1), 251(2) actually connected to the power line of the extension engine system main line 232a. Further, the over-current threshold serving as the condition for cutting off the IPD 224(2) is adjusted in accordance with the magnitude of and the electric current consumed by the extension system electronic devices 252(1), 252(2), 252(3) actually connected to the power line of the extension instrument panel system main line 232b.

From the supply voltage supplied through the input side power line 225, the voltage adjustment circuit 222 generates electric power of stable direct-current voltage (e.g., of +5 V) necessary for the circuits such as the microcomputer 221.

In the actual extension system electric power distribution box 220E, in accordance with the presence or absence of the extension system electronic devices 251 to 256 mounted on the vehicle, the number of mounting of the IPDs 224(1) to 224(6) is changed. For example, in an environment that the extension system electronic devices 255(1) and 256(1) shown in FIG. 20 are not mounted on the vehicle, the extension first auxiliary system main line 232e and the extension second auxiliary system main line 232f are unnecessary and hence the IPDs 224(5), 224(6) for controlling the electric currents for these become also unnecessary.

FIG. 22 shows an example of an over-current threshold table TBL1. That is, as data including the current cutoff threshold used by the electronic fuse, the non-volatile memory 223 of the present embodiment holds the over-current threshold table TBL1 as shown in FIG. 22. The contents of the over-current threshold table TBL1 are updated in accordance with the necessity.

The over-current threshold table TBL1 shown in FIG. 22 can hold an individual current reference value CurX, an addition current reference value CurXref, a current cutoff threshold CurX_TH, and error information, for each output system (X) corresponding to each main line 232a to 232f. Further, since a plurality of electronic devices can be connected to each output system, individual current reference values CurX for a plurality of devices can be held.

For example, the individual current reference value CurA1 in the over-current threshold table TBL1 shown in FIG. 22 indicates a measured value of the power supply electric current consumed in a normal state during isolated operation of the first extension system electronic device 251(1) connected to the extension engine system main line 232a. Further, the individual current reference value CurA2 indicates a measured value of the power supply electric current consumed in a normal state during isolated operation of the second extension system electronic device 251(2) connected to the extension engine system main line 232a.

Further, the addition current reference value CurAref in the over-current threshold table TBL1 shown in FIG. 22 indicates a measured value of the power supply electric current consumed in a normal state during simultaneous operation of all extension system electronic devices 251(1) and 51(2) connected to the extension engine system main line 232a.

Further, the current cutoff threshold CurA_TH in the over-current threshold table TBL1 shown in FIG. 22 is a threshold determined on the basis of the addition current reference value CurAref or the individual current reference values CurA1 and CurA2. When the magnitude of the load current flowing to each output system exceeds the current cutoff threshold CurX_TH, the electronic fuse provided in the extension system electric power distribution box 220E controls the IPD 224 so as to cut off the electric current. The error information in the over-current threshold table TBL1 is information used for recognizing whether a problem has occurred in the system.

Figure 23:
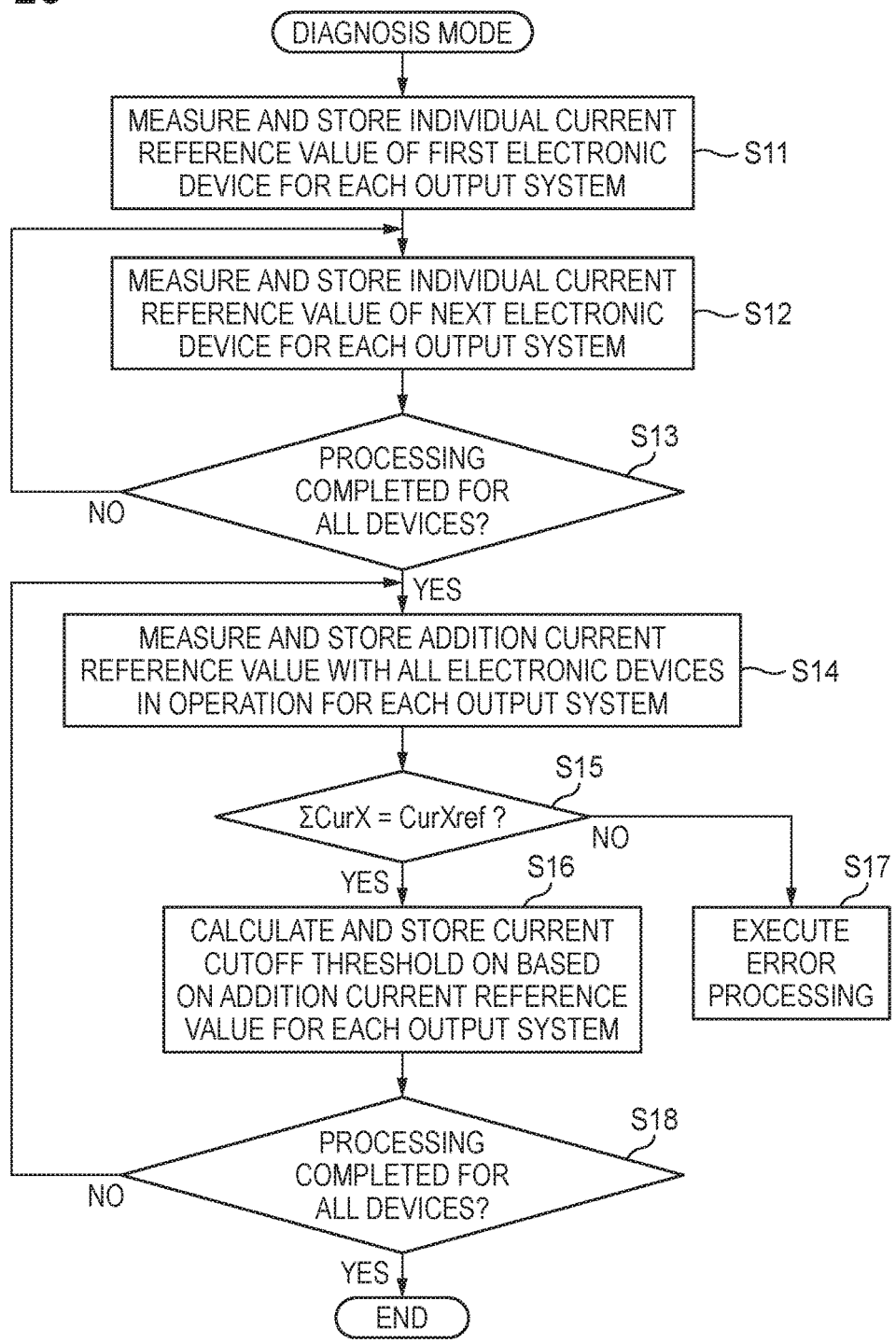
FIG. 23 is a flow chart showing an example of operation of a diagnosis mode.

FIG. 23 shows an example of operation of a diagnosis mode. That is, the microcomputer 221 in the extension system electric power distribution box 220E shown in FIG. 21 executes the operation of the diagnosis mode shown in FIG. 23 so as to automatically update the contents of the over-current threshold table TBL1 shown in FIG. 22 in accordance with the extension system electronic devices 251 to 256 having actually been connected so that an appropriate current cutoff threshold can automatically be determined.

Employable conditions for executing the operation of the diagnosis mode shown in FIG. 23 include: a timing immediately posterior to an ignition switch of the vehicle being turned ON; and a timing that any button is operated. The operation shown in FIG. 23 is described below.

At step S11, for each output system of the extension system electric power distribution box 220E, the microcomputer 221 measures the individual current reference value CurX of the first electronic device connected in the downstream, and stores the measured value into the over-current threshold table TBL1.

For example, when diagnosis is to be performed on the output system of the extension engine system main line 232a, in a state that the first extension system electronic device 251(1) is operated in an ordinary state and the other extension system electronic device 251(2) is maintained non-energized (powered OFF), the load current value detected by the IPD 224(1) is sampled so that the individual current reference value CurA1 can be acquired.

The individual control of the plurality of extension system electronic devices 251(1), 251(2) is realized when an upper level electronic control unit (ECU) (not shown) performs communication with the microcomputer 221.

At step S12, for each output system of the extension system electric power distribution box 220E, the microcomputer 221 measures the individual current reference value CurX of the next electronic device (following the first one)

connected in the downstream, and stores the measured value into the over-current threshold table TBL1.

For example, when the individual current reference value CurA2 of the second extension system electronic device 251(2) connected to the extension engine system main line 232a is to be measured, in a state that the first extension system electronic device 251(1) is switched into a non-energized state and the second extension system electronic device 251(2) is operated in an ordinary state, the load current value detected by the IPD 224(1) is sampled so that the individual current reference value CurA2 is acquired.

The microcomputer 221 repeats the execution of the processing of step S12 for all extension system electronic devices in each output system. When the processing is completed for all extension system electronic devices, the procedure goes from S13 to S14.

At step S14, for each output system of the extension system electric power distribution box 220E, the microcomputer 221 measures as the addition current reference value CurXref the magnitude of the load current in a state that all electronic devices connected in the downstream operate in an ordinary state, and stores the measured value into the over-current threshold table TBL1.

For example, when the addition current reference value CurAref of the extension engine system main line 232a is to be measured, in a state that both the extension system electronic devices 251(1), 251(2) having been connected are switched into a normal operating state, the load current value detected by the IPD 224(1) is sampled so that this value is adopted as the addition current reference value CurAref.

At step S15, the microcomputer 221 compares for each output system the total ΣCurX of the individual current reference values with the addition current reference value CurXref in the over-current threshold table TBL1. When ΣCurX is almost equal to CurXref, the procedure goes from S15 to S16. In case of disagreement, the procedure goes to S17.

For example, in the output system of the extension engine system main line 232a, since the two extension system electronic devices 251(1), 251(2) are connected, the result obtained by adding together the two individual current reference values CurA1 and CurA2 in the over-current threshold table TBL1 is adopted as the total/CurA.

For example, when the electric current values obtained by measurement at S11 and S12 are relatively stable and the measurement operation of the electric currents has been completed normally, ΣCurX approximately agrees with CurXref. Thus, the procedure goes to S16. On the other hand, in a case that the electric current values obtained by measurement at S11 and S12 have a large fluctuation or that an abnormality has occurred in the measurement operation of the electric currents or the like, ΣCurX and CurXref have a relatively large difference from each other at high possibility. Thus, the procedure goes to S17.

At step S16, for each output system, on the basis of the addition current reference value CurXref in the over-current threshold table TBL1, the microcomputer 221 automatically calculates an appropriate current cutoff threshold CurX_TH and stores the value into the over-current threshold table TBL1. As a specific example, the calculation is performed by the following formula.

$$CurX\_TH = CurXref + K1\_X + K2\_X, \text{ where}$$

K1_X denotes a constant indicating an expected maximum of ordinary current variation, and K2_X denotes a constant corresponding to a margin.

At step S17, the microcomputer 221 executes error processing set forth in advance. For example, as the error information in the over-current threshold table TBL1, the microcomputer 221 writes information indicating the occurrence of an error. Further, the microcomputer 221 displays a situation that the operation of the system is in an abnormal state, by using an abnormality display function in the vehicle so as to inform the error to the driver or the like.

When the processing of S14 to S16 is repeated so that update of the data in the over-current threshold table TBL1 has been completed for all extension system electronic devices 251 to 256 connected in the downstream of the extension system sub harness 232, the processing shown in FIG. 23 is terminated.

After the update of the data in the over-current threshold table TBL1 has been completed in the processing shown in FIG. 23, the microcomputer 221 continuously monitors the magnitude of the load current flowing through each main line 232a to 232f and compares each detected present current value with the current cutoff threshold CurX_TH in the over-current threshold table TBL1. When the present current value exceeds the current cutoff threshold CurX_TH, the IPD 224 for controlling the electric current of each corresponding main line is switched into a non-conduction state so that the output current is cut off. That is, the microcomputer 221 serves as an electronic fuse.

The above-mentioned in-vehicle electronic device connection system has advantages listed below.

Without the necessity of changing the configuration of the extension system sub harness 232 connected in the downstream of the extension system electric power distribution box 220E, one or a plurality of the extension system electronic devices 251 to 256 can be connected to the main line 232a to 232f of each system. Further, an extension system electronic device can be added later for example, in accordance with a desire of the user.

In the main line 232a to 232f of each system of the extension system sub harness 232, a plurality of extension system electronic devices are allowed to be connected to a single power line. Thus, in a case that a large number of extension system electronic devices are to be connected, the number of power lines constituting the extension system sub harness 232 can be reduced. By virtue of this, in a case that various kinds of wire harnesses corresponding to various vehicle types, various grades, various destinations, or the like are to be prepared in advance, the number of kinds (identified by part numbers) of the wire harnesses to be prepared can be reduced and hence the manufacturing process is simplified and cost reduction is achieved.

Since the extension system electric power distribution box 220E incorporates an electronic fuse. Thus, the space to be occupied can be reduced in comparison with a case that a physical fuse is adopted. This permits size reduction of the extension system electric power distribution box 220E.

The electronic fuse of the extension system electric power distribution box 220E utilizes the current cutoff threshold held in the non-volatile memory 223. Thus, the current cutoff threshold of the electronic fuse can be changed in accordance with the actual configuration of the extension system electronic devices 251 to 256 connected in the downstream of the extension system electric power distribution box 220E.

When the operation shown in FIG. 23 is executed, the current cutoff threshold of the electronic fuse can automatically be updated into an appropriate value in accordance with the actual current consumption characteristics of the extension system electronic devices 251 to 256 connected in the downstream of the extension system electric power distribution box 220E.

Here, the features of the embodiments shown in FIGS. 20 to 23 are briefly summarized below.

The in-vehicle electronic device connection system is configured such that a plurality of electronic devices are connected through the wire harness (230) to the electric system of the vehicle so that electric power is supplied at least from the vehicle side to the individual electronic devices. The in-vehicle electronic device connection system includes a standard system electric power distribution section (e.g., the standard system electric power distribution box 220S) configured to distribute electric power from an in-vehicle power supply (e.g., the main power supply 210) so as to supply the electric power to a plurality of main lines (e.g., the power lines 231a, 231b) of a standard system (e.g., the standard system sub harness 231) of the wire harness, and an extension system electric power distribution section (e.g., the extension system electric power distribution box 220E) configured to distribute the electric power from the power supply so as to supply the electric power to a plurality of main lines (e.g., the main lines 232a to 232f) of an extension system (e.g., the extension system sub harness 232) of the wire harness.

The extension system electric power distribution section may include a switching section (e.g., the IPD 224) provided for each of the plurality of main lines of the extension system of the wire harness, and a plurality of the extension system electronic devices may be connected to the switching section through a plurality of the main lines of the extension system.

The power line of the extension system electronic device may be post-connected to the main line of the extension system such that the extension system electronic device is wire-connected to the main line of the extension system.

A plurality of the extension system electronic devices may include a first extension system electronic device and a second extension system electronic device. The first extension system electronic device may be directly connected to the main line of the extension system, and the second extension system electronic device may be wire-connected to the main line of the extension system by post connection of the power line of the second extension system electronic device to the main line of the extension system.

The in-vehicle electronic device connection system may include an electronic fuse arranged in the extension system electric power distribution section and configured to cut off electric current flowing through each of the plurality of main lines of the extension system of the wire harness when the electric current exceeds a cutoff threshold, and a storage section (e.g., the non-volatile memory 223) holding the data of the cutoff threshold used by the electronic fuse.

Another embodiment of the present invention will be described below with reference to FIGS. 24 to 29.

The present embodiment relates to an in-vehicle electronic device connection system for connecting an extension system electronic device including at least one of a load, a switch, and a sensor, to the electric system of a vehicle.

The in-vehicle electronic device connection system includes a standard system electronic device, an extension system electronic device, a power line capable of supplying electric power to the electronic devices, a standard system control ECU configured to control the standard system electronic device, and an extension system control ECU configured to control the extension system electronic device. The extension system electronic device is wire-connected to the power line so as to receive electric power. The extension system electronic device and the extension system control ECU are configured to transmit and receive signals from each other by wireless communication. The extension system control ECU is configured to transmit a control signal by the wireless communication to control the extension system electronic device.

According to this configuration, a communication channel used for controlling the extension system (optional) electronic device can be constructed in the form of wireless connection. This avoids the necessity of adding a communication line for the extension system (optional) electronic device. Thus, the configuration of the main line harness is simplified and hence, even in a case that various kinds of optional electronic devices are prepared, the number of kinds of the main line harnesses to be prepared is remarkably reduced.

The in-vehicle electronic device connection system may further include a main line harness having a common power line capable of supplying electric power to a plurality of electronic devices. In this case, the extension system electronic device is wire-connected to the common power line by a post-connection of the power line of the extension system electronic device to the common power line of the standard system including the standard system electronic device, the standard system control ECU, and the main line harness.

According to this configuration, a plurality of electronic devices are all connected to the common power line of the main line harness. Thus, even when a new extension system (optional) electronic device is to be connected to the main line harness, an electric wire for the supply of electric power to the main line harness need not be added. Further, a communication channel used for controlling the extension system (optional) electronic device can be constructed in the form of wireless connection. Thus, a communication line need not be added to the main line harness. Thus, the configuration of the main line harness is simplified and hence, even in a case that various kinds of optional electronic devices are prepared, the number of kinds of the main line harnesses to be prepared is remarkably reduced. Further, various kinds of optional electronic devices can be post-mounted on the main line harness of the standard system.

According to the present embodiment, the configuration of the wire harness is simplified so that the number of kinds of the wire harnesses can be reduced. Further, without the necessity of increasing the occurrence of superfluous attachment of sub harnesses, post-attachment of optional electronic devices is easy.

Figure 24:
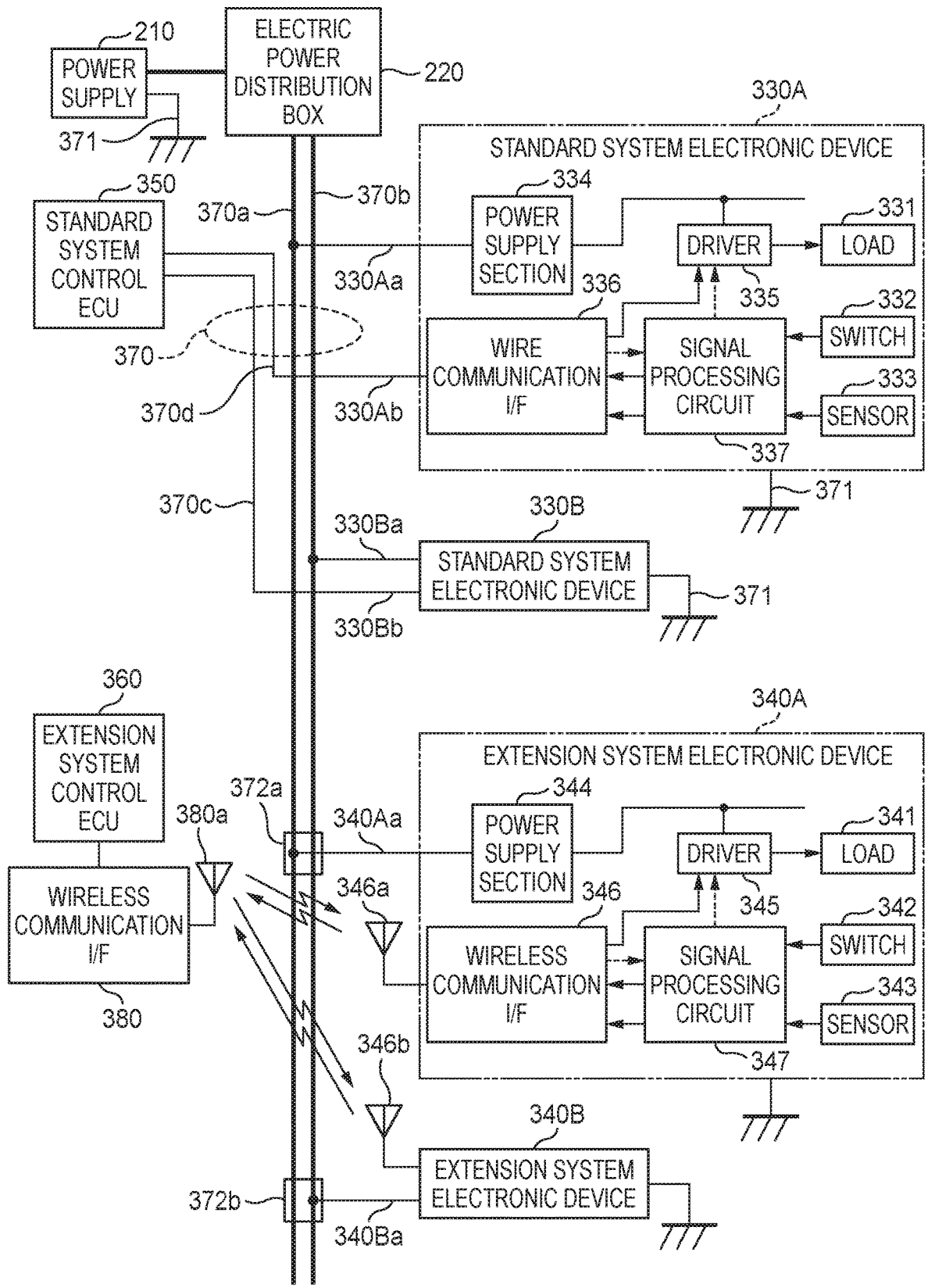
FIG. 24 is a block diagram of an in-vehicle electronic device connection system according to another embodiment of the present invention.

FIG. 24 shows an in-vehicle electronic device connection system of the present embodiment. Actually, a remarkably large number of electronic devices are mounted on one vehicle. However, for simplicity of understanding, FIG. 24 shows the configuration of a main part alone.

In the in-vehicle electronic device connection system shown in FIG. 24, standard system electronic devices 330A, 330B (main devices) serving as electronic devices provided as standard are mounted on a vehicle. Further, extension system electronic devices 340A, 340B (auxiliary devices) are provided as electronic devices allowed to be mounted as options.

For example, the standard system electronic devices 330A, 330B include electronic devices such as head lamps and wipers indispensable in an automobile. For example, the extension system electronic devices 340A, 340B include security devices and rear fog lamps. That is, the standard system electronic devices 330A, 330B are mounted on all vehicles and the extension system electronic devices 340A, 340B are mounted or not mounted depending on a difference in the vehicle type, the grade, and the destination (domestic, overseas, or the like).

In the configuration shown in FIG. 24, the standard system electronic devices 330A, 330B and the extension system electronic devices 340A, 340B are connected to a main line wire harness 370. The main line wire harness 370 is used mainly for supply of electric source power to each electronic device and for transmission of an electric signal for standard system control.

As a basic configuration, the main line wire harness 370 shown in FIG. 24 includes two power lines 370a and 370b and two communication lines 370c and 370d. The outer side of each of the two power lines 370a and 370b and the two communication lines 370c and 370d is covered by an electrically insulating cover so that a situation is avoided that the power lines go into electrical contact with each other or with the surroundings. Further, the actual main line wire harness 370 further includes a sub harness (not shown) in some cases.

The in-vehicle main power supply 210 is constructed from a battery, an electric generator (an alternator), or the like mounted on the vehicle. Electric power (e.g., of +12 V) supplied by the in-vehicle main power supply 210 is distributed to a plurality of systems in the inside of an electric power distribution box 220 and is then supplied to the main line wire harness 370 connected in the downstream of the electric power distribution box 220. That is, electric source power is supplied to each of the power lines 370a and 370b. The supplied electric currents can be managed independently for each system of the power lines 370a and 370b.

In the configuration shown in FIG. 24, a power line 330Aa of the standard system electronic device 330A is connected to the power line 370a and a power line 330Ba of the standard system electronic device 330B is connected to the power line 370b. Further, a power line 340Aa of the extension system electronic device 340A is connected to the power line 370a at a position of the connection part 372a in the vicinity and a power line 340Ba of the extension system electronic device 340B is connected to the power line 370b at a position of the connection part 372b in the vicinity.

On the other hand, a communication line 330Ab of the standard system electronic device 330A is connected to the communication line 370d of the main line wire harness 370 and a communication line 330Bb of the standard system electronic device 330B is connected to the communication line 370c. That is, a standard system control electronic control unit (ECU) 350 (a main device ECU) for controlling the standard system electronic devices 330A, 330B are connected through the communication lines 370c and 370d of the main line wire harness 370 to the standard system electronic devices 330A, 330B.

Each of the extension system electronic devices 340A, 340B includes a wireless communication function. An extension system control ECU 360 (an auxiliary device control ECU) for controlling the extension system electronic devices 340A, 340B includes a wireless communication interface (I/F) 380. That is, the extension system control ECU 360 ensures a wireless communication channel to each of the extension system electronic devices 340A, 340B and hence can perform bidirectional data communication for the purpose of control.

Thus, in a case that the extension system electronic device 340A or 340B is mounted on a vehicle, when these power lines (40Aa, 40Ba) are merely connected to the main line wire harness 370, the extension system control ECU 360 is allowed to control the extension system electronic device 340A or 340B.

As such, formed are: a standard system constructed such as to include the standard system electronic device 330A, the standard system control ECU 350, and the main line wire harness 370; and an extension system constructed such as to include the extension system electronic device 340A, the extension system control ECU 360, and the main line wire harness 370.

Here, in the electrical connection between the power line 340Aa and the power line 370a in the connection part 372a, any connection method such as "pressure contact", "bonding" or "welding" may be employed. This holds also in the electrical connection between the power line 340Ba and the power line 370b in the connection part 372b.

Further, employable modes of connection between the main line wire harness 370 and each of the extension system electronic devices 340A, 340B include: a mode of connecting the electric wires to each other (W to W); a mode of connection through short electric wires (a pigtail W/H); a mode of directly attaching the electronic devices to the main line wire harness 370; and a mode of connection through the additional connection members 13 to 13N according to the embodiments given above. By virtue of such a connection method, the optional extension system electronic devices 340A, 340B can be post-attached.

As for the wireless communication standard of the wireless communication interface 380, a communication standard of diverse kind may be employed. For example, a standard set forth as IEEE 802.15.1, that is, Bluetooth (registered trademark), may be employed.

Electric source power necessary in the standard system control ECU 350, the extension system control ECU 360, the wireless communication interface 380, and the like is supplied from the output of the electric power distribution box 220 through a sub harness (not shown).

The standard system electronic device 330A incorporates a load 331, a switch 332, a sensor 333, a power supply section 334, a driver 335, a wire communication interface 336, and a signal processing circuit 337. The presence or absence or the number of pieces concerning the load 331, the switch 332, and the sensor 333 actually incorporated in the standard system electronic device 330A is changed in accordance with the necessity. The standard system electronic device 330B has a similar configuration.

As a specific example of the load 331, a lamp, an electric motor, a relay, or the like may be employed. When energized, the load 331 is driven. The driver 335 is provided for controlling the energization of the load 331. The driver 335 incorporates a switching element such as a transistor and hence can perform energization ON/OFF of the load 331 or duty control of the energization in response to a control signal.

That is, when the switching element of the driver 335 goes ON, the electric source power supplied through the power line 370a is supplied through the power line 330Aa, the power supply section 334, and the driver 335 to the load 331. A control signal for controlling the load 331 is output by the standard system control ECU 350, and is input through the communication line 370d, the communication line 330Ab, and the wire communication interface 336 into the driver 335. Here, as indicated by a dashed line in FIG. 24, the control signal received by the wire communication interface 336 may be input through the signal processing circuit 337 into the driver 345.

For example, in response to operation of the user, the switch 332 outputs an electric signal for causing ON/OFF. The sensor 333 outputs an electric signal indicating a measured value, a status, or the like of diverse kind. The signal processing circuit 337 processes, for example, periodically, the electric signals output by the switch 332 and the sensor 333 so as to generate information suitable for data communication.

The wire communication interface 336 establishes a data communication channel to the standard system control ECU 350 through the communication line 370d and 330Ab. Further, the wire communication interface 336 receives the control signal output by the standard system control ECU 350 and provides the received signal to the driver 335. Furthermore, the wire communication interface 336 transmits various information output by the signal processing circuit 337, to the standard system control ECU 350 by data communication.

In the configuration shown in FIG. 24, the main line wire harness 370 does not include a ground line. Thus, for example, the metal vehicle body is employed as the ground. That is, the ground side of the power supply of the standard system electronic device 330A is connected through the ground line 371 to the ground point in the vehicle body.

The extension system electronic device 340A incorporates a load 341, a switch 342, a sensor 343, a power supply section 344, a driver 345, a wireless communication interface 346, and a signal processing circuit 347. The presence or absence or the number of pieces concerning the load 341, the switch 342, and the sensor 343 actually incorporated in the extension system electronic device 340A is changed in accordance with the necessity. The extension system electronic device 340B has a similar configuration.

As a specific example of the load 341, a lamp, an electric motor, a relay, or the like may be employed. When energized, the load 341 is driven. The driver 345 is provided for controlling the energization of the load 341. The driver 345 incorporates a switching element such as a transistor and hence can perform energization ON/OFF of the load 341 or duty control of the energization in response to a control signal.

That is, when the switching element of the driver 345 goes ON, the electric source power supplied through the power line 370a is supplied through the power line 340Aa, the power supply section 344, and the driver 345 to the load 341. A control signal for controlling the load 341 is output by the extension system control ECU 360 and is input through the wireless communication interface 380, the antenna 380a, the antenna 346a, and the wireless communication interface 346 into the driver 345. Here, as indicated by a dashed line in FIG. 24, the control signal received through the antenna 346a may be input through the wireless communication interface 346 and the signal processing circuit 347 into the driver 345.

In order that a wireless communication channel may be ensured between the wireless communication interface 346 and the wireless communication interface 380, the wireless communication interface 346 is constructed such as to agree with the communication standard of the wireless communication interface 380.

For example, in response to operation of the user, the switch 342 outputs an electric signal for causing ON/OFF. The sensor 343 outputs an electric signal indicating a measured value, a status, or the like of diverse kind. The signal processing circuit 347 processes, for example, periodically, the electric signals output by the switch 342 and the sensor 343 so as to generate information suitable for data communication.

The wireless communication interface 346 ensures a data communication channel between the extension system control ECU 360 and the extension system electronic device 340A through the wireless communication channel. Further, the wireless communication interface 346 receives the control signal output by the extension system control ECU 360 and provides the received signal to the driver 345. Furthermore, the wireless communication interface 346 transmits various information output by the signal processing circuit 347, to the extension system control ECU 360 by data communication.

In the configuration shown in FIG. 24, the main line wire harness 370 does not include a ground line. Thus, for example, the metal vehicle body is employed as the ground. That is, the ground side of the power supply of the extension system electronic device 340A is connected through the ground line 371 to the ground point in the vehicle body.

Figure 25:
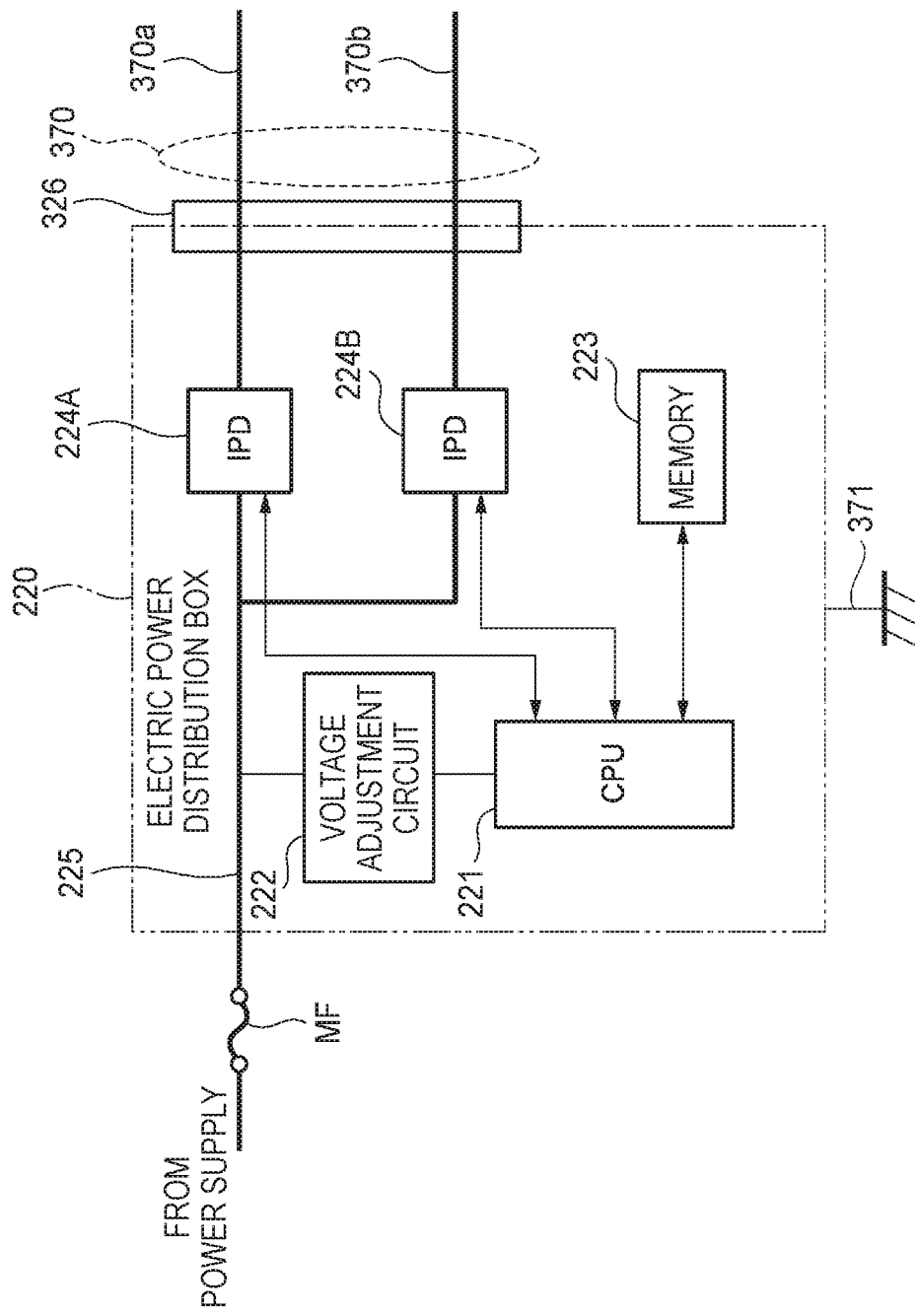
FIG. 25 is a block diagram showing an internal configuration of an electric power distribution box.

FIG. 25 shows the internal configuration of the electric power distribution box 220 incorporating the function of an electronic fuse. The electric power distribution box 220 incorporates intelligent power devices (IPDs) 224A and 224B, a microcomputer (CPU) 221, a non-volatile memory 223, a voltage adjustment circuit 222, an input side power line 225, and a connector 326.

The electric power (e.g., of +12 V) supplied from the in-vehicle main power supply 210 is supplied through a main fuse 27 to the input side power line 225 in the electric power distribution box 220. The output of the input side power line 225 is branched into a plurality of systems. One system is output through the IPD 224A to the power line 370a of the main line wire harness 370. Another system is output through the IPD 224B to the power line 370b of the main line wire harness 370. That is, the electric source power supplied to the input side power line 225 is distributed to the plurality of output systems (370a, 370b) and is then output individually. Further, a part of the electric power of the input side power line 225 is supplied also to the input of the voltage adjustment circuit 222.

Each of the IPDs 224A and 224B incorporates peripheral circuits such as an output current detection function, a gate driver, and a protection circuit of diverse kind, in addition to the element (a power MOSFET) for switching the energization of the load.

The microcomputer 221 operates on the basis of the electric source power supplied from the voltage adjustment circuit 222 and thereby executes a program built in in advance so as to realize a control function necessary in the electric power distribution box 220. This control function includes also the function of an electronic fuse.

As shown in FIG. 25, the microcomputer 221 is connected to the IPDs 224A and 224B and the non-volatile memory 223. The microcomputer 221 performs ON/OFF of the control signal or duty control for the pulse output to each of the IPDs 224A and 224B so as to control the switching element of each IPD 224A or 224B and thereby can control the electric current flowing to the load side.

Further, the microcomputer 221 continuously monitors the magnitude of the electric current flowing to the load side in each output system. When an over-current is detected, the microcomputer 221 turns off the corresponding switching element so as to cut off the electric current. That is, the microcomputer 221 serves as an electronic fuse. The threshold used for identifying whether the monitored electric current is an over-current is written as rewritable data in the non-volatile memory 223. The microcomputer 221 compares the electric current value detected by each of the IPDs 224A and 224B with the threshold held in the non-volatile memory 223 and thereby identifies whether the detected electric current is an over-current.

For example, the non-volatile memory 223 is constructed from an electrically erasable programmable read-only memory (an EEPROM) and can self-hold the written data even without supply of electric source power. Further, the non-volatile memory 223 can also electrically delete the written data and rewrite it into new data. The non-volatile memory 223 of the present embodiment holds data expressing the threshold for the electronic fuse function.

That is, the non-volatile memory 223 stores: the threshold used for identifying whether the magnitude of the load current flowing from the IPD 224A to the power line 370a is of an over-current; and the threshold used for identifying whether the magnitude of the load current flowing from the IPD 224B to the power line 370b is of an over-current.

The data of the thresholds held in the non-volatile memory 223 is updated manually or automatically in accordance with the magnitude of the consumed electric current in the actual configuration. For example, the over-current threshold serving as the condition for cutting off the IPD 224A is adjusted in accordance with the magnitude of and the electric current consumed by the standard system electronic device 330A and the extension system electronic device 340A actually connected to the power line 370a. Further, the over-current threshold serving as the condition for cutting off the IPD 224B is adjusted in accordance with the magnitude of and the electric current consumed by the standard system electronic device 330B and the extension system electronic device 340B actually connected to the power line 370b.

From the supply voltage supplied through the input side power line 225, the voltage adjustment circuit 222 generates electric power of stable direct-current voltage (e.g., of +5 V) necessary for the circuits such as the microcomputer 221.

Advantages of the in-vehicle electronic device connection system shown in FIGS. 24 and 25 over the conventional art are listed below.

In a case that the optional extension system electronic devices 340A, 340B are to be post-mounted on a vehicle on which the standard system electronic devices 330A, 330B alone are mounted, the additional connection can be performed with utilizing intact the main line wire harness 370 of standard configuration. Thus, connection work at the time of post-attachment becomes easy. Further, post-attachment of various functions is easy and hence the added value of the vehicle is improved.

A plurality of electronic devices can be all connected to the same electric wire 370a, 370b. This reduces the number of electric wires 370a to 370d of the main line wire harness 370 of the standard configuration. Thus, the number of kinds (identified by part numbers) of the main line wire harnesses 370 to be prepared in advance can also remarkably be reduced and hence cost reduction is achieved.

Dedicated electric wires for connection of the optional extension system electronic devices 340A, 340B are not included in the main line wire harness 370. Thus, in a vehicle having a specification that the extension system electronic devices 340A, 340B are not connected, useless components (such as electric wires and connectors) whose attaching is useless do not occur in the main line wire harness 370 and hence cost reduction is achieved.

In the function of an electronic fuse provided in the electric power distribution box 220, the threshold for the over-current of each output system can be changed in accordance with the number and the specification of the standard system electronic devices 330A, 330B and the extension system electronic devices 340A, 340B connected to the main line wire harness 370. Thus, the configuration of the hardware in the inside of the electric power distribution box 220 need not be changed regardless of the presence or absence of the extension system electronic devices 340A, 340B or a change in the specification.

The extension system control ECU 360 is connected to each of the extension system electronic devices 340A, 340B through a wireless communication channel. Thus, the number of connection parts between the extension system electronic devices 340A, 340B and the main line wire harness 370 can be reduced and hence the number of electric wires constituting the main line wire harness 370 can be reduced. Thus, the number of kinds (identified by part numbers) of the main line wire harnesses 370 to be prepared in advance can also remarkably be reduced and hence cost reduction is achieved.

Figure 26:
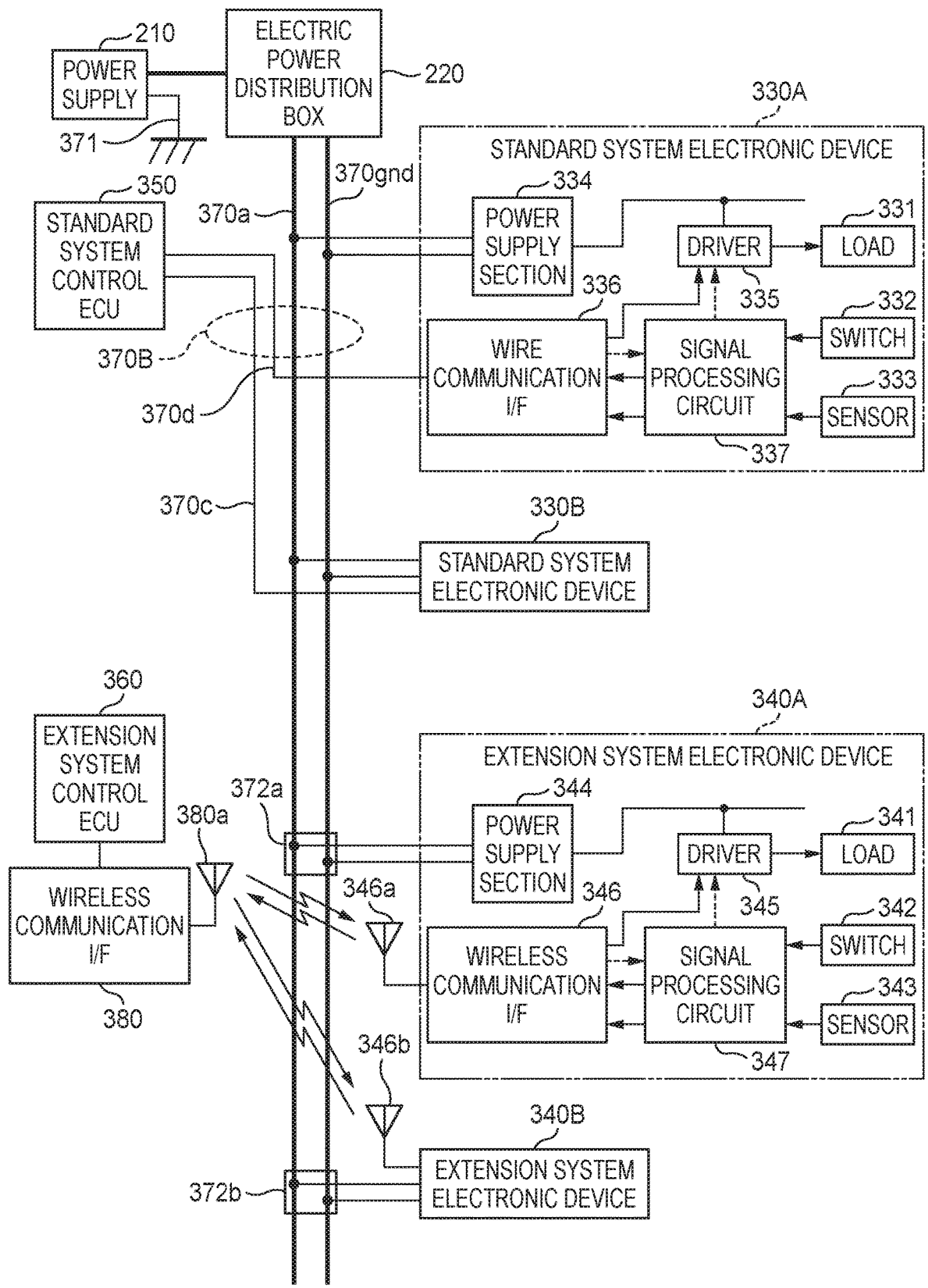
FIG. 26 is a block diagram showing a configuration of a first modification to an in-vehicle electronic device connection system.

FIG. 26 shows a first modification to the configuration of the in-vehicle electronic device connection system. In the in-vehicle electronic device connection system, in the main line wire harness 370B connected in the downstream of the electric power distribution box 220, a ground line 370gnd is provided in place of the power line 370b.

Thus, the standard system electronic devices 330A, 330B and the power supply sections 334, 344 of the extension system electronic devices 340A, 340B are connected individually to the power line 370a and the ground line 370gnd of the main line wire harness 370.

Figure 27:
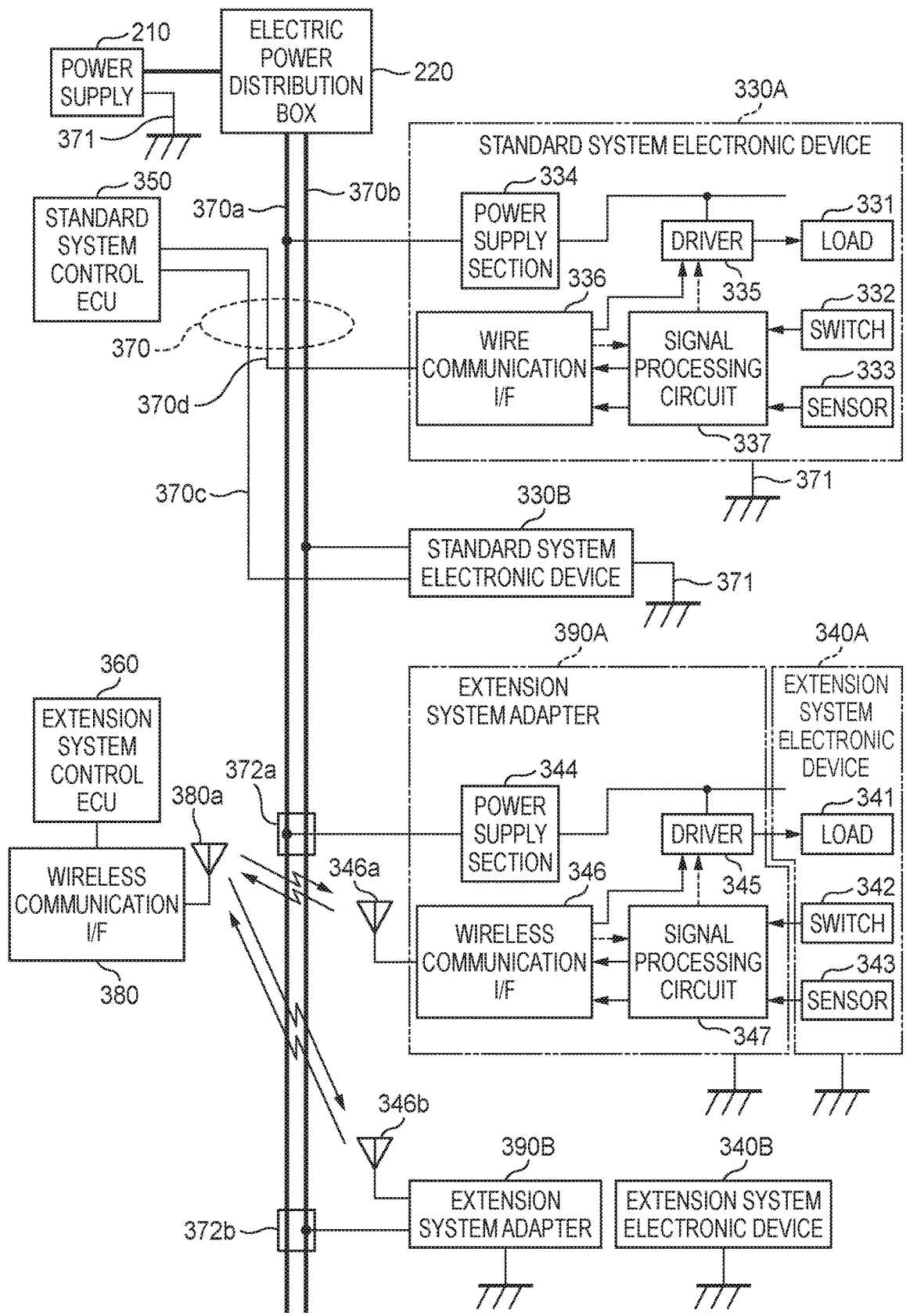
FIG. 27 is a block diagram showing a configuration of a second modification to an in-vehicle electronic device connection system.

FIG. 27 shows a second modification to the configuration of the in-vehicle electronic device connection system described above. In the in-vehicle electronic device connection system, it is premised that each of the extension system electronic devices 340A, 340B is constructed from a simple electric component alone such as a load 341, a switch 342, and a sensor 343.

Thus, a dedicated extension system adapter 390A is employed for connecting the extension system electronic device 340A to the main line wire harness 370 and the extension system control ECU 360. Further, a dedicated extension system adapter 390B is employed for connecting the extension system electronic device 340B to the main line wire harness 370.

Similarly to the extension system electronic device 340A shown in FIG. 24, the extension system adapter 390A incorporates a power supply section 344, a driver 345, a wireless communication interface 346, and a signal processing circuit 347. The configuration of the extension system adapter 390B is similar to that of the extension system adapter 390A.

As shown in FIG. 27, when the extension system adapter 390A or 390B is inserted between the main line wire harness 370 and the extension system electronic device 340A, various kinds of electronic devices can be added to the in-vehicle system.

Figure 28:
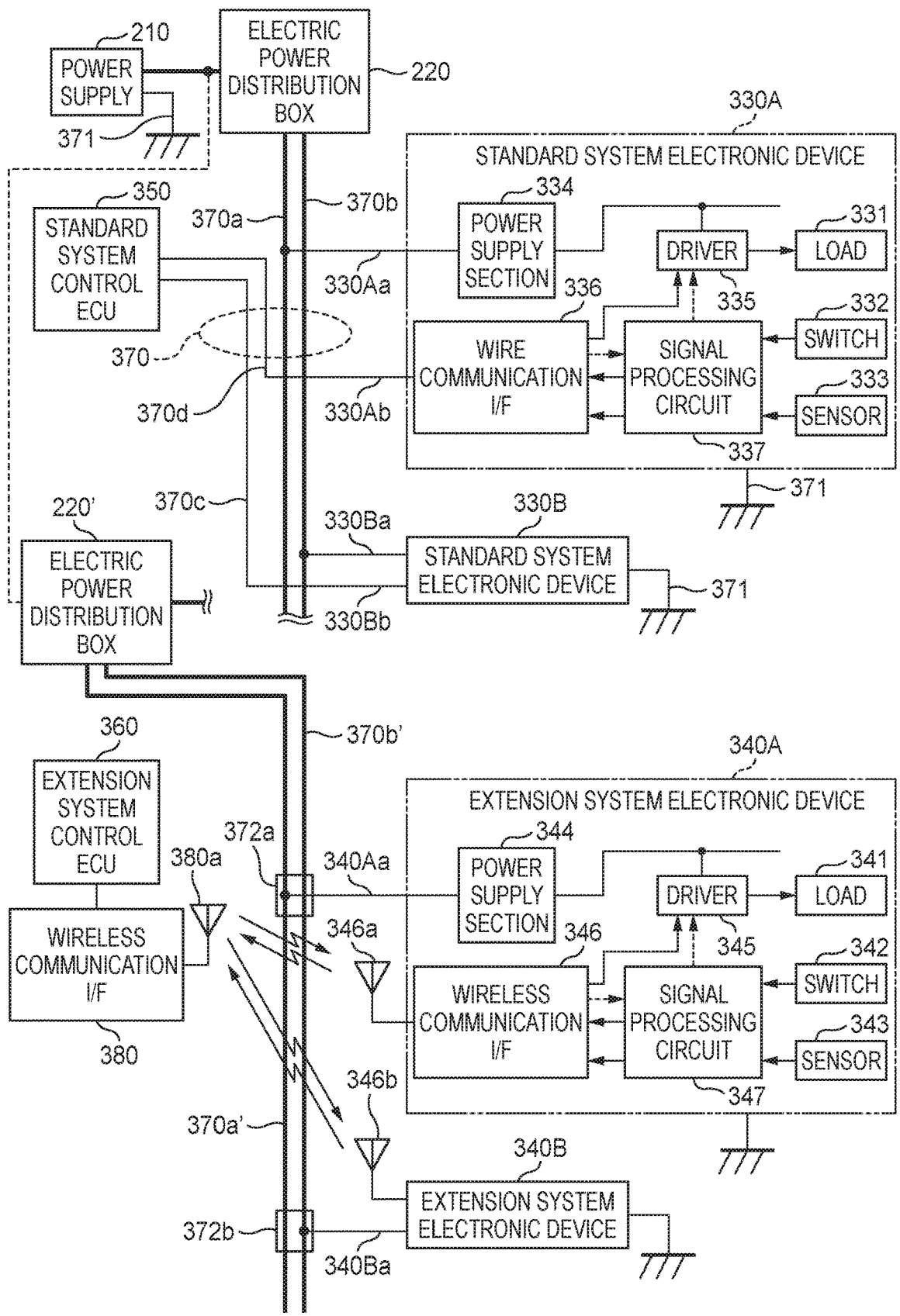
FIG. 28 is a block diagram showing a configuration of a third modification to an in-vehicle electronic device connection system.

FIG. 28 shows a third modification to the configuration of the in-vehicle electronic device connection system. In this configuration, the in-vehicle electronic device connection system is provided with a plurality of electric power distribution boxes (an electric power distribution box 220 and an electric power distribution box 220'). The electric power distribution box 220 supplies electric power through the power lines 370a and 370b to the standard system electronic devices 330A, 330B and the electric power distribution box 220' supplies electric power through the power lines 370a', 370*b*' to the extension system electronic devices 340A, 340B. In the in-vehicle electronic device connection system shown in FIG. 28, the power lines 370*a*', 370*b*' are post-mounted on the electric power distribution box 220' when the extension system electronic devices 340A, 340B are to be extended (added) as electronic devices. Thus, in a system where the extension system electronic devices 340A, 340B are not extended, the power lines 370*a*', 370*b*' are absent. Thus, in a vehicle having a specification that the extension system electronic devices 340A, 340B are not connected, useless components (such as electric wires and connectors) whose attaching is useless do not occur and hence cost reduction is achieved.

Further, in the in-vehicle electronic device connection system shown in FIG. 28, the electric power distribution box 220' may be installed as standard regardless of the presence or absence of the extension of the extension system electronic devices 340A, 340B. Alternatively, the electric power distribution box 220' may be added when the extension system electronic devices 340A, 340B are extended (added). In the latter case, in a vehicle having a specification that the extension system electronic devices 340A, 340B are not connected, a useless electric power distribution box does not occur and hence cost reduction is achieved.

Figure 29:
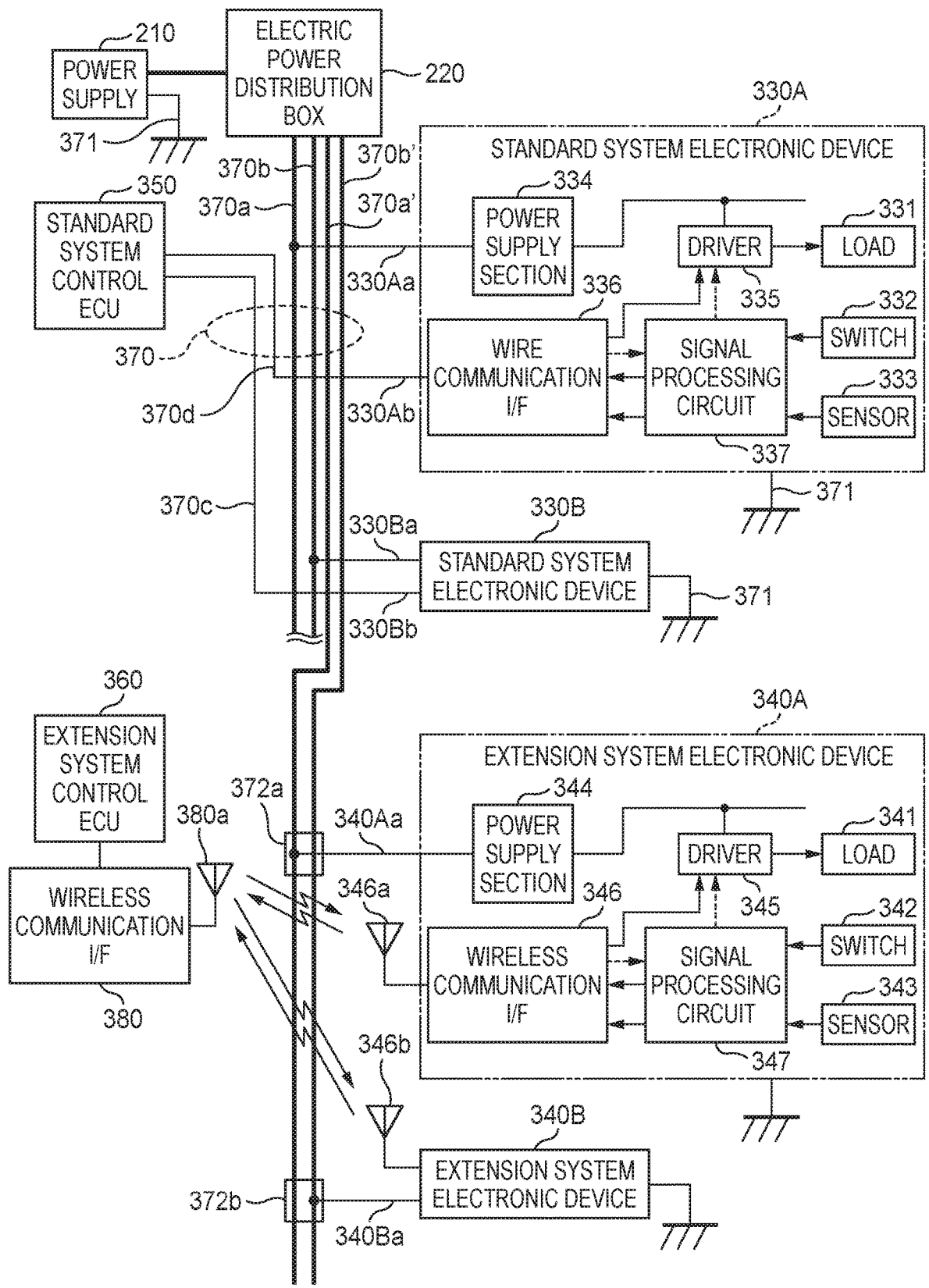
FIG. 29 is a block diagram showing a configuration of a fourth modification to an in-vehicle electronic device connection system.
Figure 30A:
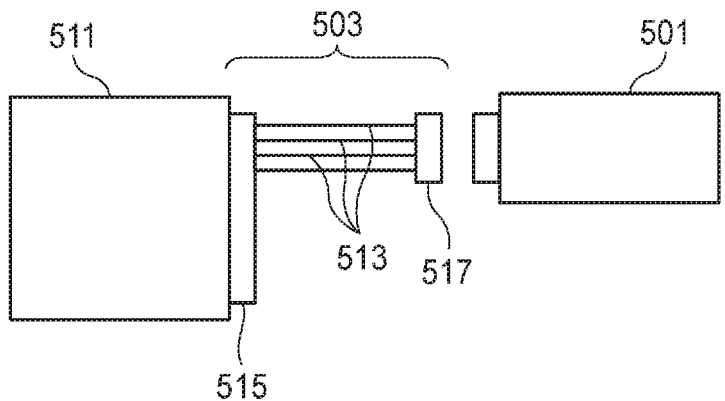
FIGS. 30A to 30C are plan views describing various kinds of harness assemblies in a vehicle harness structure according to the conventional art.
Figure 30B:
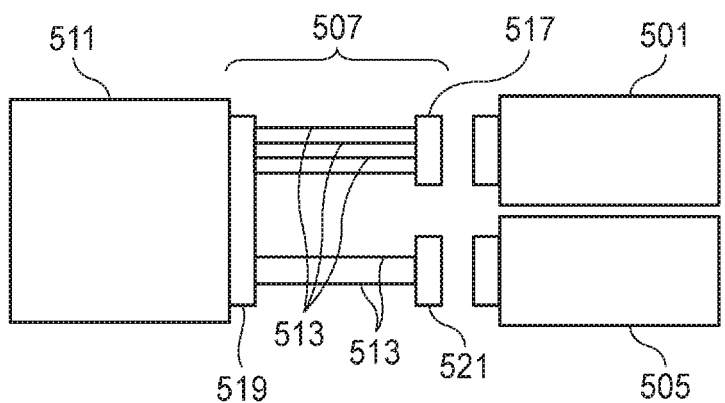
Figure 30C:
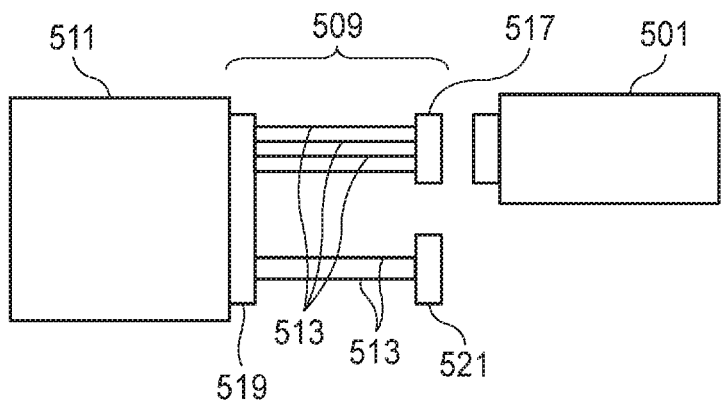
Figure 31A:
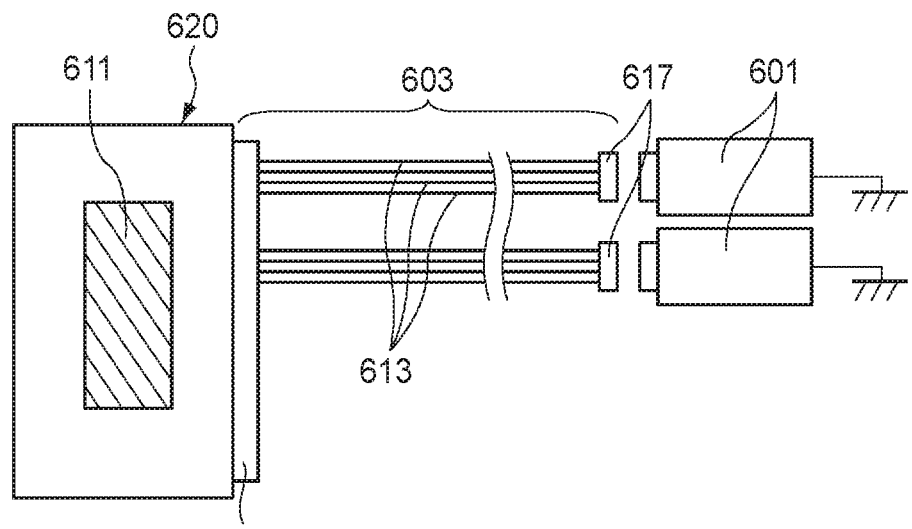
FIGS. 31A to 31C are plan views describing various kinds of harness assemblies in a vehicle harness structure according to the conventional art.
Figure 31B:
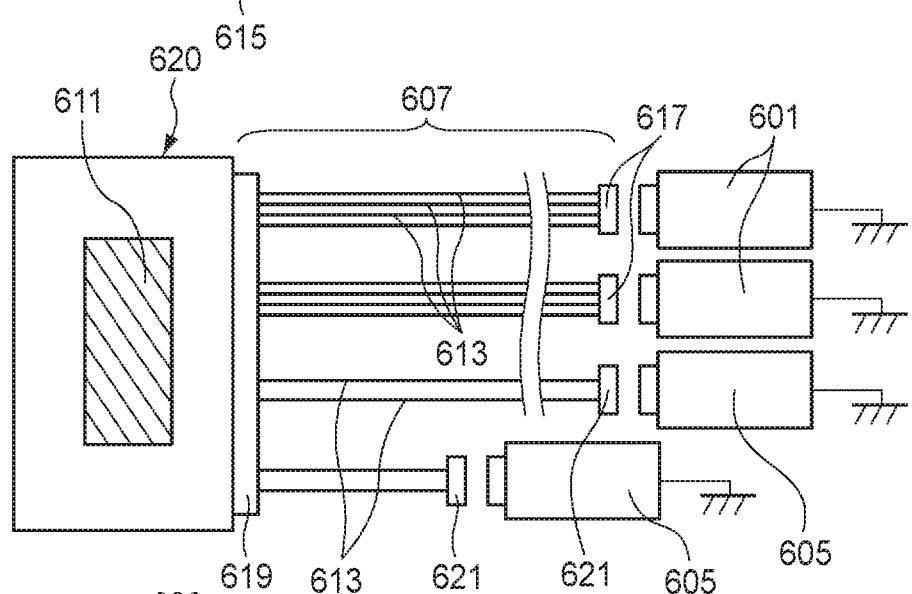
Figure 31C:
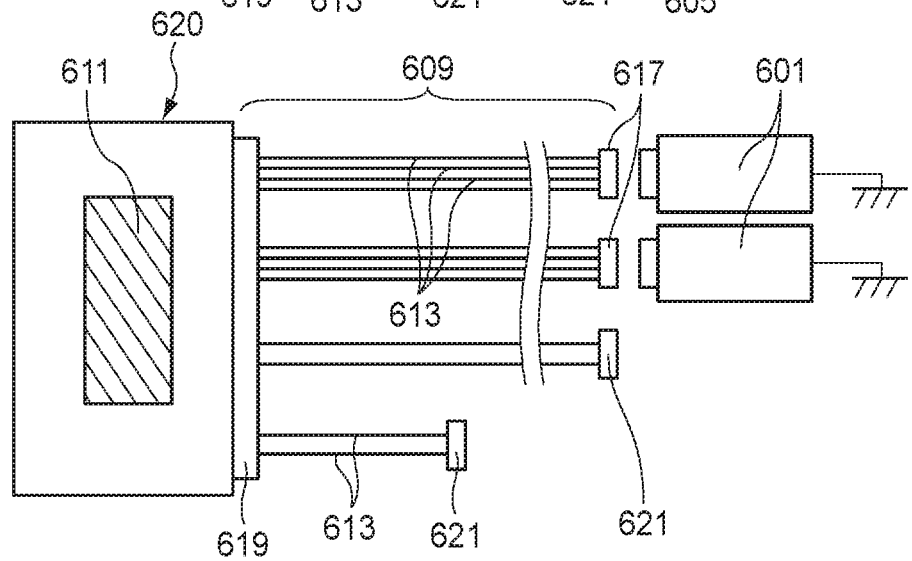

FIG. 29 shows a fourth modification to the configuration of the in-vehicle electronic device connection system. In the in-vehicle electronic device connection system, the main line wire harness 370 includes two power lines 370*a* and 370*b*, two communication lines 370*c* and 370*d*, and two power lines 370*a*' and 70*b*'. Electric power (e.g., of +12 V) supplied by the in-vehicle main power supply 210 is supplied to the power lines 370*a* and 370*b* and also to the power lines 370*a*', 370*b*'. In this system, the power line 330Aa of the standard system electronic device 330A is connected to the power line 370*a*, and the power line 330Ba of the standard system electronic device 330B is connected to the power line 370*b*. Further, the power line 340Aa of the extension system electronic device 340A is connected to power line 370*a*', and the power line 340Ba of the extension system electronic device 340B is connected to the power line 370*b*'.

In the in-vehicle electronic device connection system shown in FIG. 29, the power lines 370*a*', 370*b*' are post-mounted on the electric power distribution box 220 when the extension system electronic devices 340A, 340B are to be extended (added) as electronic devices. Thus, in a system where the extension system electronic devices 340A, 340B are not extended, the power lines 370*a*', 370*b*' are absent. Thus, in a vehicle having a specification that the extension system electronic devices 340A, 340B are not connected, useless components (such as electric wires and connectors) whose attaching is useless do not occur in the main line wire harness 370 and hence cost reduction is achieved. Further, in a vehicle having a specification that the extension system electronic devices 340A, 340B are not connected, the electric wires for the extension system electronic devices are absent in the main line wire harness 370. Thus, the diameter of the main line wire harness 370 can be reduced.

Here, the features of the embodiments shown in FIGS. 24 to 29 are briefly summarized below.

The in-vehicle electronic device connection system includes a standard system electronic device (330A), an extension system electronic device (340A), a power line (340Aa) capable of supplying electric power to the electronic devices, a standard system control ECU (350) configured to control the standard system electronic device, and an extension system control ECU (360) configured to control the extension system electronic device. The extension system electronic device is wire-connected to the power line so as to receive electric power. The extension system electronic device and the extension system control ECU are configured to transmit and receive signals from each other by wireless communication. The extension system control ECU is configured to transmit a control signal by wireless communication to control the extension system electronic device.

The in-vehicle electronic device connection system further includes a main line harness having a common power line capable of supplying electric power to a plurality of electronic devices. The extension system electronic device is wire-connected to the common power line by a post-connection of the power line (340Aa) of the extension system electronic device to the common power line of the standard system including the standard system electronic device, the standard system control ECU, and the main line harness.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims. For example, the features of the embodiments shown in FIGS. 1 to 29 may be combined to each other.

What is claimed is:

1. A vehicle harness structure comprising:
   a junction box including a first control section, within the junction box, configured to control a main device to be mounted in common on target vehicles, and the junction box further including a second control section, within the junction box, configured to control an auxiliary device to be optionally post-mounted on the target vehicles;
   a first connector provided on the junction box to connect the junction box to one end of a first harness connected to the main device, such that the junction box is electrically connected to the main device via the first connector and the first harness; and
   a second connector provided on the junction box to connect the junction box to a second harness, such that the junction box is electrically connected to the second harness via the second connector, the second harness including at least one of a communication line and a power line to which one end of a connection member is connected in a branched manner by post-attachment, the connection member having another end connected to the auxiliary device.

2. The vehicle harness structure according to claim 1, wherein the junction box comprises a first box part including the first control section and a second box part including the second control section, the second box part being attachable and detachable with respect to the first box part.

3. The vehicle harness structure according to claim 1, further comprising:
   the second harness; and
   the connection member,
   wherein the second harness is connected to the second connector provided on the junction box,
   the connection member is connected at a connection point in the branched manner to the at least one of the communication line and the signal line of the second harness, and
   a part of the at least one of the communication line and the signal line of the second harness, on which the connection member is attached by post-attachment, extends past the connection member in at least two directions from the connection point such that an entirety of the part of the at least one of the communication line and the signal line is continuous, independent of post-attachment of the connection member.

4. The vehicle harness structure according to claim 3, wherein a harness branching connection mechanism provided at the one end of the connection member is connected in a pressed manner to a conductor of at least one of the communication line and the power line of the second harness.

5. The vehicle harness structure according to claim 1, wherein the first control section and the second control section include at least one electronic control unit.

6. The vehicle harness structure according to claim 5, wherein the at least one electronic control unit includes a microcomputer.

7. A vehicle harness structure comprising:
a gateway device connected to a junction box including a first control section configured to control a main device to be mounted in common on target vehicles, the gateway device being configured to relay data transmission and reception between in-vehicle networks; and
a wire harness including a communication line connected to the gateway device, one end of a connection member being connected at a connection point of the communication line in a branched manner by post-attachment to the communication line, the connection member having another end connected to at least one auxiliary device to be optionally post-mounted on the target vehicles and a control function section to control the auxiliary device,
wherein a part of the communication line, on which the connection member is attached by post-attachment, extends past the connection member in at least two directions from the connection point such that an entirety of the part of the communication line is continuous, independent of post-attachment of the connection member.

8. The vehicle harness structure according to claim 7, wherein a harness branching connection mechanism provided at the one end of the connection member is connected in a pressed manner to a conductor of the communication line.

9. The vehicle harness structure according to claim 7, wherein the first control section includes an electronic control unit.

10. The vehicle harness structure according to claim 9, wherein the electronic control unit includes a microcomputer.

* * * * *